US012630028B2

(12) United States Patent
Tani et al.

(10) Patent No.: US 12,630,028 B2
(45) Date of Patent: May 19, 2026

(54) POWER CONVERSION DEVICE

(71) Applicant: DENSO CORPORATION, Kariya-city (JP)

(72) Inventors: Keiya Tani, Kariya-city (JP); Shunichi Kubo, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 167 days.

(21) Appl. No.: 18/432,844

(22) Filed: Feb. 5, 2024

(65) Prior Publication Data

US 2024/0174089 A1 May 30, 2024

Related U.S. Application Data

(63) Continuation of application No. PCT/JP2022/026922, filed on Jul. 7, 2022.

(30) Foreign Application Priority Data

Aug. 5, 2021 (JP) ................................. 2021-129197

(51) Int. Cl.
| | |
|---|---|
| *B60L 50/51* | (2019.01) |
| *B60L 50/60* | (2019.01) |
| *H02M 1/088* | (2006.01) |
| *H02M 7/5387* | (2007.01) |

(52) U.S. Cl.
CPC .............. *B60L 50/51* (2019.02); *B60L 50/66* (2019.02); *H02M 1/088* (2013.01); *H02M 7/53873* (2013.01); *B60L 2210/42* (2013.01)

(58) Field of Classification Search
None
See application file for complete search history.

(56) References Cited

U.S. PATENT DOCUMENTS

| | | | | |
|---|---|---|---|---|
| 8,749,090 B2 * | 6/2014 | Stancu | ................ | H02P 21/0003 |
| | | | | 307/9.1 |
| 2002/0008496 A1 * | 1/2002 | Shamoto | ................. | H02J 7/342 |
| | | | | 320/135 |
| 2009/0250279 A1 | 10/2009 | Holmes | | |

(Continued)

FOREIGN PATENT DOCUMENTS

| | | |
|---|---|---|
| JP | 2021-191229 A | 12/2021 |
| WO | 2017/148602 A1 | 9/2017 |
| WO | 2020/153313 A1 | 7/2020 |

*Primary Examiner* — Daniel Cavallari
*Assistant Examiner* — Aqeel H Bukhari
(74) *Attorney, Agent, or Firm* — OLIFF PLC

(57) ABSTRACT

A power conversion device is applicable to three or more charge storage units connected in series. The power conversion device includes: a rotating electric machine including a stator winding; an inverter including upper and lower arm switches and connecting the stator winding and the charge storage units; a high potential path connected to a high potential terminal of the upper arm switch; a low potential path connected to a low potential terminal of the lower arm switch; a neutral point path connected to a neutral point of the stator winding; and neutral point switches installed individually corresponding to cell connection points each between a positive electrode terminal and a negative electrode terminal of adjacent charge storage units in the charge storage units, the neutral point switches connecting the cell connection points and the neutral point path.

28 Claims, 60 Drawing Sheets

(56)                References Cited

U.S. PATENT DOCUMENTS

| | | | |
|---|---|---|---|
| 2011/0187301 A1* | 8/2011 | Stancu | B60L 58/20 |
| | | | 318/400.3 |
| 2012/0041621 A1* | 2/2012 | Marus | B60L 1/003 |
| | | | 701/22 |
| 2014/0035531 A1 | 2/2014 | Garnier et al. | |
| 2022/0231619 A1 | 7/2022 | Iyasu et al. | |
| 2023/0086550 A1 | 3/2023 | Uchiyama et al. | |
| 2023/0327596 A1 | 10/2023 | Nishimura et al. | |

* cited by examiner

POWER CONVERSION DEVICE

CROSS-REFERENCE TO RELATED APPLICATION

This application is the U.S. bypass application of International Application No. PCT/JP2022/026922 filed on Jul. 7, 2022 which designated the U.S. and claims priority to Japanese Patent Application No. 2021-129197 filed on Aug. 5, 2021, the contents of both of which are incorporated herein by reference.

TECHNICAL FIELD

The present disclosure relates to a power conversion device.

BACKGROUND

As described in JP 2014-512788 A, a known charge balancing system includes a series-connection body of a plurality of unit storage cells, isolated DC-DC converters, and an auxiliary battery. The DC-DC converters are installed on a one-to-one basis for the unit storage cells, with the output of each converter connected to the corresponding unit storage cell and the input connected to the auxiliary battery. The DC-DC converter is driven to supply electric power from the auxiliary battery to the unit storage cell. This supply of electric power enables the remaining powers of the unit storage cells to be equalized.

SUMMARY

The present disclosure provides a power conversion device applicable to three or more charge storage units connected in series, the device comprising:
  a rotating electric machine including a stator winding;
  an inverter including upper and lower arm switches and connecting the stator winding and the charge storage units;
  a high potential path connected to a high potential terminal of the upper arm switch;
  a low potential path connected a low potential terminal of the lower arm switch;
  a neutral point path connected to a neutral point of the stator winding; and
  neutral point switches installed individually corresponding to cell connection points between a positive electrode terminal and a negative electrode terminal of adjacent charge storage units in the charge storage units, the neutral point switches connecting the cell connection points and the neutral point path.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

The system described in JP 2014-512788 A needs a DC-DC converter for each unit storage cell. The system may thus be complex.

A main object of the present disclosure is to provide a power conversion device that may have a simpler configuration.

The present disclosure provides a power conversion device applicable to three or more charge storage units connected in series, the device comprising:

a rotating electric machine including a stator winding;

an inverter including upper and lower arm switches and connecting the stator winding and the charge storage units;

a high potential path connected to a high potential terminal of the upper arm switch;

a low potential path connected a low potential terminal of the lower arm switch;

a neutral point path connected to a neutral point of the stator winding; and neutral point switches installed individually corresponding to cell connection points between a positive electrode terminal and a negative electrode terminal of adjacent charge storage units in the charge storage units, the neutral point switches connecting the cell connection points and the neutral point path.

In the present disclosure, the neutral point switches installed individually corresponding to the cell connection points and the neutral point path are included for the supply of electric power from a source charge storage unit to a target charge storage unit in the charge storage units, and also the stator winding and the inverter are used for the supply of electric power. This structure may simplify the configuration for the supply of electric from a power source charge storage unit to a target charge storage unit.

First Embodiment

A first embodiment of a power conversion device according to the present disclosure will now be described with reference to the drawings. The power conversion device according to the present embodiment is installed in a vehicle such as a hybrid vehicle, an electric vehicle, or a fuel cell vehicle. Examples of vehicles include an automobile, a bus, a construction vehicle, and an agricultural vehicle.

Figure 1:
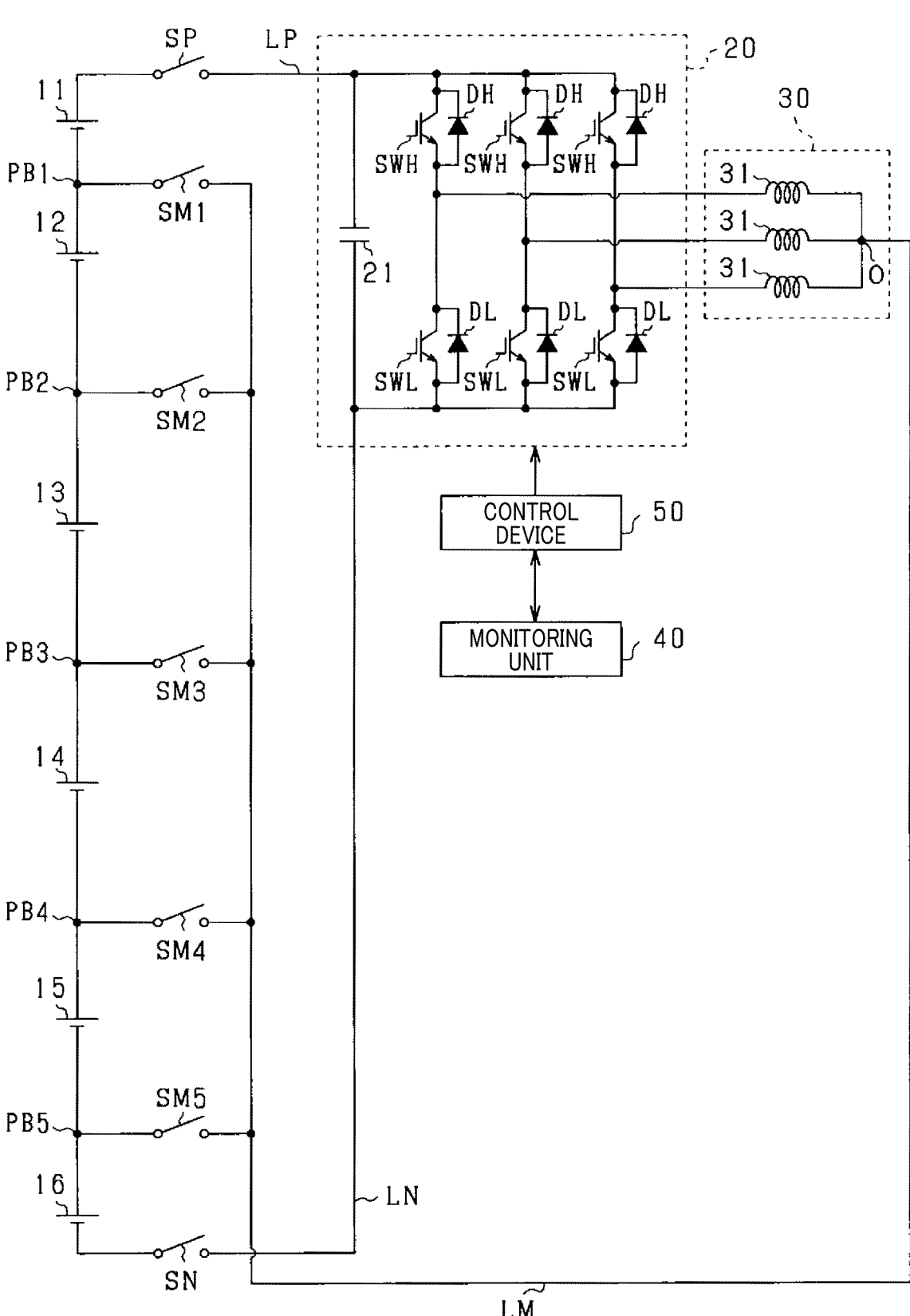
FIG. 1 is an overall configuration diagram of a power conversion device according to a first embodiment.

As illustrated in FIG. 1, a power conversion device includes a battery, an inverter 20, and a rotating electric machine 30. The battery includes a series-connection body of charge storage units. In the present embodiment, the charge storage units are battery cells, which are single cells. In the present embodiment, the terminal voltages of the charge storage units (e.g., rated voltages) are set at the same voltage. The battery cells may be, for example, secondary cells such as lithium-ion cells. FIG. 1 illustrates an example in which the battery includes six charge storage units. In the present embodiment, the charge storage units included in the battery are referred to as first to sixth charge storage units 11 to 16. Of the charge storage units 11 to 16, the highest-potential charge storage unit at the highest potential is the first charge storage unit 11, whereas the lowest-potential charge storage unit at the lowest potential is the sixth charge storage unit 16.

The negative electrode terminal of the first charge storage unit 11 is connected to the positive electrode terminal of the second charge storage unit 12 via a first connection point PB1. The negative electrode terminal of the second charge storage unit 12 is connected to the positive electrode terminal of the third charge storage unit 13 via a second connection point PB2. The negative electrode terminal of the third charge storage unit 13 is connected to the positive electrode terminal of the fourth charge storage unit 14 via a third connection point PB3. The negative electrode terminal of the fourth charge storage unit 14 is connected to the positive electrode terminal of the fifth charge storage unit 15 via a fourth connection point PB4. The negative electrode terminal of the fifth charge storage unit 15 is connected to the positive electrode terminal of the sixth charge storage unit 16 via a fifth connection point PB5. The connection points PB1 to PB5 correspond to cell connection points.

All or some of the charge storage units 11 to 16 constituting the battery are exchangeable. In one example, when some charge storage units of the charge storage units 11 to 16 run low, the low charge storage units are exchanged for fully charged charge storage units. In another example, when some charge storage units deteriorate over time, the charge storage units are exchanged for charge storage units that have not deteriorated over time (e.g., new charge storage units).

The rotating electric machine 30 is a three-phase synchronous motor and includes star-connected three-phase stator windings 31. The stator windings 31 in the respective phases are displaced from each other by 120 electrical degrees. The rotating electric machine 30 is, for example, a permanent-magnet synchronous motor. In the present embodiment, the rotating electric machine 30 is a vehicle main motor and serves as a power source for the travel of the vehicle.

The inverter 20 includes three-phase series-connection bodies each having an upper arm switch SWH and a lower arm switch SWL. In the present embodiment, the switches SWH and SWL are voltage-controlled semiconductor switching elements, or specifically, IGBTs. Thus, the high potential terminals of the switches SWH and SWL are collectors, whereas the low potential terminals are emitters. To the upper and lower arm switches SWH and SWL, upper and lower arm diodes DH and DL are connected in antiparallel as freewheel diodes.

In each phase, the stator winding 31 has a first end connected to the emitter of the upper arm switch SWH and the collector of the lower arm switch SWL. The stator windings 31 in the respective phases have second ends connected to each other at a neutral point O. In the present embodiment, the stator windings 31 in the respective phases are set to the same number of turns. Accordingly, the stator windings 31 in the respective phases are, for example, set to the same inductance.

The power conversion device includes a high potential path LP, a low potential path LN, and a capacitor 21. The collector of the upper arm switch SWH in each phase and the positive electrode terminal of the first charge storage unit 11 are connected to each other by the high potential path LP. The emitter of the lower arm switch SWL in each phase and the negative electrode terminal of the sixth charge storage unit 16 are connected by the low potential path LN. The capacitor 21 connects the collector of the upper arm switch SWH in each phase and the emitter of the lower arm switch SWL in each phase. The capacitor 21 may be incorporated in the inverter or installed outside the inverter 20.

The power conversion device includes a monitoring unit 40 and a control device 50. The monitoring unit 40 monitors, for example, the terminal voltage [V], the remaining power [Ah], the SOC, the SOH, and the temperature of each of the charge storage units 11 to 16 constituting the battery. The monitoring unit 40 inputs its monitoring information to the control device 50.

The power conversion device includes a neutral point path LM. The neutral point path LM is connected to the neutral point O.

The power conversion device includes a positive electrode switch SP and a negative electrode switch SN. In the present embodiment, the positive electrode switch SP and the negative electrode switch SN are relays.

The positive electrode switch SP connects the positive electrode terminal of the first charge storage unit 11 and the high potential path LP. When the positive electrode switch SP is turned on, the positive electrode terminal of the first charge storage unit 11 and the high potential path LP are electrically connected to each other. When the positive electrode switch SP is turned off, the positive electrode terminal of the first charge storage unit 11 and the high potential path LP are electrically disconnected from each other. The negative electrode switch SN connects the negative electrode terminal of the sixth charge storage unit 16 and the low potential path LN. When the negative electrode switch SN is turned on, the negative electrode terminal of the sixth charge storage unit 16 and the low potential path LN are electrically connected to each other. When the negative electrode switch SN is turned off, the negative electrode terminal of the sixth charge storage unit 16 and the low potential path LN are electrically disconnected from each other.

The power conversion device includes first to fifth neutral point switches SM1 to SM5. In the present embodiment, the neutral point switches SM1 to SM5 are relays. The n-th neutral point switch SMn (n=1, 2, 3, 4, 5) connects the n-th connection point PBn and the neutral point path LM. When the n-th neutral point switch SMn is turned on, the n-th connection point PBn and the neutral point path LM are electrically connected to each other. When the n-th neutral point switch SMn is turned off, the n-th connection point PBn and the neutral point path LM are electrically disconnected from each other.

The control device 50 is basically a microcomputer and functions as a controller. The microcomputer includes a CPU. The functions provided by the microcomputer may be provided by software recorded on a tangible memory device and a computer for executing it, software alone, hardware alone, or a combination thereof. For example, when provided by an electronic circuit, which is hardware, the microcomputer may be provided by an analog circuit or a digital circuit including a large number of logic circuits. For example, the microcomputer executes programs stored in its non-transitory tangible storage medium serving as a storage unit. The programs include a program for the control illustrated in FIG. 2. When the programs are executed, the method corresponding to the programs is implemented. The storage unit is, for example, a non-volatile memory. The programs stored in the storage unit can be updated through a communication network such as the internet.

The control device 50 controls the switching of the upper and lower arm switches SWH and SWL in each phase of the inverter 20 in order to feedback-control a control amount for the rotating electric machine 30 to a command value. The control amount is, for example, torque. In each phase, the upper arm switch SWH and the lower arm switch SWL are alternately turned on.

The control device 50 turns on or off the positive electrode switch SP, the negative electrode switch SN, and the neutral point switches SM1 to SM5 and can communicate with the monitoring unit 40.

The control device 50 performs power supply processing for narrowing the differences between the capacity parameters of the charge storage units 11 to 16. In the present embodiment, the capacity parameter is the terminal voltage [V], the SOC, or the remaining power [Ah] of the charge storage unit. The control device 50 functions as a selector that selects, from the charge storage units 11 to 16, one charge storage unit or some charge storage units connected in series as a source charge storage unit, and selects, from the charge storage units 11 to 16, the charge storage units other than the source charge storage unit as target charge storage units. Based on information acquired from the monitoring unit 40, the control device 50, for example, selects the charge storage unit having the greatest capacity parameter in the charge storage units 11 to 16 as a source charge storage unit, and selects the remaining charge storage units as target charge storage units. The power supply processing can narrow the differences between the capacity parameters of the charge storage units 11 to 16, thus enabling the capacity parameters of the charge storage units 11 to 16 to be equalized.

Figure 2:
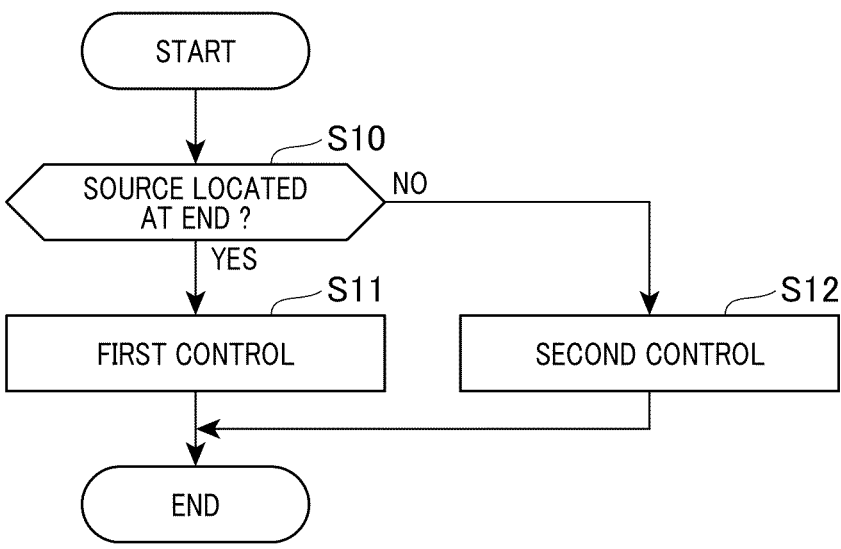
FIG. 2 is a flowchart illustrating a procedure of power supply processing.

FIG. 2 illustrates a flowchart of power supply processing performed by the control device 50.

In step S10, it is determined whether the selected source charge storage unit includes the first charge storage unit 11 or the sixth charge storage unit 16.

If the determination result in step S10 is affirmative, the processing proceeds to step S11, in which first control is performed. The following describes the first control in a case in which the source charge storage unit includes the first charge storage unit 11 and a case in which the source charge storage unit includes the sixth charge storage unit 16.

Figure 3:
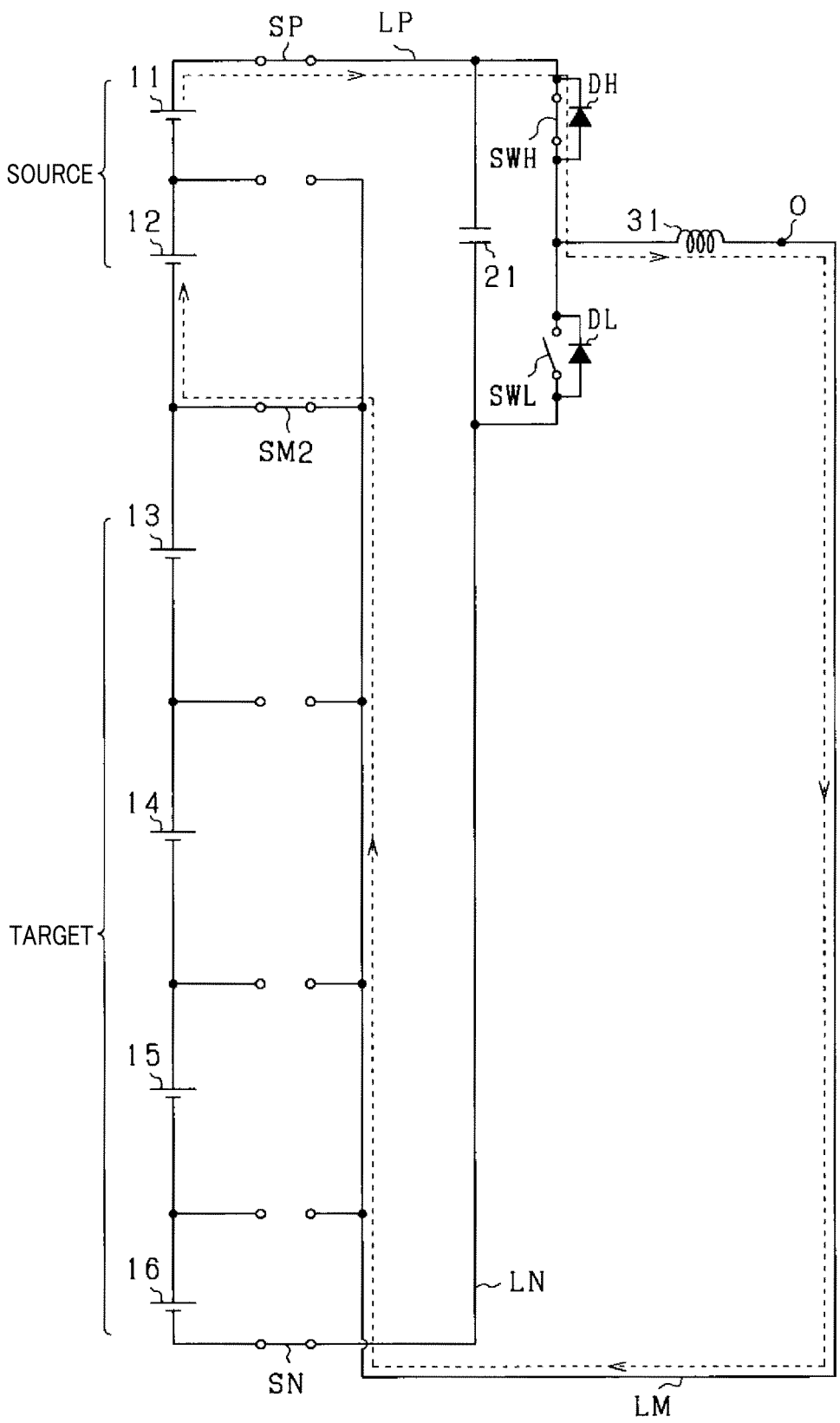
FIG. 3 illustrates a mode of electric power supply with a source charge storage unit located at the high potential end.
Figure 4:
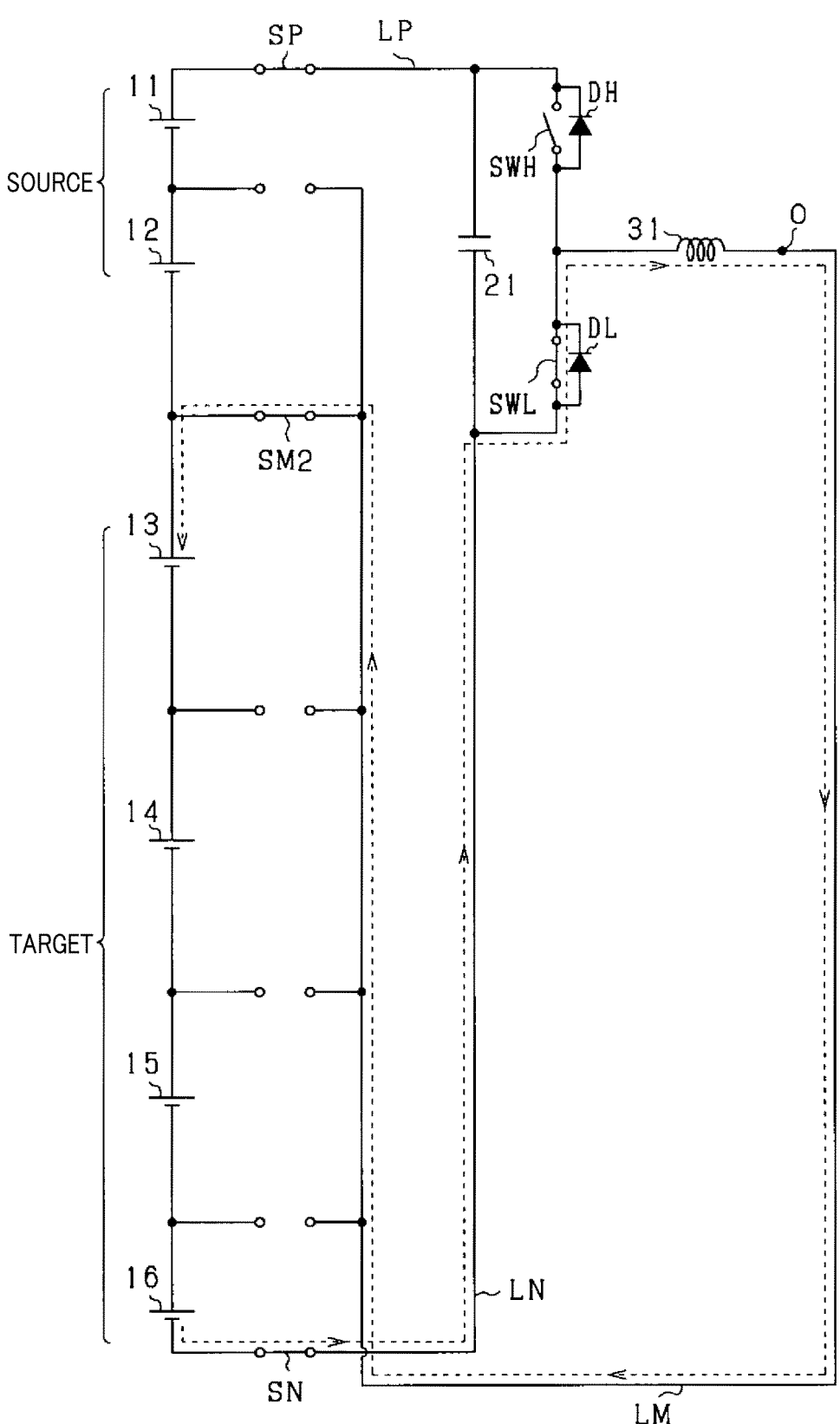
FIG. 4 illustrates a mode of electric power supply with a source charge storage unit located at the high potential end.

First, the case in which the source charge storage unit includes the first charge storage unit 11 will be described with reference to FIGS. 3 and 4. The case described is specifically a case in which the first and second charge storage units 11 and 12 are replaced with new charge storage units, the new first and second charge storage units 11 and 12 are selected as source charge storage units, and the third to sixth charge storage units 13 to 16 are selected as target charge storage units. In FIG. 3 and other figures, the three-phase configuration of the inverter 20 and the rotating electric machine 30 is illustrated simply as a single-phase configuration for the sake of convenience.

The first control with the source charge storage units including the first charge storage unit 11 is to supply electric power from the source charge storage units to the target charge storage units through the inverter 20 and the neutral point path LM by controlling the switching of the inverter 20 with the positive electrode switch SP, the neutral point switch connected to the lowest-potential cell connection point of the source charge storage units, and the negative electrode switch SN turned on. As illustrated in FIG. 3, the control device 50 turns on the positive electrode switch SP, the negative electrode switch SN, and the second neutral point switch SM2 and turns off the first and third to fifth neutral point switches SM1 and SM3 to SM5. The second neutral point switch SM2 is a switch connected to the lowest-potential cell connection point of the target charge storage units, or in other words, the second connection point PB2. The control device 50 then turns on the upper arm switch SWH and turns off the lower arm switch SWL. This switching causes an electric current to flow through a closed circuit including the first and second charge storage units 11 and 12, the high potential path LP, the upper arm switch SWH, the stator winding 31, and the neutral point path LM, accumulating magnetic energy in the stator winding 31. As illustrated in FIG. 4, the control device 50 then turns off the upper arm switch SWH and turns on the lower arm switch SWL. This switching supplies a charging current based on the accumulated magnetic energy to the series-connection body of the third to sixth charge storage units 13 to 16. The switching states illustrated in FIGS. 3 and 4 alternate to supply electric power from the first and second charge storage units 11 and 12 to the third to sixth charge storage units 13 to 16. This supply of power narrows the difference between the capacity parameters of the first and second charge storage units 11 and 12 and the capacity parameters of the third to sixth charge storage units 13 to 16.

Figure 5:
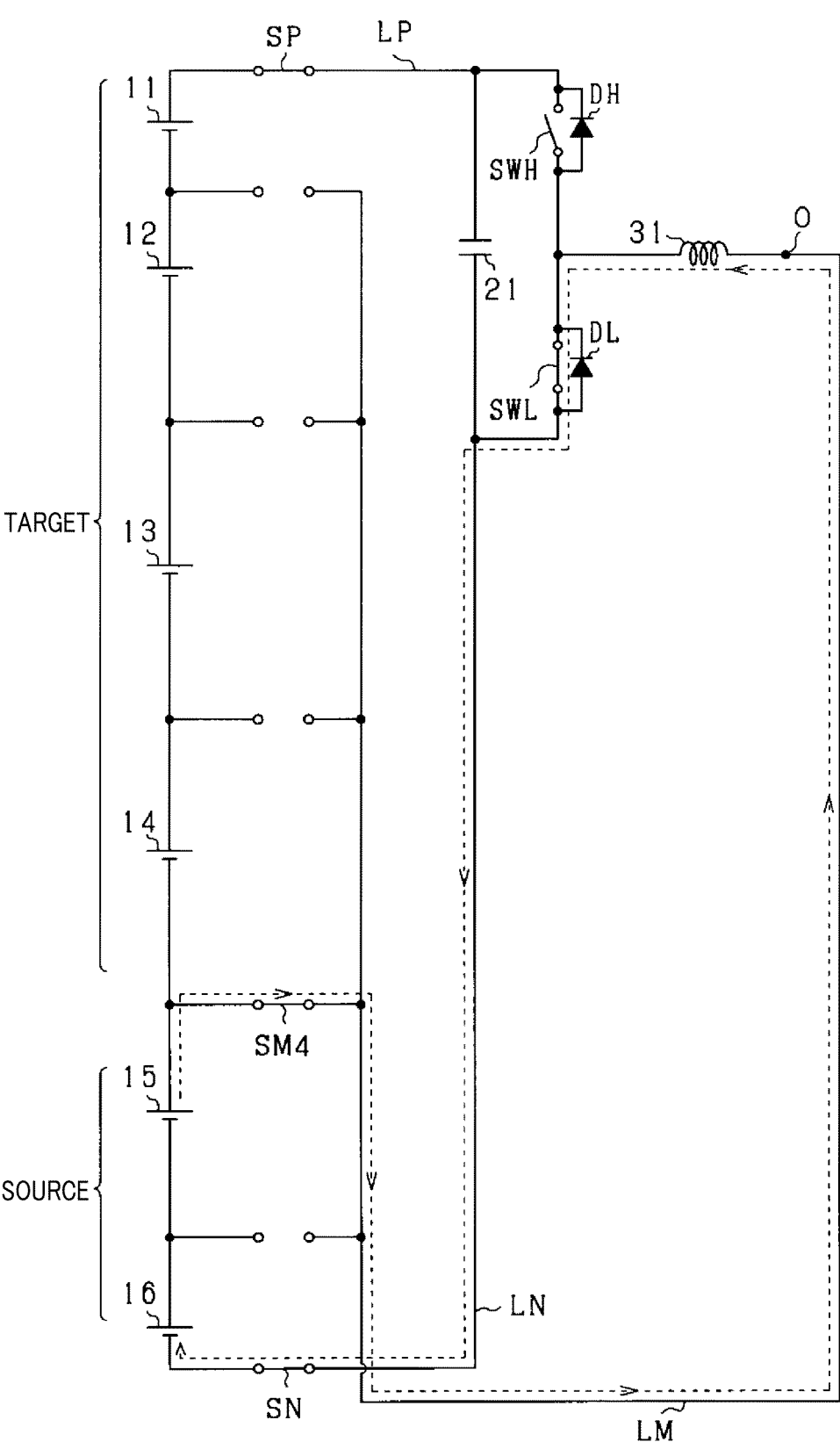
FIG. 5 illustrates a mode of electric power supply with a source charge storage unit located at the low potential end.
Figure 6:
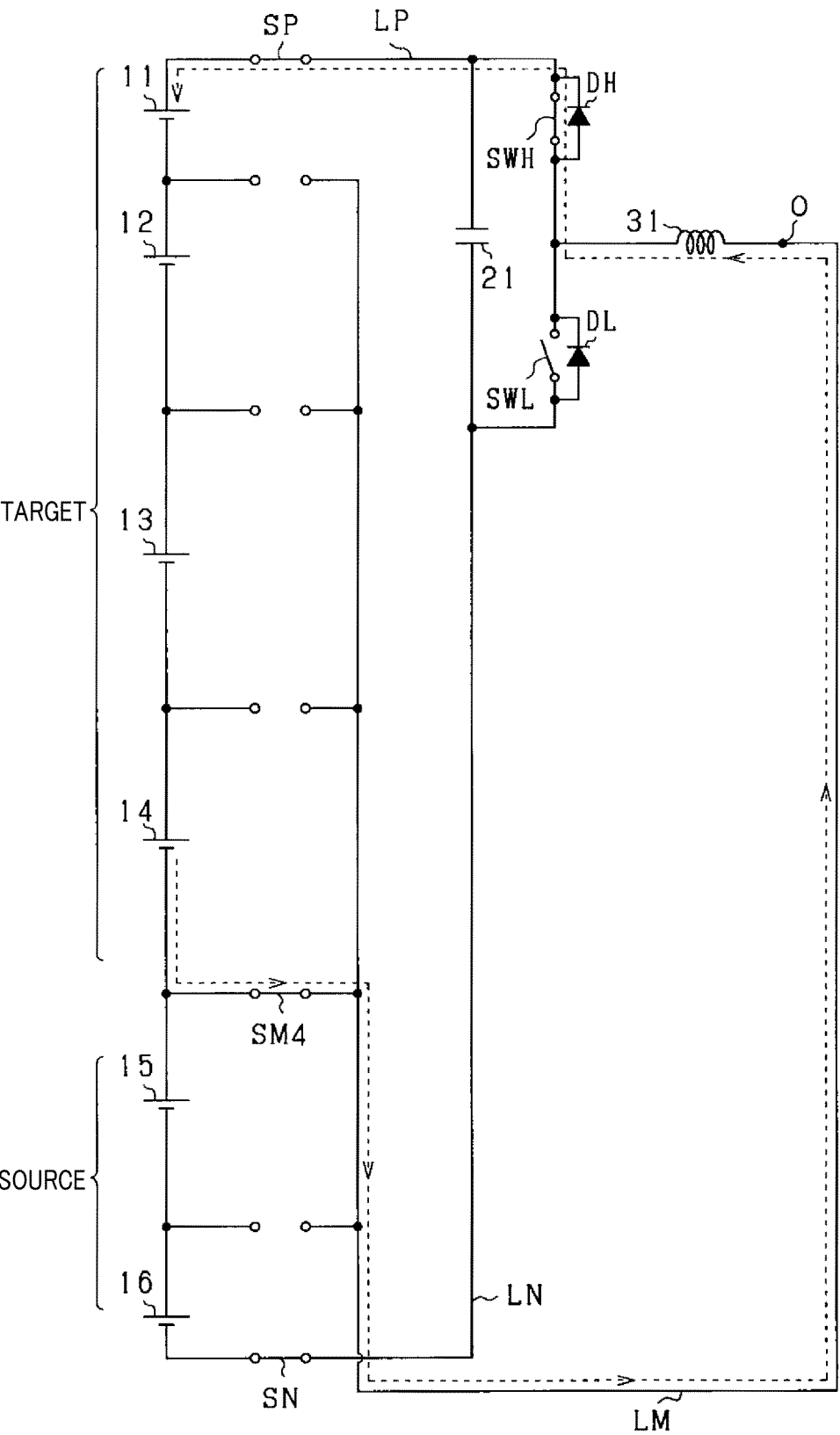
FIG. 6 illustrates a mode of electric power supply with a source charge storage unit located at the low potential end.

Next, the case in which the source charge storage unit includes the sixth charge storage unit 16 will be described with reference to FIGS. 5 and 6. The case described is specifically a case in which the fifth and sixth charge storage units 15 and 16 are selected as source charge storage units, and the first to fourth charge storage units 11 to 14 are selected as target charge storage units.

The first control with the source charge storage units including the sixth charge storage unit 16 is to supply electric power from the source charge storage units to the target charge storage units through the inverter 20 and the neutral point path LM by controlling the switching of the inverter 20 with the positive electrode switch SP, the neutral point switch connected to the highest-potential cell connection point of the source charge storage units, and the negative electrode switch SN turned on. As illustrated in FIG. 5, the control device 50 turns on the positive electrode switch SP, the negative electrode switch SN, and the fourth neutral point switch SM4 and turns off the first to third and fifth neutral point switches SM1 to SM3 and SM5. The fourth neutral point switch SM4 is a switch connected to the highest-potential cell connection point of the source charge storage units, or in other words, the fourth connection point PB4. The control device 50 then turns on the lower arm switch SWL and turns off the upper arm switch SWH. This switching causes an electric current to flow through a closed circuit including the fifth and sixth charge storage units 15 and 16, the neutral point path LM, the stator winding 31, the lower arm switch SWL, and the low potential path LN, accumulating magnetic energy in the stator winding 31. As illustrated in FIG. 6, the control device 50 then turns off the lower arm switch SWL and turns on the upper arm switch SWH. This switching supplies a charging current based on the accumulated magnetic energy to the series-connection body of the first to fourth charge storage units 11 to 14. The switching states illustrated in FIGS. 5 and 6 alternate to supply electric power from the fifth and sixth charge storage units 15 and 16 to the first to fourth charge storage units 11 to 14. This supply of power narrows the difference between the capacity parameters of the fifth and sixth charge storage units 15 and 16 and the capacity parameters of the first to fourth charge storage units 11 to 14.

Referring back to FIG. 2, in step S10, if the source charge storage unit is determined to be located between target charge storage units, the processing proceeds to step S12, in which second control is performed. Referring to FIGS. 7 to 10, the following describes the second control in a case in which the second charge storage unit 12 and the third charge storage unit 13 are source charge storage units, and the first and fourth to sixth charge storage units 11 and 14 to 16 are target charge storage units.

Figure 7:
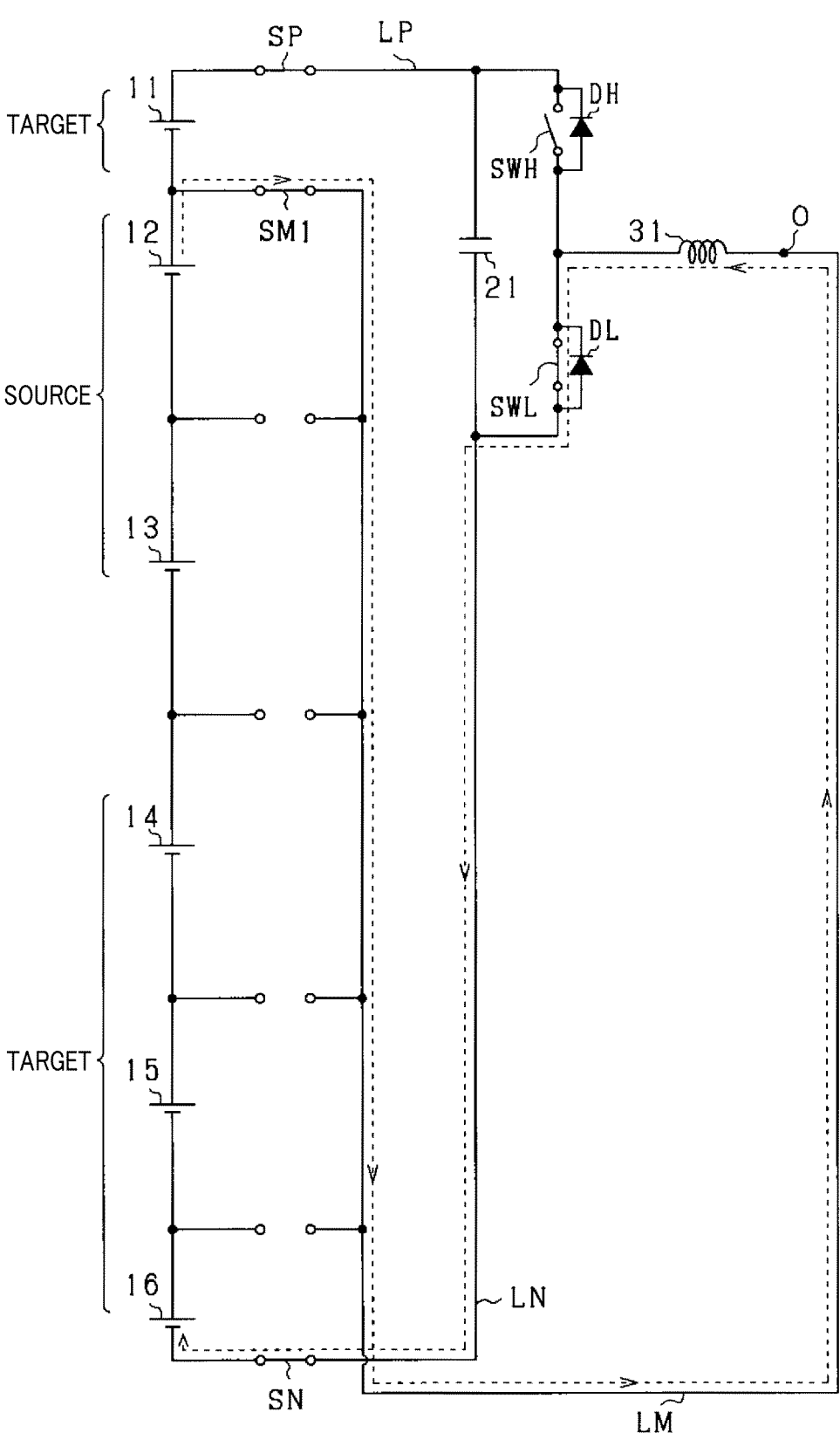
FIG. 7 illustrates a mode of electric power supply with a source charge storage unit located between target charge storage units.
Figure 8:
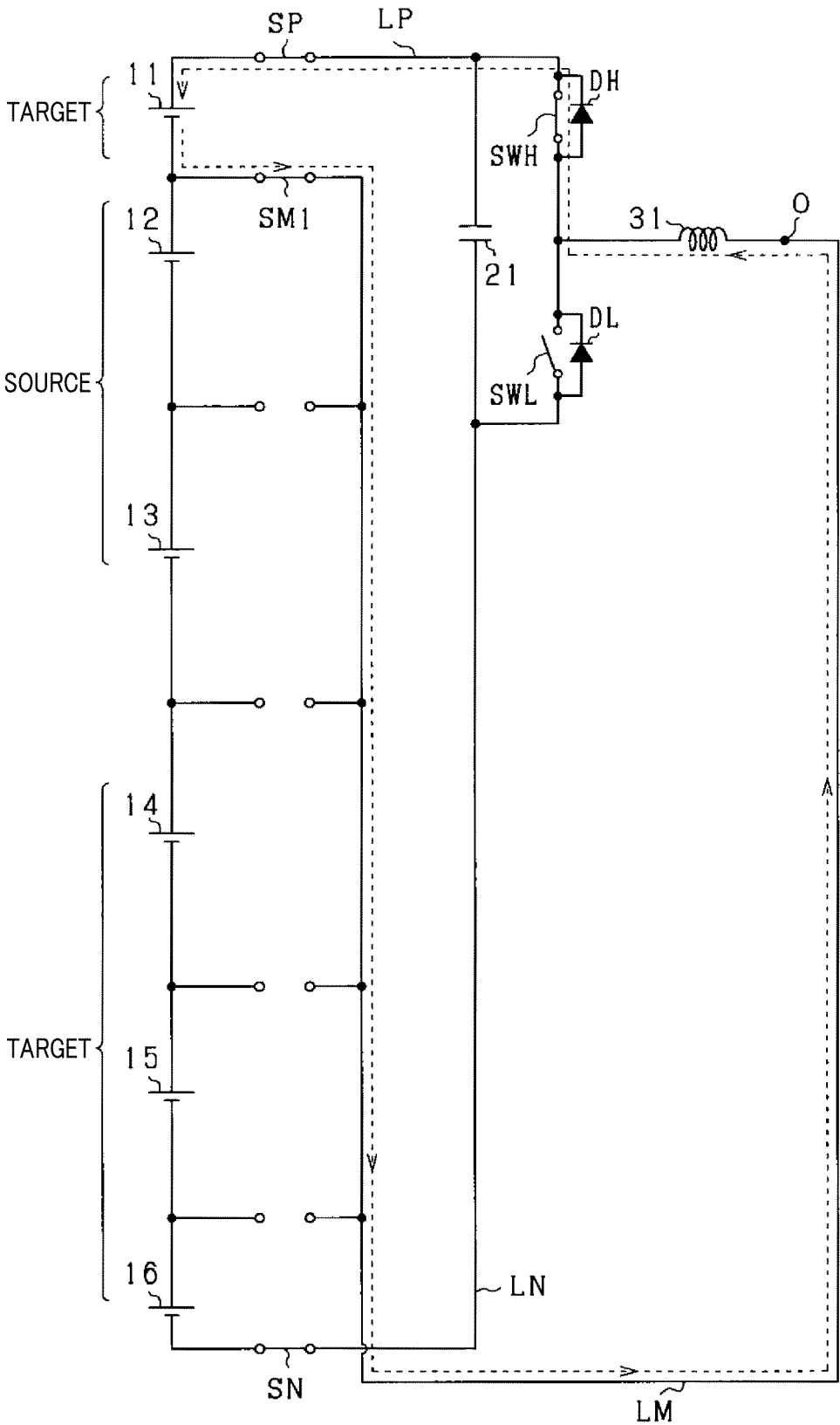
FIG. 8 illustrates a mode of electric power supply with a source charge storage unit located between target charge storage units.

As illustrated in FIG. 7, the control device 50 turns on the positive electrode switch SP, the negative electrode switch SN, and the first neutral point switch SM1 and turns off the second to fifth neutral point switches SM2 to SM5. The first neutral point switch SM1 is a switch connected to the highest-potential cell connection point of the source charge storage units, or in other words, the first connection point PB1. The control device 50 then turns on the lower arm switch SWL and turns off the upper arm switch SWH. This switching causes magnetic energy to be accumulated in the stator winding 31 with the second to sixth charge storage units 12 to 16 serving as an energy source. As illustrated in FIG. 8, the control device 50 then turns on the upper arm switch SWH and turns off the lower arm switch SWL. This switching supplies a charging current based on the accumulated magnetic energy to the first charge storage unit 11. The first charge storage unit 11 is the charge storage unit higher in potential than the source charge storage units (the second and third charge storage units 12 and 13) in the first to sixth charge storage units 11 to 16. The switching states illustrated in FIGS. 7 and 8 alternate to supply electric power from the second to sixth charge storage units 12 to 16 to the first charge storage unit 11.

Figure 9:
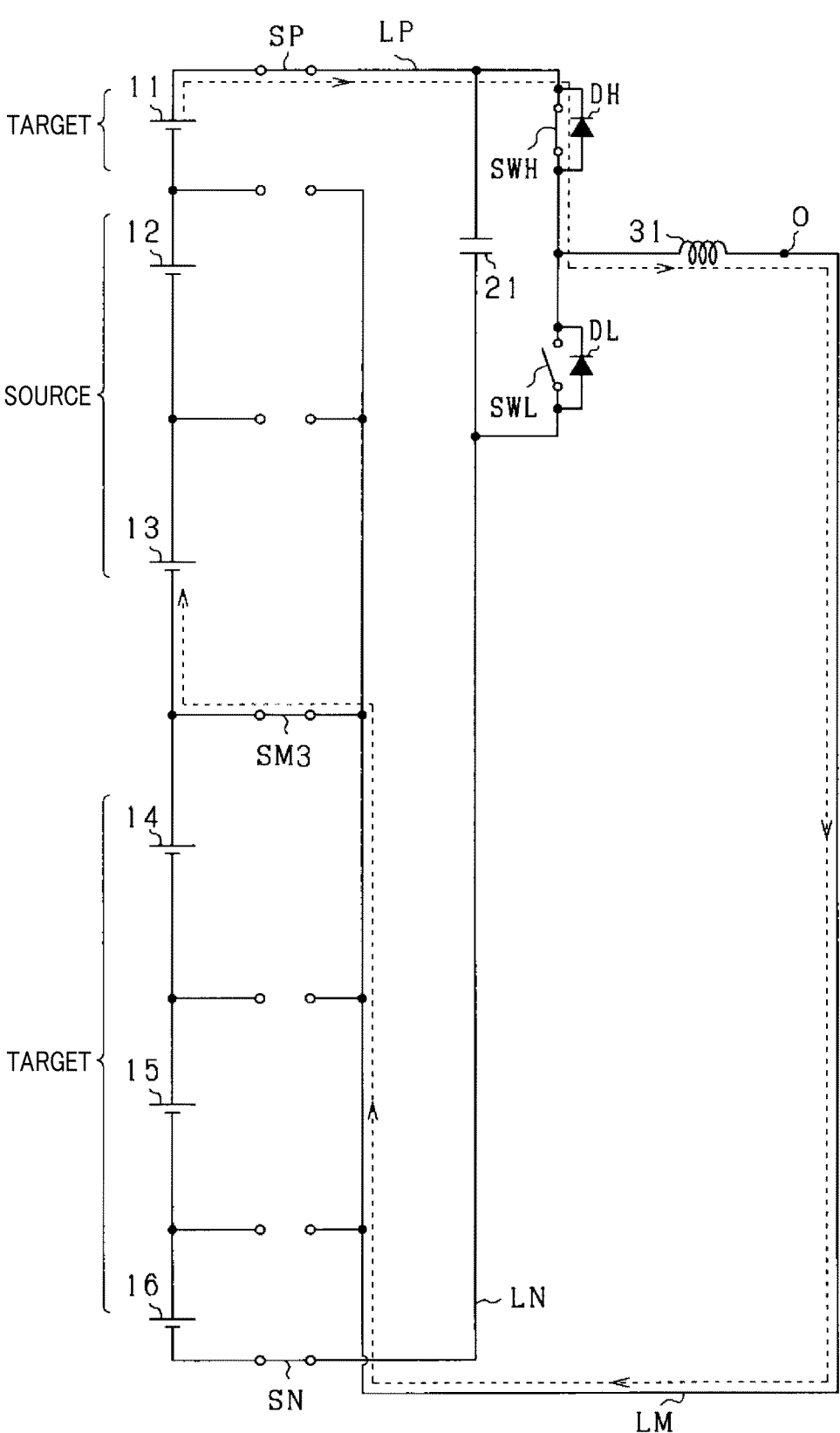
FIG. 9 illustrates a mode of electric power supply with a source charge storage unit located between target charge storage units.
Figure 10:
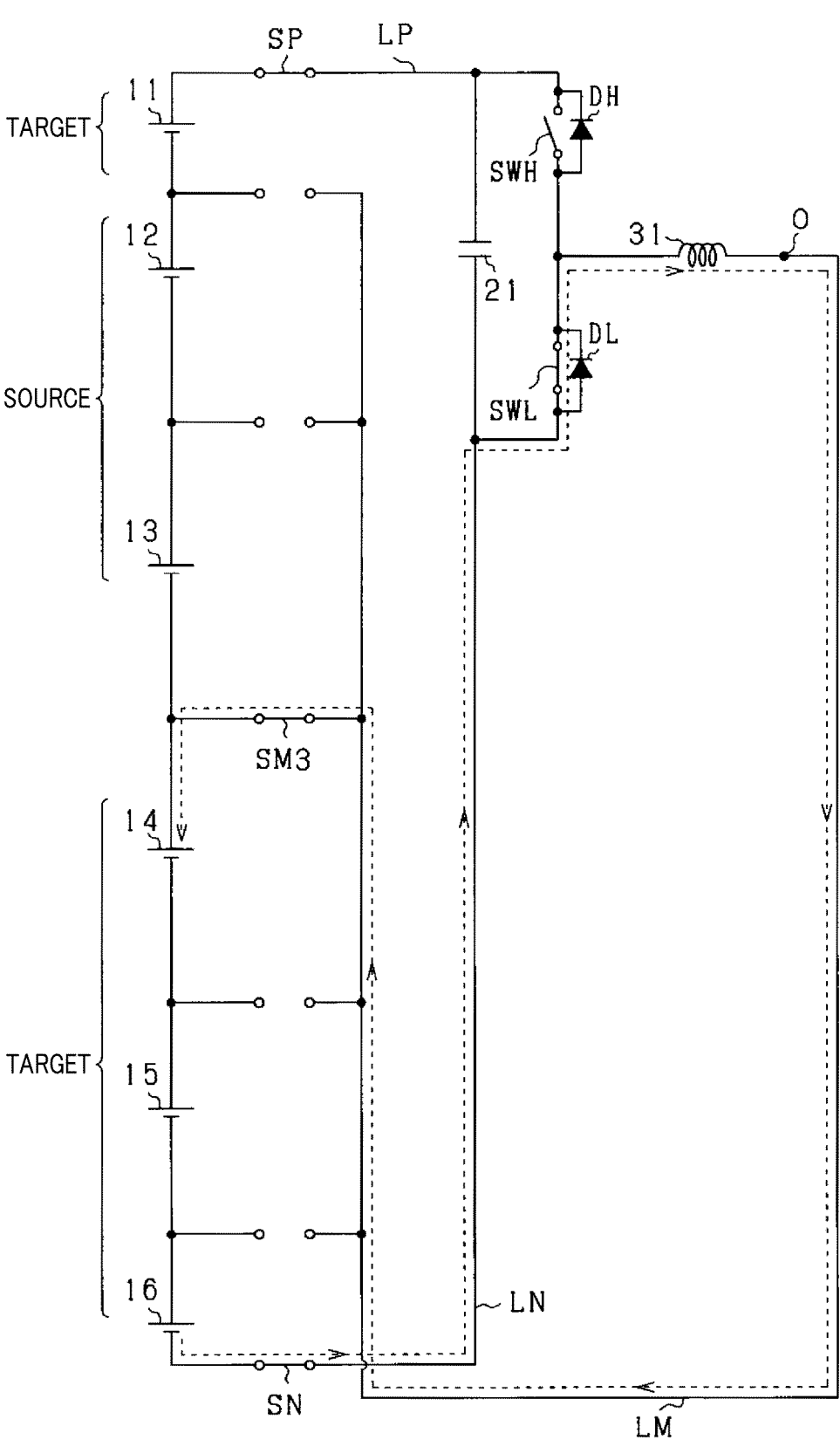
FIG. 10 illustrates a mode of electric power supply with a source charge storage unit located between target charge storage units.

As illustrated in FIG. 9, the control device 50 then turns on the positive electrode switch SP, the negative electrode switch SN, and the third neutral point switch SM3. The third neutral point switch SM3 is a switch connected to the lowest-potential cell connection point of the source charge storage units, or in other words, the third connection point PB3. The control device 50 then turns on the upper arm switch SWH and turns off the lower arm switch SWL. This switching causes magnetic energy to be accumulated in the stator winding 31 with the first to third charge storage units 11 to 13 serving as an energy source. As illustrated in FIG.

10, the control device 50 then turns off the upper arm switch SWH and turns on the lower arm switch SWL. This switching supplies a charging current based on the accumulated magnetic energy to the series-connection body of the fourth to sixth charge storage units 14 to 16. The fourth to sixth charge storage units 14 to 16 are the charge storage units lower in potential than the source charge storage units (the second and third charge storage units 12 and 13) in the first to sixth charge storage units 11 to 16. The switching states illustrated in FIGS. 9 and 10 alternate to supply electric power from the first to third charge storage units 11 to 13 to the fourth to sixth charge storage units 14 to 16.

The above-described control of the switching of the upper and lower arm switches SWH and SWL in the inverter 20 is performed to supply electric power from the second and third charge storage units 12 and 13 to the first and fourth to sixth charge storage units 11 and 14 to 16. In this case, the second and third charge storage units 12 and 13 release electric power in the switching state illustrated in FIG. 7 and the switching state illustrated in FIG. 9. As a result, the remaining power of the second and third charge storage units 12 and 13 decreases, and the remaining power of the first and fourth to sixth charge storage units 11 and 14 to 16 increases, which can narrow the differences between the capacity parameters of the charge storage units 11 to 16. Note that the power supply processing may be performed while source and target charge storage units are selected as appropriate until the difference between the maximum and the minimum values of the capacity parameters of the charge storage units 11 to 16 becomes equal to or smaller than a threshold.

It is noted that the second control in step S12 may be the control illustrated in FIGS. 11 to 14. FIGS. 11 to 14 illustrate the same case as in FIGS. 7 to 10, in which the second charge storage unit 12 and the third charge storage unit 13 are source charge storage units, and the first and fourth to sixth charge storage units 14 to 16 are target charge storage units.

Figure 11:
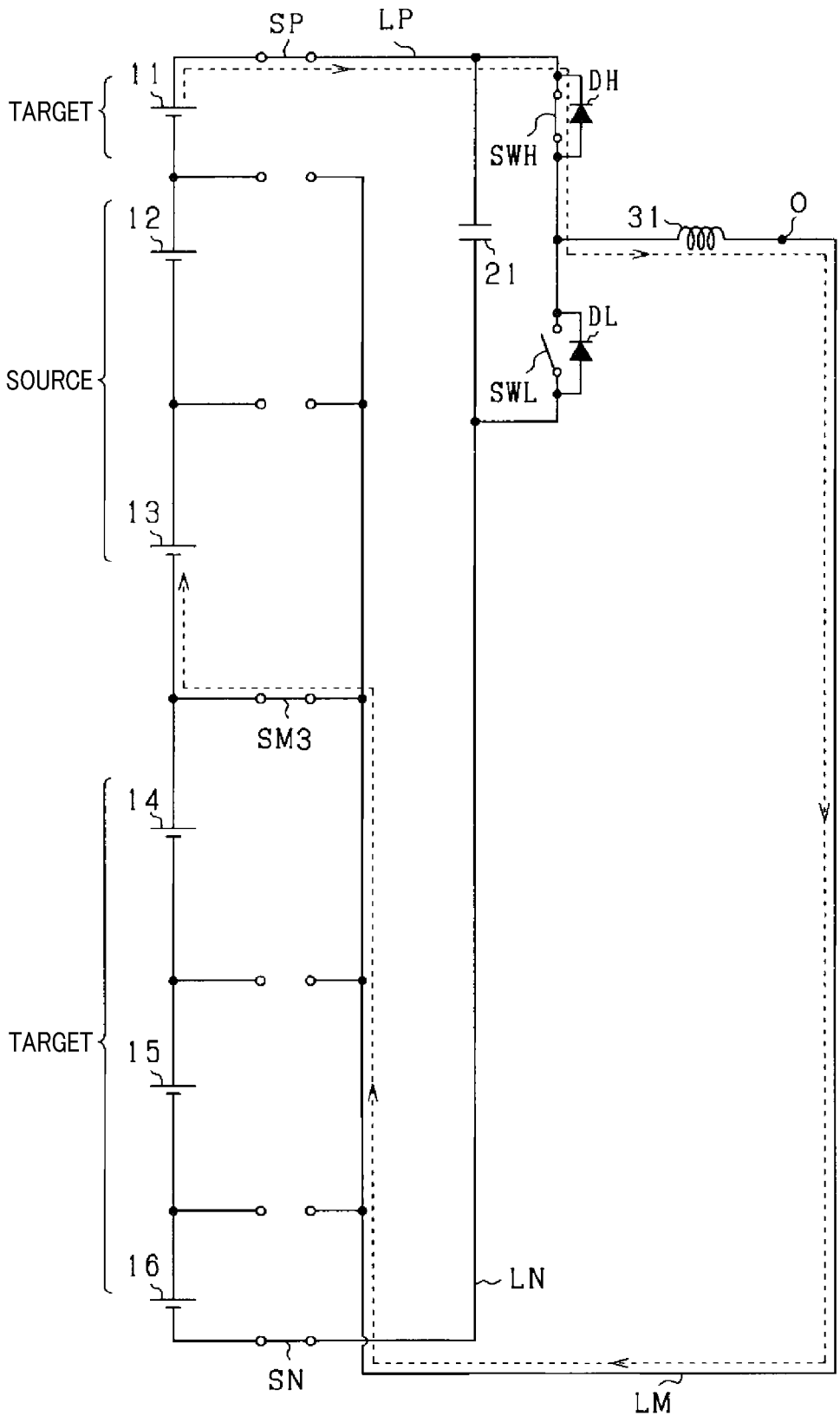
FIG. 11 illustrates a mode of electric power supply with a source charge storage unit located between target charge storage units.
Figure 12:
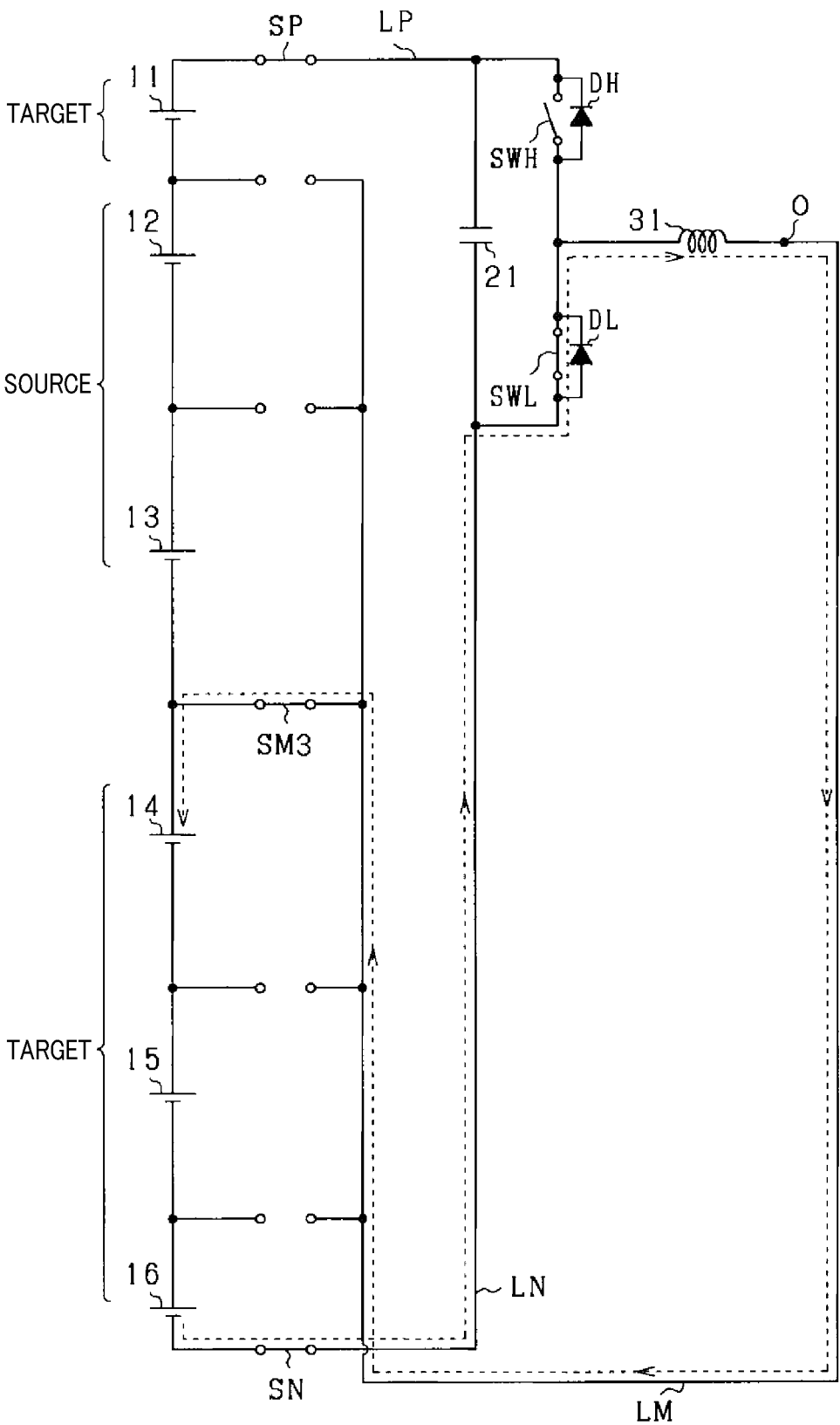
FIG. 12 illustrates a mode of electric power supply with a source charge storage unit located between target charge storage units.

As illustrated in FIG. 11, the control device 50 turns on the positive electrode switch SP, the negative electrode switch SN, and the third neutral point switch SM3 and turns off the first, second, fourth, and fifth neutral point switches SM1, SM2, SM4, and SM5. The third neutral point switch SM3 is a switch connected to the lowest-potential cell connection point of the source charge storage units, or in other words, the third connection point PB3. The control device 50 then turns on the upper arm switch SWH and turns off the lower arm switch SWL. This switching causes magnetic energy to be accumulated in the stator winding 31. As illustrated in FIG. 12, the control device 50 then turns off the upper arm switch SWH and turns on the lower arm switch SWL. This switching supplies a charging current based on the accumulated magnetic energy to the fourth to sixth charge storage units 14 to 16. The fourth to sixth charge storage units 14 to 16 are the charge storage units lower in potential than the source charge storage units (the second and third charge storage units 12 and 13) in the first to sixth charge storage units 11 to 16. The switching states illustrated in FIGS. 11 and 12 alternate to supply electric power from the first to third charge storage units 11 to 13 to the fourth to sixth charge storage units 14 to 16.

Figure 13:
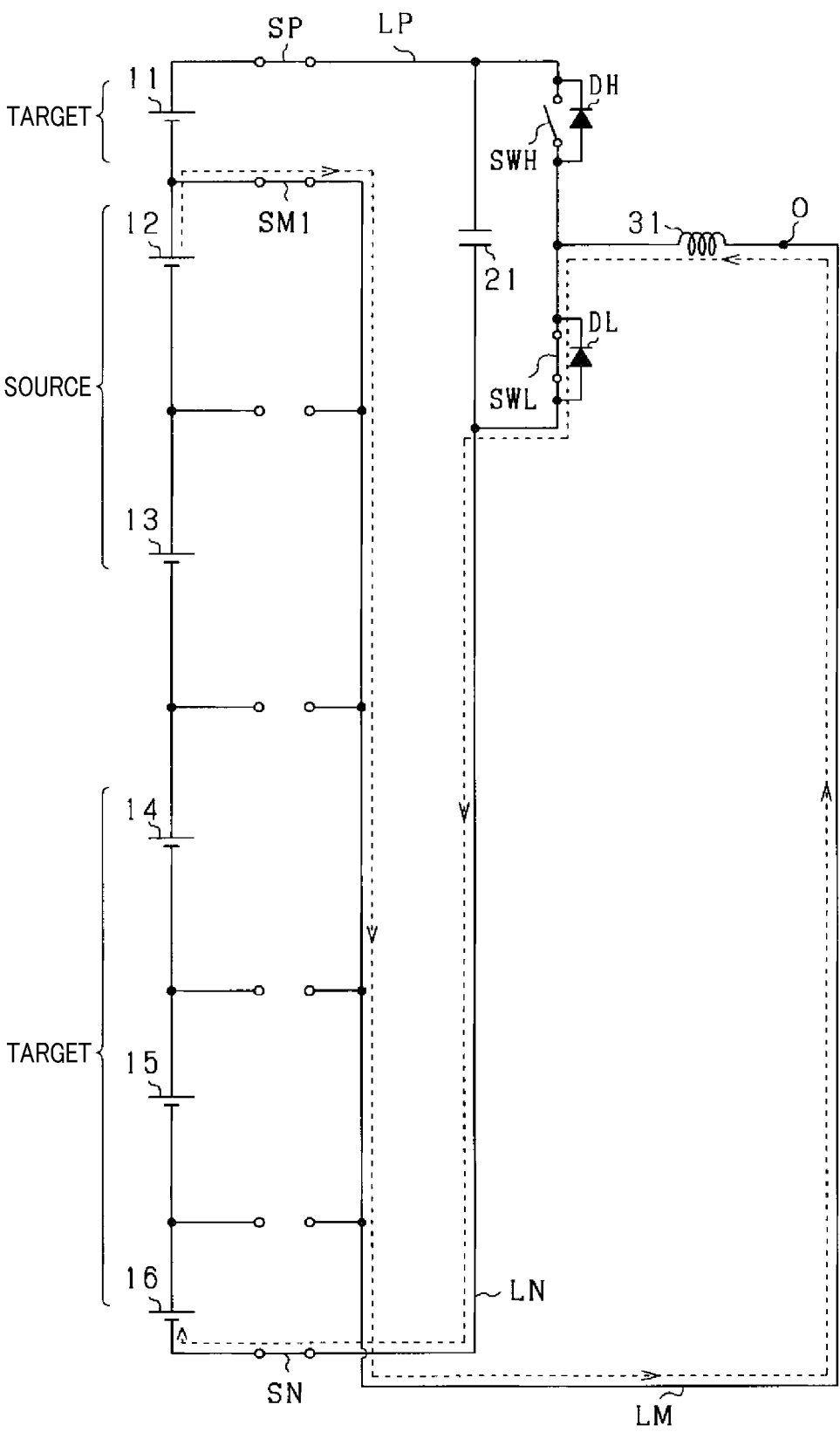
FIG. 13 illustrates a mode of electric power supply with a source charge storage unit located between target charge storage units.
Figure 14:
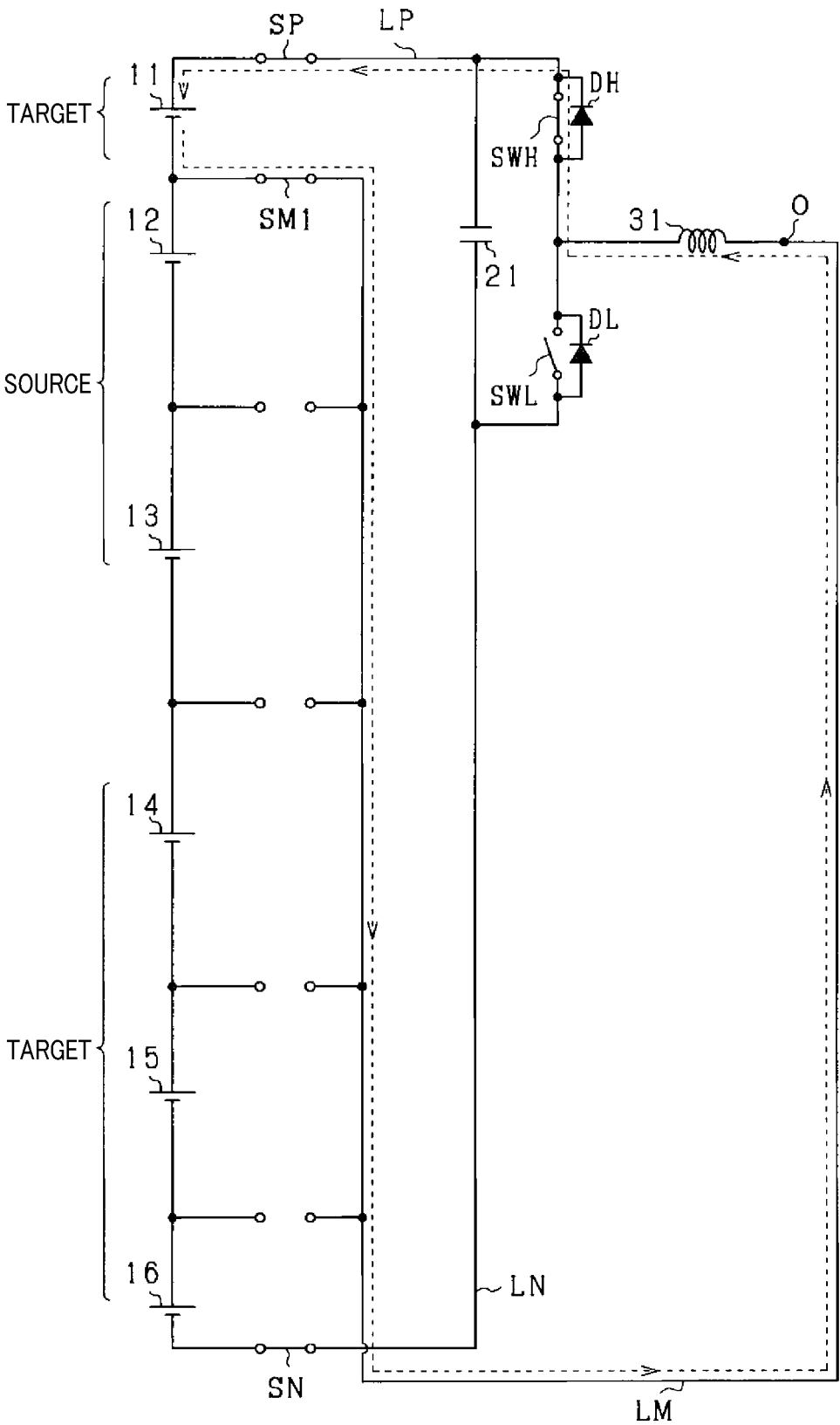
FIG. 14 illustrates a mode of electric power supply with a source charge storage unit located between target charge storage units.

As illustrated in FIG. 13, the control device 50 then turns on the positive electrode switch SP, the negative electrode switch SN, and the first neutral point switch SM1. The first neutral point switch SM1 is a switch connected to the highest-potential cell connection point of the source charge storage units, or in other words, the first connection point PB1. The control device 50 then turns off the upper arm switch SWH and turns on the lower arm switch SWL. This switching causes magnetic energy to be accumulated in the stator winding 31. As illustrated in FIG. 14, the control device 50 then turns on the upper arm switch SWH and turns off the lower arm switch SWL. This switching supplies a charging current based on the accumulated magnetic energy to the first charge storage unit 11. The first charge storage unit 11 is the charge storage unit higher in potential than the source charge storage units (the second and third charge storage units 12 and 13) in the first to sixth charge storage units 11 to 16. The switching states illustrated in FIGS. 13 and 14 alternate to supply electric power from the second to sixth charge storage units 12 to 16 to the first charge storage unit 11.

The above-described control of the switching of the upper and lower arm switches SWH and SWL in the inverter 20 is performed to supply electric power from the second and third charge storage units 12 and 13 to the first and fourth to sixth charge storage units 11 and 14 to 16. In this case, the second and third charge storage units 12 and 13 release electric power in the switching state illustrated in FIG. 11 and the switching state illustrated in FIG. 13. As a result, the remaining power of the second and third charge storage units 12 and 13 decreases, and the remaining power of the first and fourth to sixth charge storage units 11 and 14 to 16 increases, which can narrow the differences between the capacity parameters of the charge storage units 11 to 16.

Second Embodiment

Figure 15:
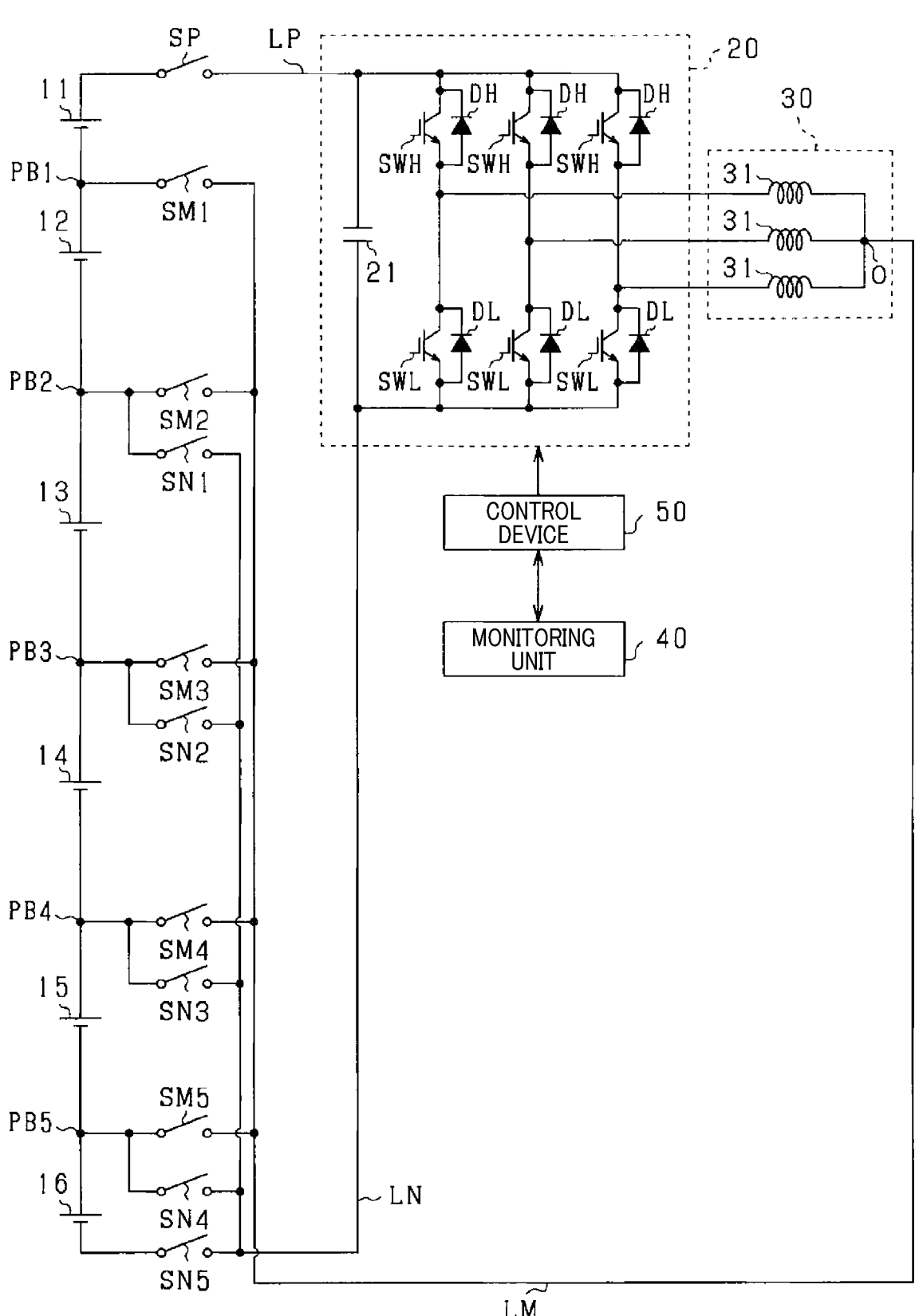
FIG. 15 is an overall configuration diagram of a power conversion device according to a second embodiment.

A second embodiment will now be described with reference to the drawings by focusing on differences from the first embodiment. In the present embodiment, as illustrated in FIG. 15, the power conversion device includes first to fifth negative electrode switches SN1 to SN5. In the present embodiment, the negative electrode switches SN1 to SN5 are relays and turned on or off by the control device 50. In FIG. 15, the same components as illustrated in FIG. 1 are designated by the same reference numerals for convenience.

The n-th negative electrode switch SNn (n=1, 2, 3, 4, 5) connects the negative electrode terminal of the (n+1)-th charge storage unit and the low potential path LN. When the n-th negative electrode switch SNn is turned on, the negative electrode terminal of the (n+1)-th charge storage unit and the low potential path LN are electrically connected to each other. When the n-th negative electrode switch SNn is turned off, the negative electrode terminal of the (n+1)-th charge storage unit and the low potential path LN are electrically disconnected from each other.

The control device 50 performs the first control and the second control as in the flowchart illustrated in FIG. 2. The first control is the same control as the first control described in the first embodiment.

Referring to FIGS. 16 to 19, the following describes the second control in a case in which the second charge storage unit 12 and the third charge storage unit 13 are source charge storage units, and the first and fourth to sixth charge storage units 14 to 16 are target charge storage units.

Figure 16:
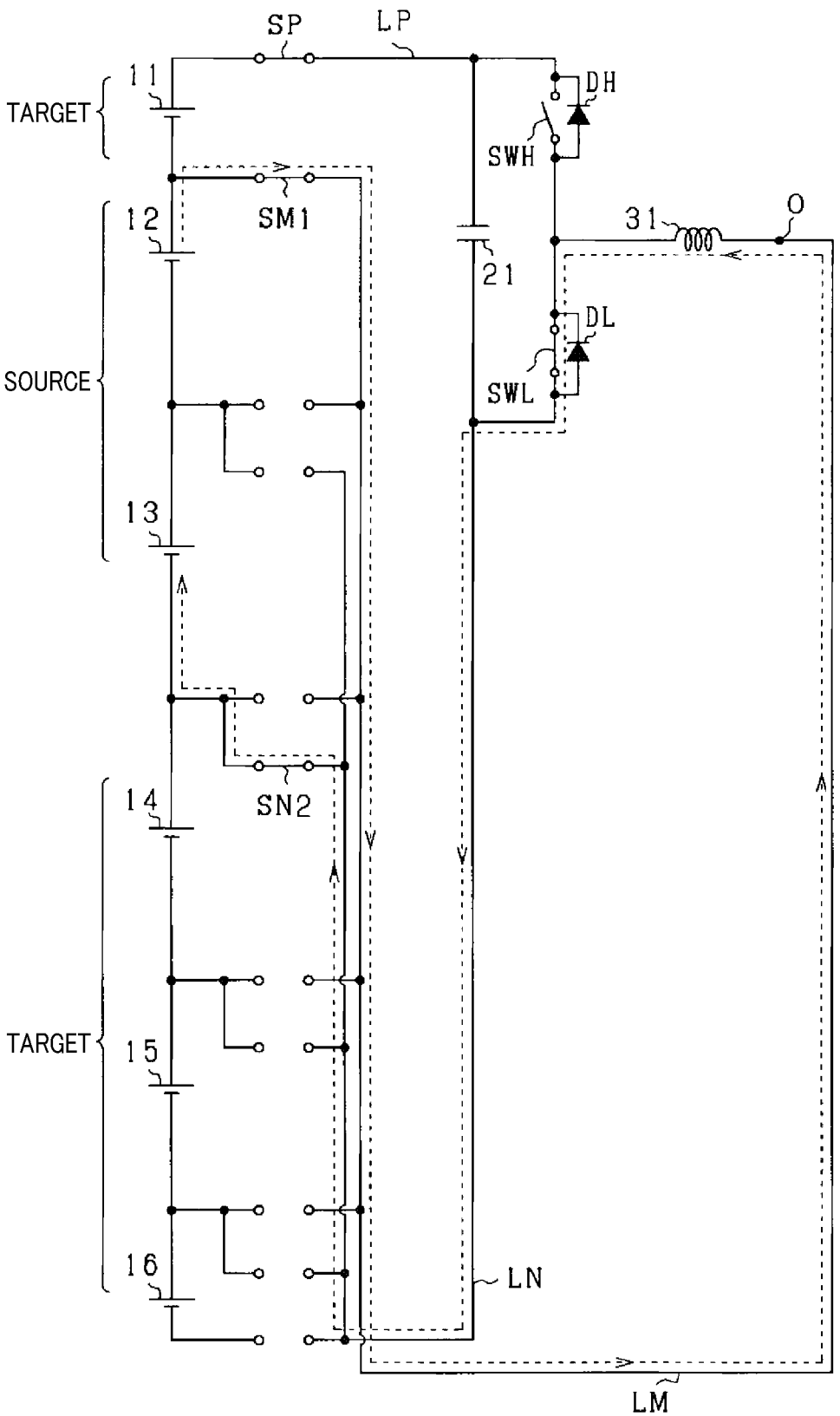
FIG. 16 illustrates a mode of electric power supply with a source charge storage unit located between target charge storage units.
Figure 17:
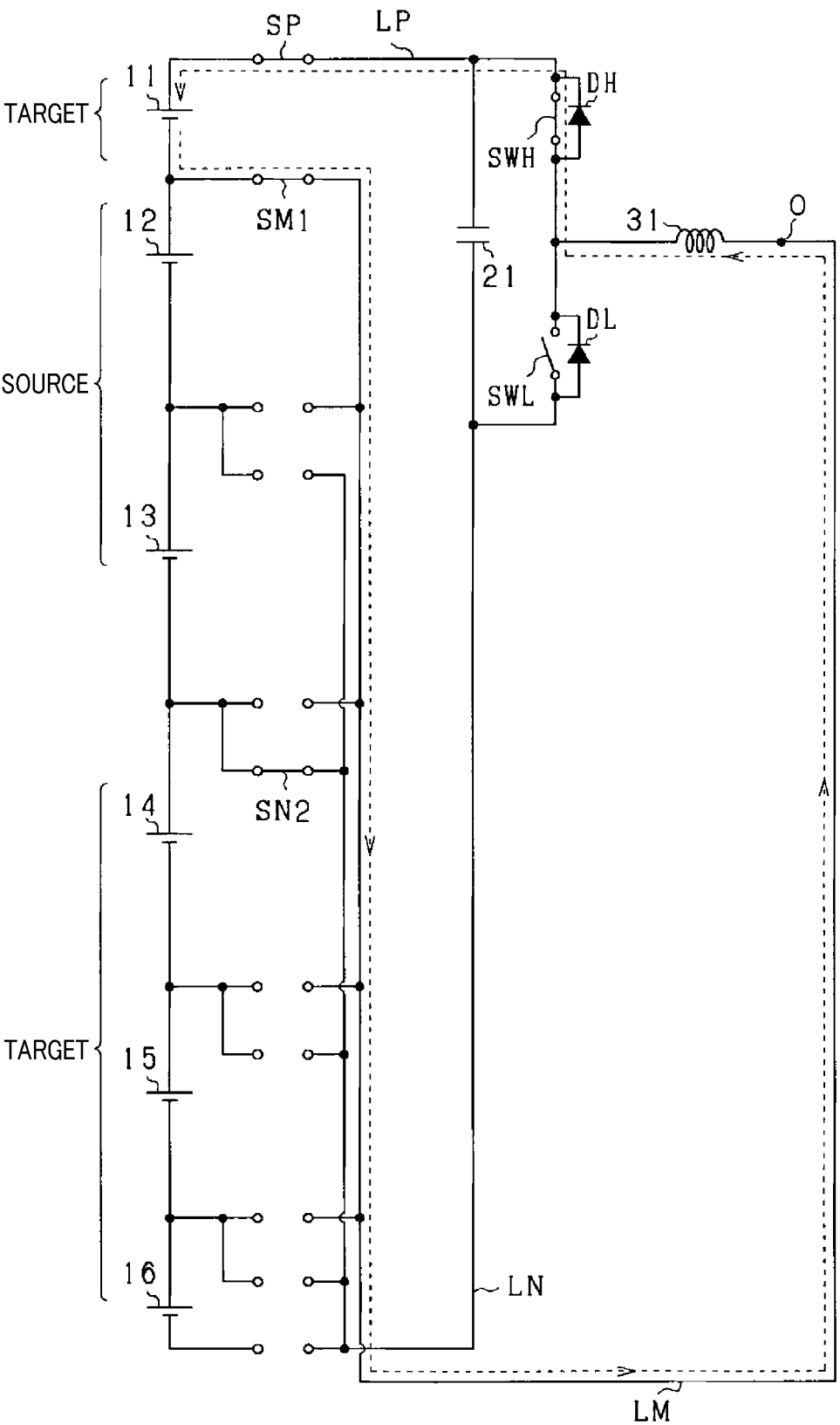
FIG. 17 illustrates a mode of electric power supply with a source charge storage unit located between target charge storage units.

As illustrated in FIG. 16, the control device 50 turns on the positive electrode switch SP, the first neutral point switch SM1, and the second negative electrode switch SN2 and turns off the second to fifth neutral point switches SM2 to SM5 and the first and third to fifth negative electrode switches SN1 and SN3 to SN5. The control device 50 then turns on the lower arm switch SWL and turns off the upper arm switch SWH. This switching causes magnetic energy to be accumulated in the stator winding 31 with the second and third charge storage units 12 and 13 serving as an energy source. As illustrated in FIG. 17, the control device 50 then turns on the upper arm switch SWH and turns off the lower arm switch SWL. This switching supplies a charging current based on the accumulated magnetic energy to the first charge storage unit 11. The switching states illustrated in FIGS. 16 and 17 alternate to supply electric power from the second and third charge storage units 12 and 13 to the first charge storage unit 11. In this case, no charging current flows through the fourth to sixth charge storage units 14 to 16, which are lower in potential than the source charge storage units, thus enabling a reduction in losses in the power conversion device and suppression of the progress of deterioration in the charge storage units.

Figure 18:
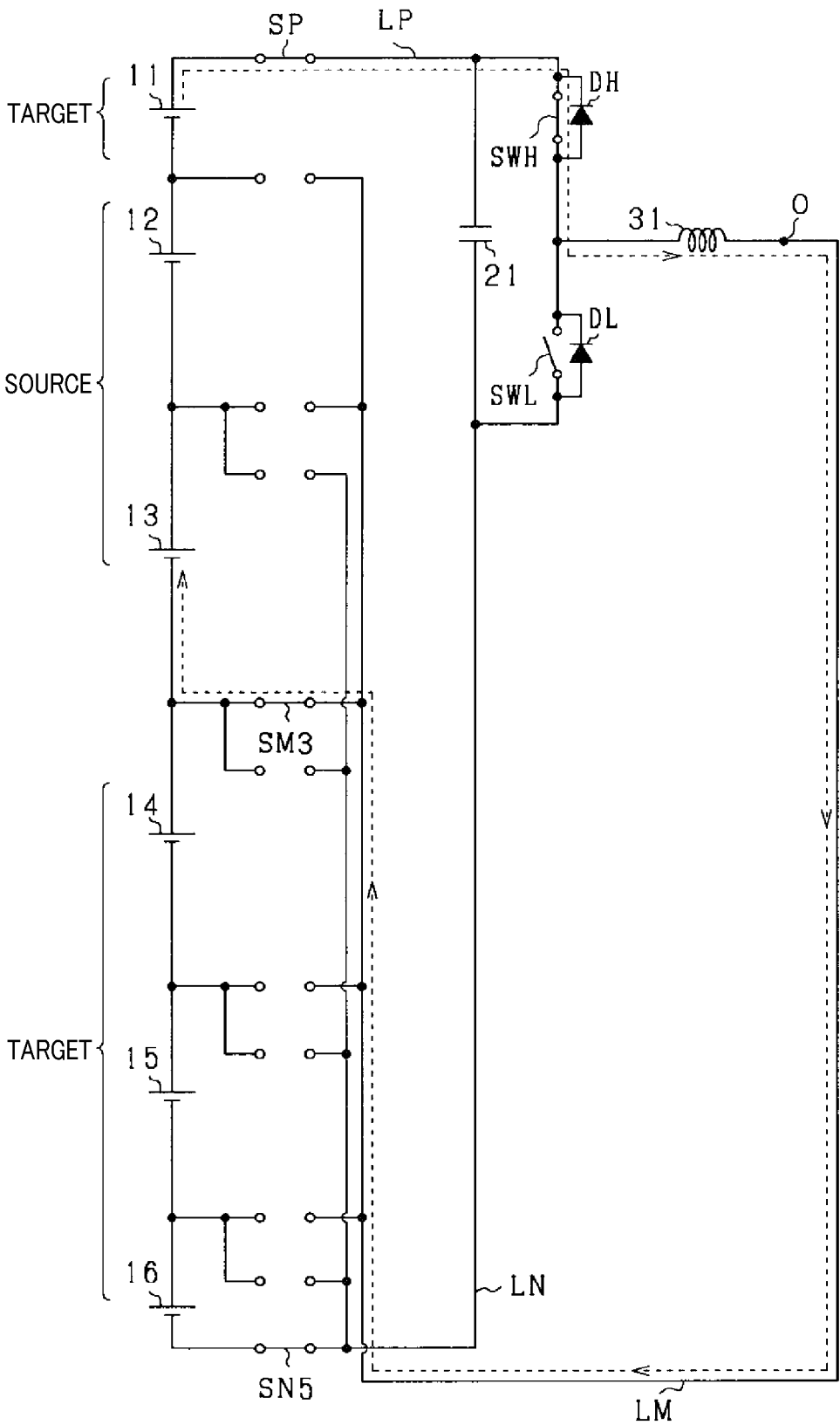
FIG. 18 illustrates a mode of electric power supply with a source charge storage unit located between target charge storage units.
Figure 19:
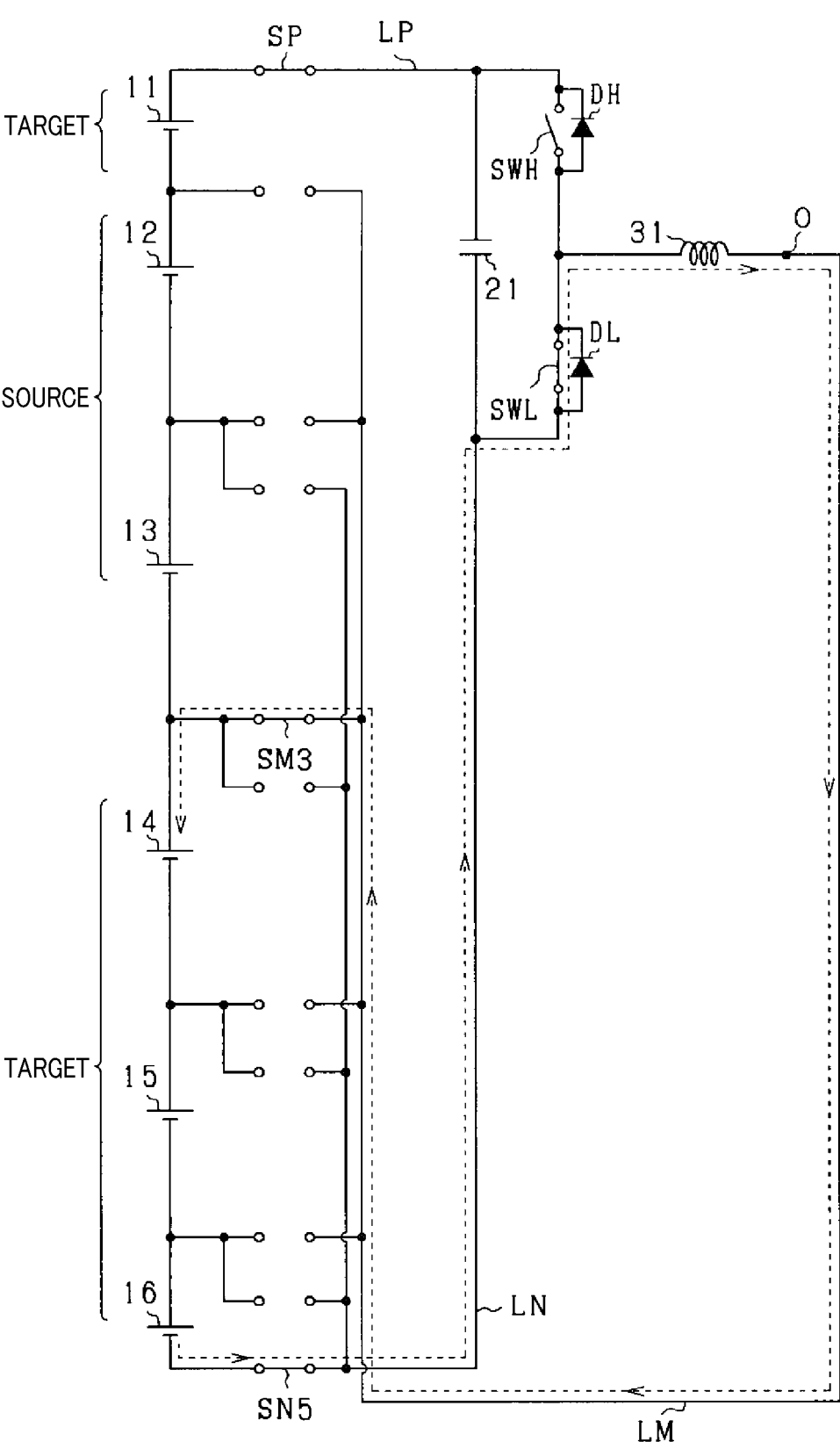
FIG. 19 illustrates a mode of electric power supply with a source charge storage unit located between target charge storage units.

As illustrated in FIG. 18, the control device 50 then turns on the positive electrode switch SP, the fifth negative electrode switch SN5, and the third neutral point switch SM3. The control device 50 then turns on the upper arm switch SWH and turns off the lower arm switch SWL. This switching causes magnetic energy to be accumulated in the stator winding 31 with the first to third charge storage units 11 to 13 serving as an energy source. As illustrated in FIG. 19, the control device 50 then turns off the upper arm switch SWH and turns on the lower arm switch SWL. This switching supplies a charging current based on the accumulated magnetic energy to the series-connection body of the fourth to sixth charge storage units 14 to 16. The switching states illustrated in FIGS. 18 and 19 alternate to supply electric power from the first to third charge storage units 11 to 13 to the fourth to sixth charge storage units 14 to 16.

The above-described control of the switching of the upper and lower arm switches SWH and SWL in the inverter 20 is performed to supply electric power from the second and third charge storage units 12 and 13 to the first and fourth to sixth charge storage units 11 and 14 to 16. This supply of power can narrow the differences between the capacity parameters of the charge storage units 11 to 16.

Third Embodiment

Figure 20:
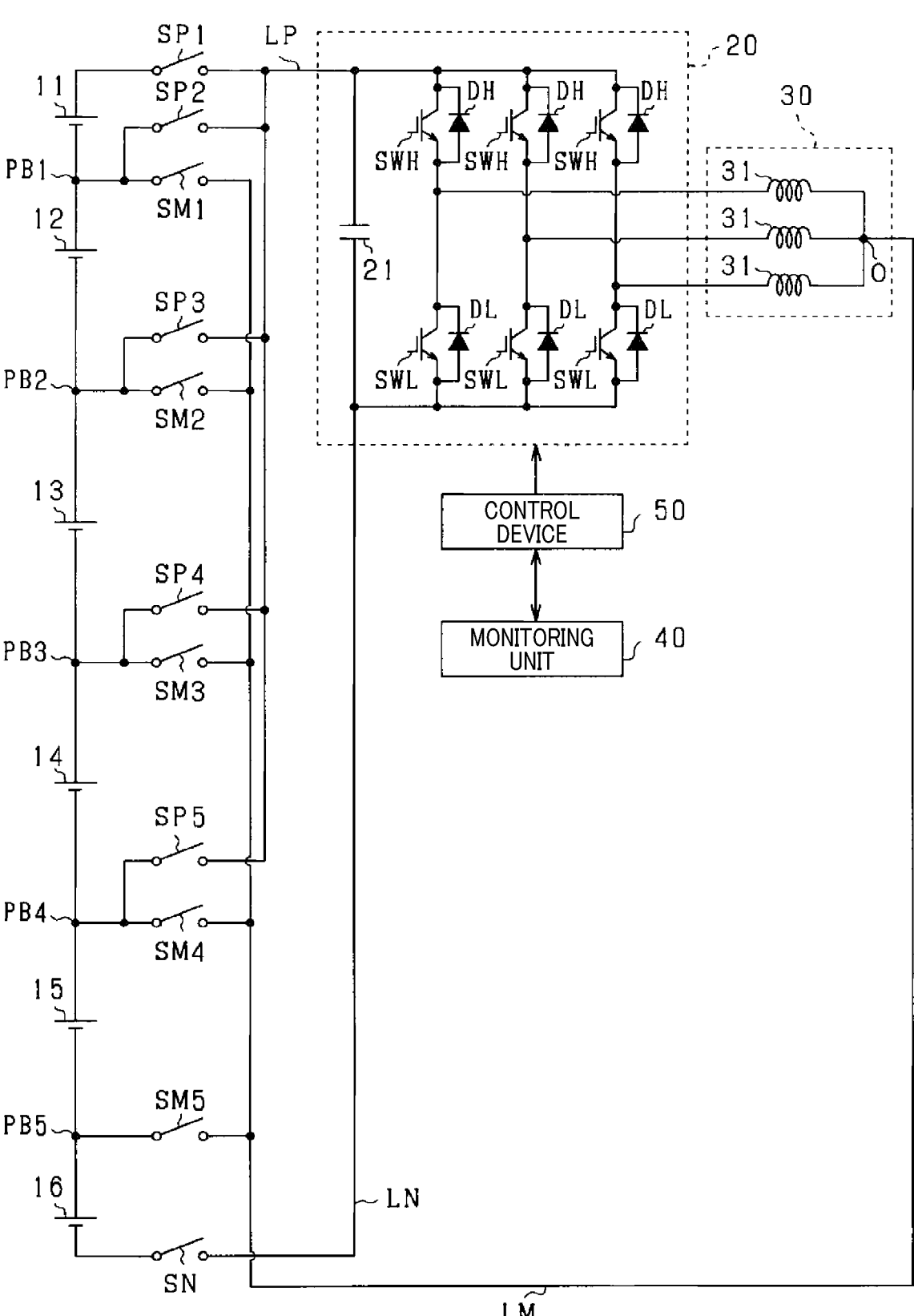
FIG. 20 is an overall configuration diagram of a power conversion device according to a third embodiment.

A third embodiment will now be described with reference to the drawings by focusing on differences from the second embodiment. In the present embodiment, as illustrated in FIG. 20, the power conversion device includes first to fifth positive electrode switches SP1 to SP5 in place of the first to fifth negative electrode switches SN1 to SN5. In the present embodiment, the positive electrode switches SP1 to SP5 are relays and turned on or off by the control device 50. In FIG. 20, the same components as illustrated in FIG. 15 are designated by the same reference numerals for convenience.

The n-th positive electrode switch SPn (n=1, 2, 3, 4, 5) connects the positive electrode terminal of the n-th charge storage unit and the high potential path LP. When the n-th positive electrode switch SPn is turned on, the positive electrode terminal of the n-th charge storage unit and the high potential path LP are electrically connected to each other. When the n-th positive electrode switch SPn is turned off, the positive electrode terminal of the n-th charge storage unit and the high potential path LP are electrically disconnected from each other.

The control device 50 performs the first control and the second control as in the flowchart illustrated in FIG. 2. The first control is the same control as the first control described in the first embodiment.

Referring to FIGS. 21 to 24, the following describes the second control in a case in which the third and fourth charge storage units 13 and 14 are source charge storage units, and the first, second, fifth, and sixth charge storage units 11, 12, 15, and 16 are target charge storage units.

Figure 21:
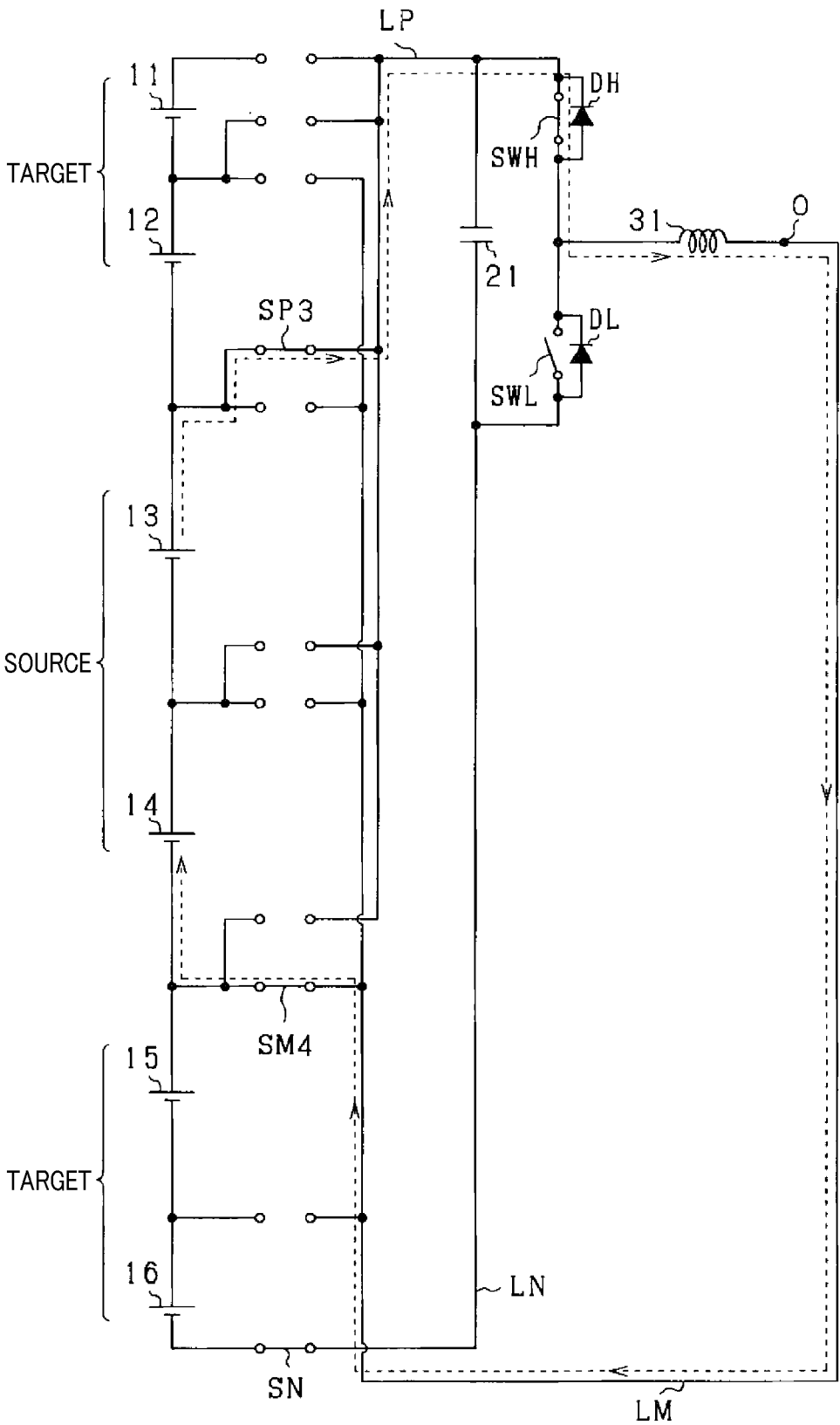
FIG. 21 illustrates a mode of electric power supply with a source charge storage unit located between target charge storage units.
Figure 22:
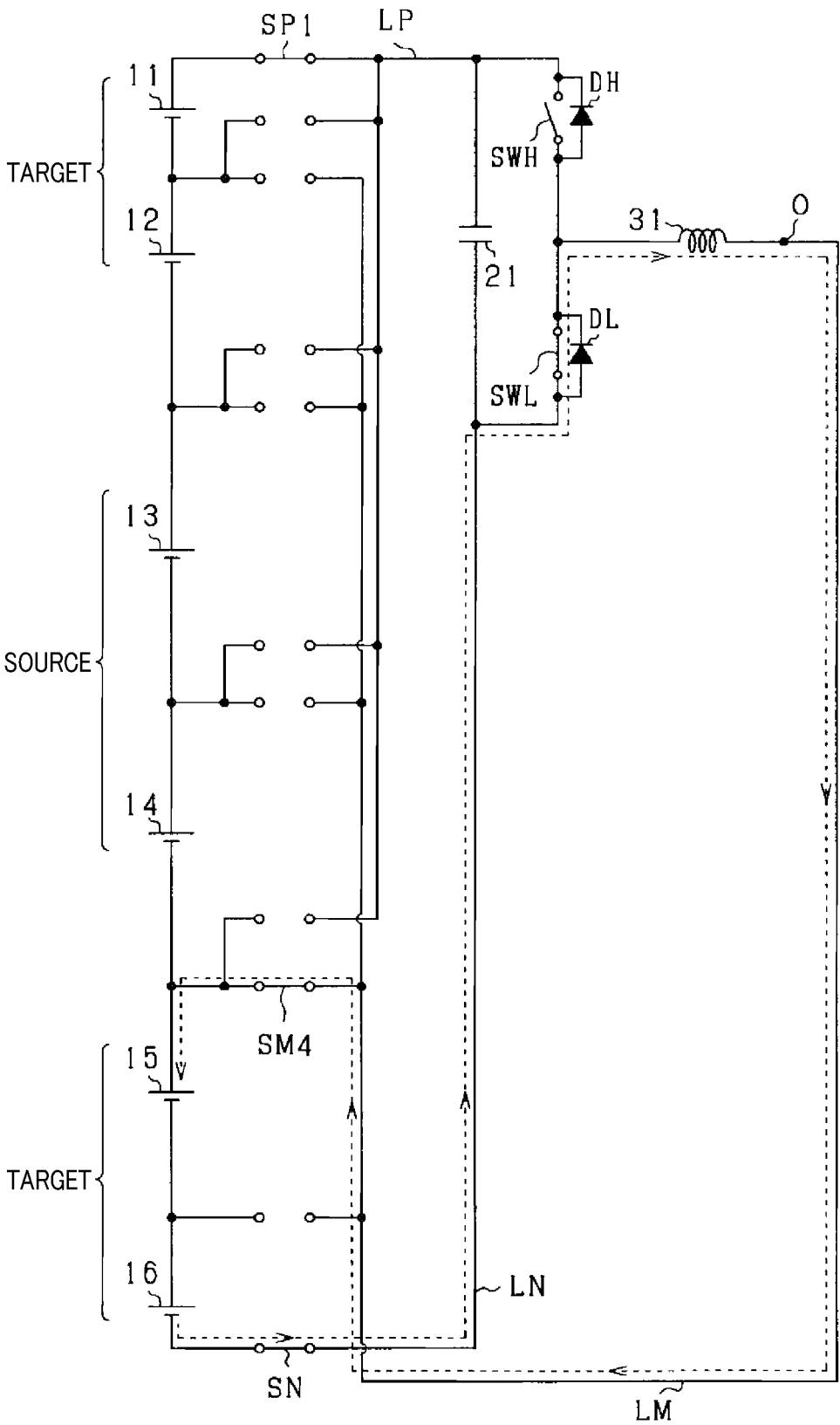
FIG. 22 illustrates a mode of electric power supply with a source charge storage unit located between target charge storage units.

As illustrated in FIG. 21, the control device 50 turns on the third positive electrode switch SP3, the negative electrode switch SN, and the fourth neutral point switch SM4 and turns off the first, second, fourth, and fifth positive electrode switches SP1, SP2, SP4, and SP5 and the first to third and fifth neutral point switches SM1 to SM3 and SM5. The control device 50 then turns on the upper arm switch SWH and turns off the lower arm switch SWL. This switching causes magnetic energy to be accumulated in the stator winding 31 with the third and fourth charge storage units 13 and 14 serving as an energy source. As illustrated in FIG. 22, the control device 50 then turns off the upper arm switch SWH and turns on the lower arm switch SWL. This switching supplies a charging current based on the accumulated magnetic energy to the fifth and sixth charge storage units 15 and 16. The switching states illustrated in FIGS. 21 and 22 alternate to supply electric power from the third and fourth charge storage units 13 and 14 to the fifth and sixth charge storage units 15 and 16. In this case, no charging current flows through the first and second charge storage units 11 and 12, which are higher in potential than the source charge storage units, thus enabling a reduction in losses in the power conversion device and suppression of the progress of deterioration in the charge storage units.

Figure 23:
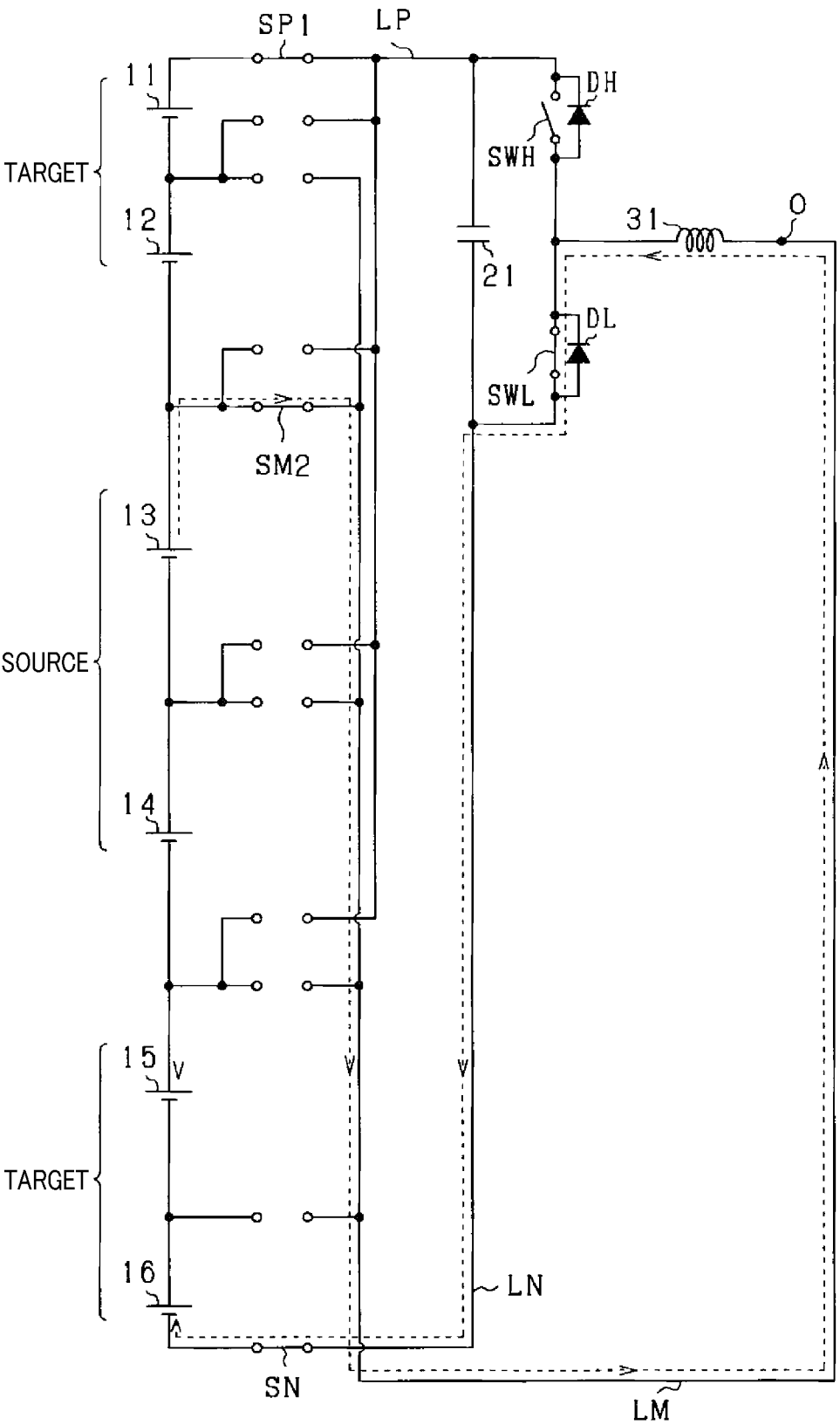
FIG. 23 illustrates a mode of electric power supply with a source charge storage unit located between target charge storage units.
Figure 24:
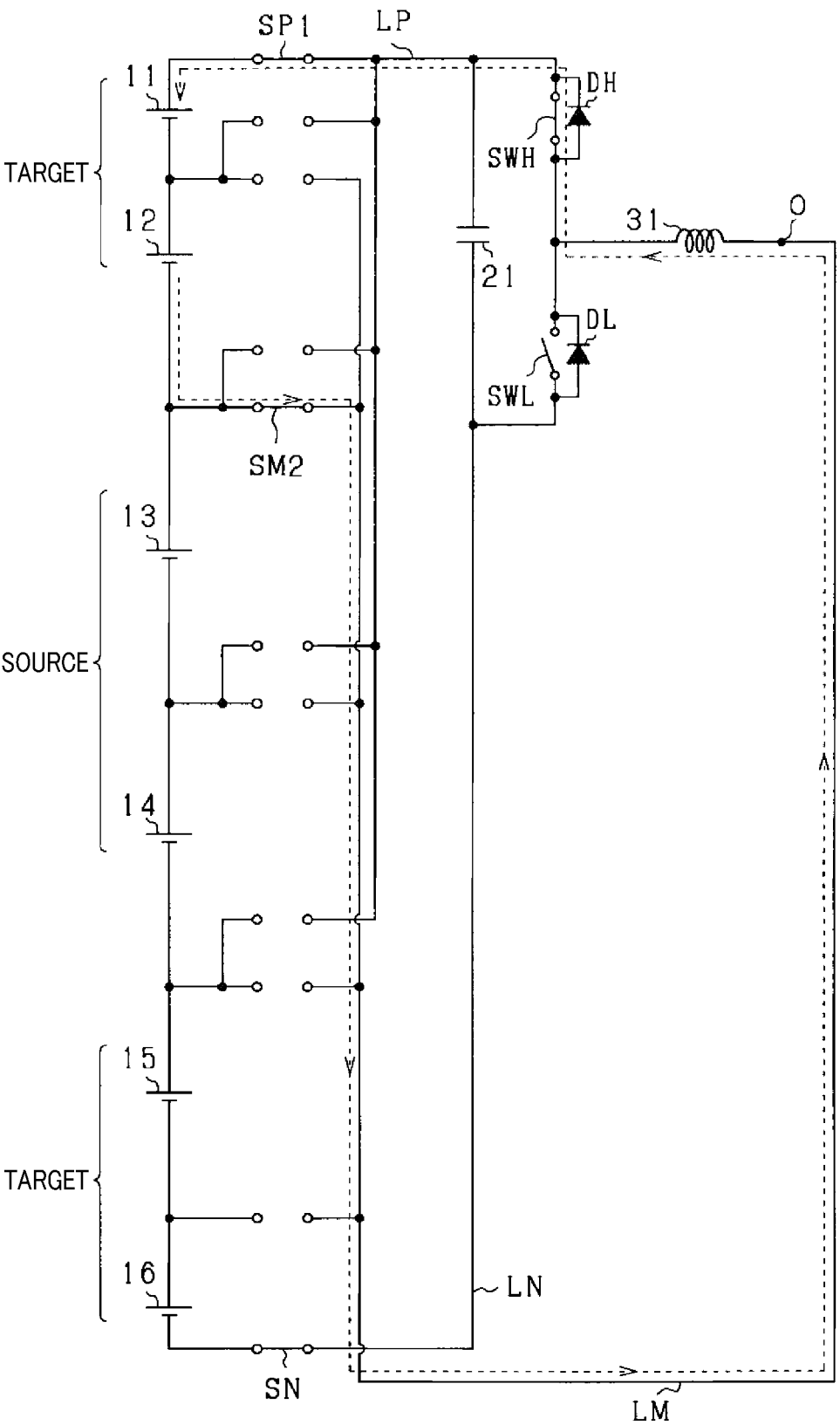
FIG. 24 illustrates a mode of electric power supply with a source charge storage unit located between target charge storage units.

As illustrated in FIG. 23, the control device 50 then turns on the first positive electrode switch SP1, the negative electrode switch SN, and the second neutral point switch SM2. The control device 50 then turns off the upper arm switch SWH and turns on the lower arm switch SWL. This switching causes magnetic energy to be accumulated in the stator winding 31 with the third to sixth charge storage units 13 to 16 serving as an energy source. As illustrated in FIG. 24, the control device 50 then turns on the upper arm switch SWH and turns off the lower arm switch SWL. This switching supplies a charging current based on the accumulated magnetic energy to the series-connection body of the first and second charge storage units 11 and 12. The switching states illustrated in FIGS. 23 and 24 alternate to supply electric power from the third to sixth charge storage units 13 to 16 to the first and second charge storage units 11 and 12.

The above-described control of the switching of the upper and lower arm switches SWH and SWL in the inverter 20 is performed to supply electric power from the third and fourth charge storage units 13 and 14 to the first, second, fifth, and sixth charge storage units 11, 12, 15, and 16. This supply of power can narrow the differences between the capacity parameters of the charge storage units 11 to 16.

Fourth Embodiment

Figure 25:
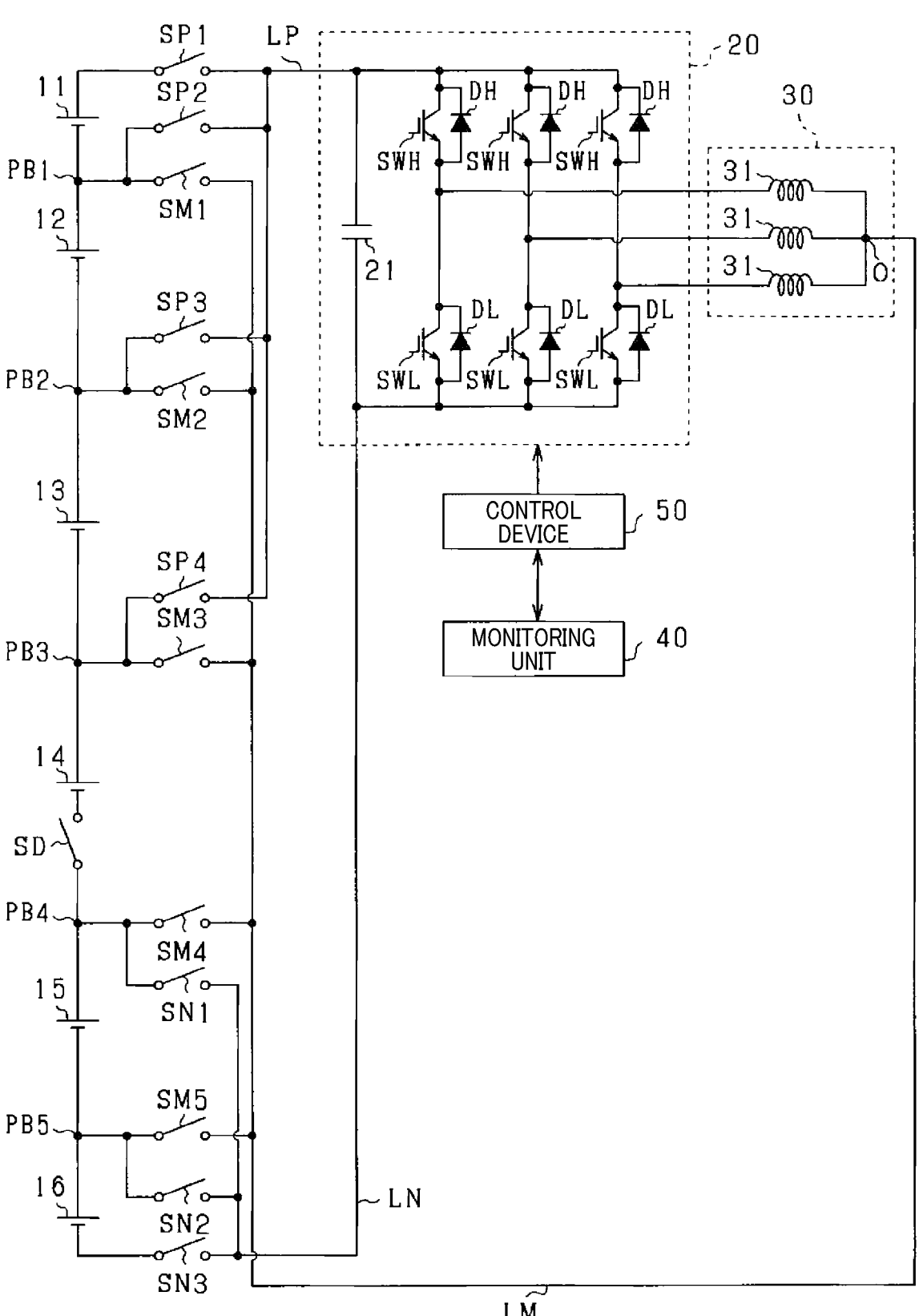
FIG. 25 is an overall configuration diagram of a power conversion device according to a fourth embodiment.

A fourth embodiment will now be described with reference to the drawings by focusing on differences from the first embodiment. In the present embodiment, as illustrated in FIG. 25, the power conversion device includes first to fourth positive electrode switches SP1 to SP4, first to third negative electrode switches SN1 to SN3, and an inter-cell switch SD. In the present embodiment, the positive electrode switches SP1 to SP4, the negative electrode switches SN1 to SN3, and the inter-cell switch SD are relays and turned on or off by the control device 50. In FIG. 25, the same components as illustrated in FIG. 1 are designated by the same reference numerals for the sake of convenience.

Of the charge storage units 11 to 16 constituting the battery in the present embodiment, the first to fourth charge storage units 11 to 14 at higher potentials correspond to high potential charge storage units, whereas the remaining fifth and sixth charge storage units 15 and 16 correspond to low potential charge storage units.

The first positive electrode switch SP1 connects the positive electrode terminal of the first charge storage unit 11 and the high potential path LP. The n-th positive electrode switch SPn (n=2, 3, 4) connects the (n−1)-th connection point PBn−1 and the high potential path LP. When the n-th positive electrode switch SPn is turned on, the positive electrode terminal of the n-th charge storage unit and the high potential path LP are electrically connected to each other. When the n-th positive electrode switch SPn is turned off, the positive electrode terminal of the n-th charge storage unit and the high potential path LP are electrically disconnected from each other.

The m-th negative electrode switch SNm (m=1, 2) connects the (m+3)-th connection point PBm+3 and the low potential path LN. When the m-th negative electrode switch SNm is turned on, the positive electrode terminal of the (m+4)-th charge storage unit and the low potential path LN are electrically connected to each other. When the m-th negative electrode switch SNm is turned off, the positive electrode terminal of the (m+4)-th charge storage unit and the low potential path LN are electrically disconnected from each other. The third negative electrode switch SN3 connects the negative electrode terminal of the sixth charge storage unit 16 and the low potential path LN.

The inter-cell switch SD connects the negative electrode terminal of the fourth charge storage unit 14 and the fourth connection point PB4. When the inter-cell switch SD is turned on, the negative electrode terminal of the fourth charge storage unit 14 and the fourth connection point PB4 are electrically connected to each other. When the inter-cell switch SD is turned off, the negative electrode terminal of the fourth charge storage unit 14 and the fourth connection point PB4 are electrically disconnected from each other. The inter-cell switch SD may be provided between the positive electrode terminal of the fourth charge storage unit 14 and the third connection point PB3 instead of between the negative electrode terminal of the fourth charge storage unit 14 and the fourth connection point PB4. In the present embodiment, the fourth charge storage unit 14 corresponds to a specific charge storage unit.

The control device 50 selects, from the charge storage units 11 to 16, one charge storage unit or some charge storage units connected in series as a source charge storage unit, and selects, from the charge storage units 11 to 16, one of the charge storage units other than the source charge storage unit or some of the charge storage units connected in series other than the source charge storage unit as a target charge storage unit. On the basis of information acquired from the monitoring unit 40, the control device 50, for example, selects the charge storage unit having the greatest capacity parameter in the charge storage units 11 to 16 as a source charge storage unit, and selects the charge storage unit having the smallest capacity parameter as a target charge storage unit. The control device 50 also selects, from the charge storage units 11 to 16, one charge storage unit other than the source charge storage unit and the target charge storage unit or some charge storage units connected in series other than the source charge storage unit and the target charge storage unit as a temporary target charge storage unit.

Figure 26:
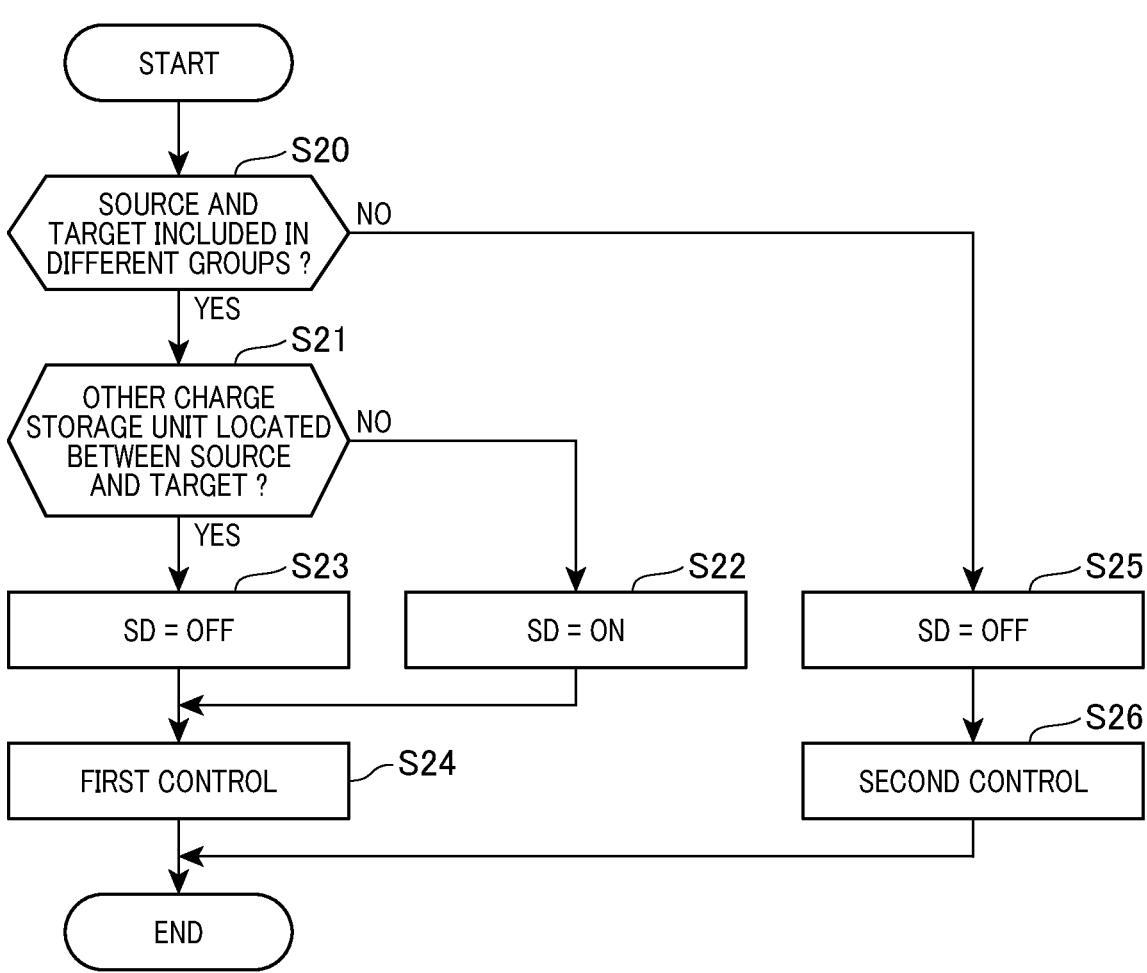
FIG. 26 is a flowchart illustrating a procedure of power transfer processing.

FIG. 26 illustrates a procedure of power supply processing performed by the control device 50.

In step S20, it is determined whether one of the following conditions is satisfied: the condition that the source charge storage unit belongs to a high potential group and the target charge storage unit belongs to a low potential group, and the condition that the source charge storage unit belongs to a low potential group and the target charge storage unit belongs to a high potential group. The high potential group is a group of the first to fourth charge storage units 11 to 14, which are higher in potential than the inter-cell switch SD in the charge storage units 11 to 16. The low potential group is a group of the fifth and sixth charge storage units 15 and 16, which are lower in potential than the inter-cell switch SD in the charge storage units 11 to 16. For example, in a state in which the second charge storage unit 12 is a source charge storage unit, and the fifth charge storage unit 15 is a target charge storage unit or in a state in which the fourth charge storage unit 14 is a source charge storage unit, and the fifth charge storage unit 15 is a target charge storage unit, the determination result in step S20 is affirmative.

In step S20, if the determination result is affirmative, the processing proceeds to step S21 to determine whether another charge storage unit is located between the source charge storage unit and the target charge storage unit. For example, if the second charge storage unit 12 is a source charge storage unit, and the fifth charge storage unit 15 is a target charge storage unit, the third and fourth charge storage units 13 and 14 are located between the second charge storage unit 12 and the fifth charge storage unit 15, and thus the determination result in step S21 is affirmative. In contrast, for example, if the fourth charge storage unit 14 is a source charge storage unit, and the fifth charge storage unit 15 is a target charge storage unit, no charge storage unit is located between the fourth charge storage unit 14 and the fifth charge storage unit 15, and thus the determination result in step S21 is negative.

If the determination result in step S21 is negative, the processing proceeds to step S22 to turn on the inter-cell switch SD. In contrast, if the determination result in step S21 is affirmative, the processing proceeds to step S23 to turn off the inter-cell switch SD. The inter-cell switch SD is turned off in order to prevent a short circuit between the positive electrode terminal and the negative electrode terminal of a charge storage unit during the first control in step S24.

Figure 27:
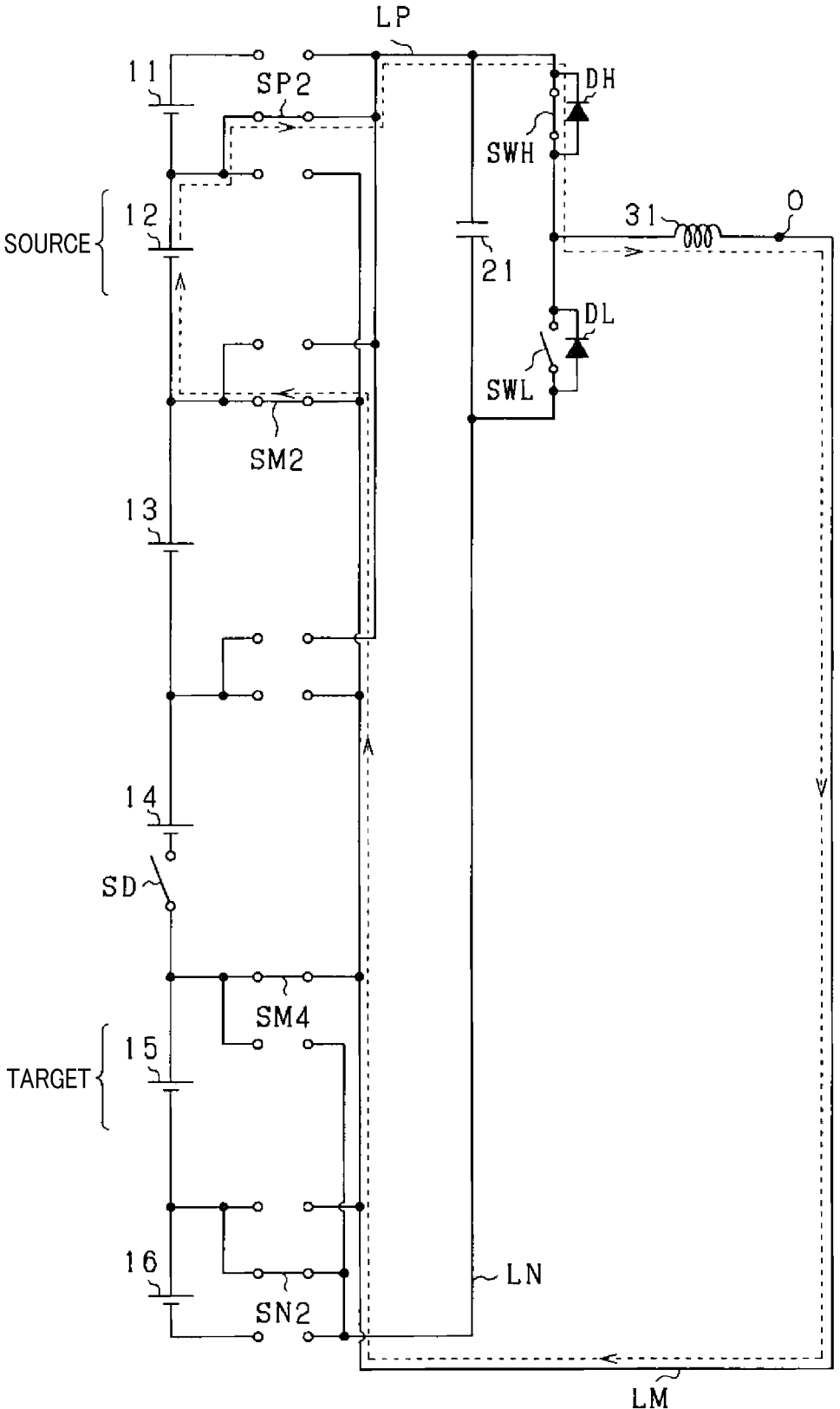
FIG. 27 illustrates a mode of electric power supply with a source charge storage unit and a target charge storage unit belonging to different groups.
Figure 28:
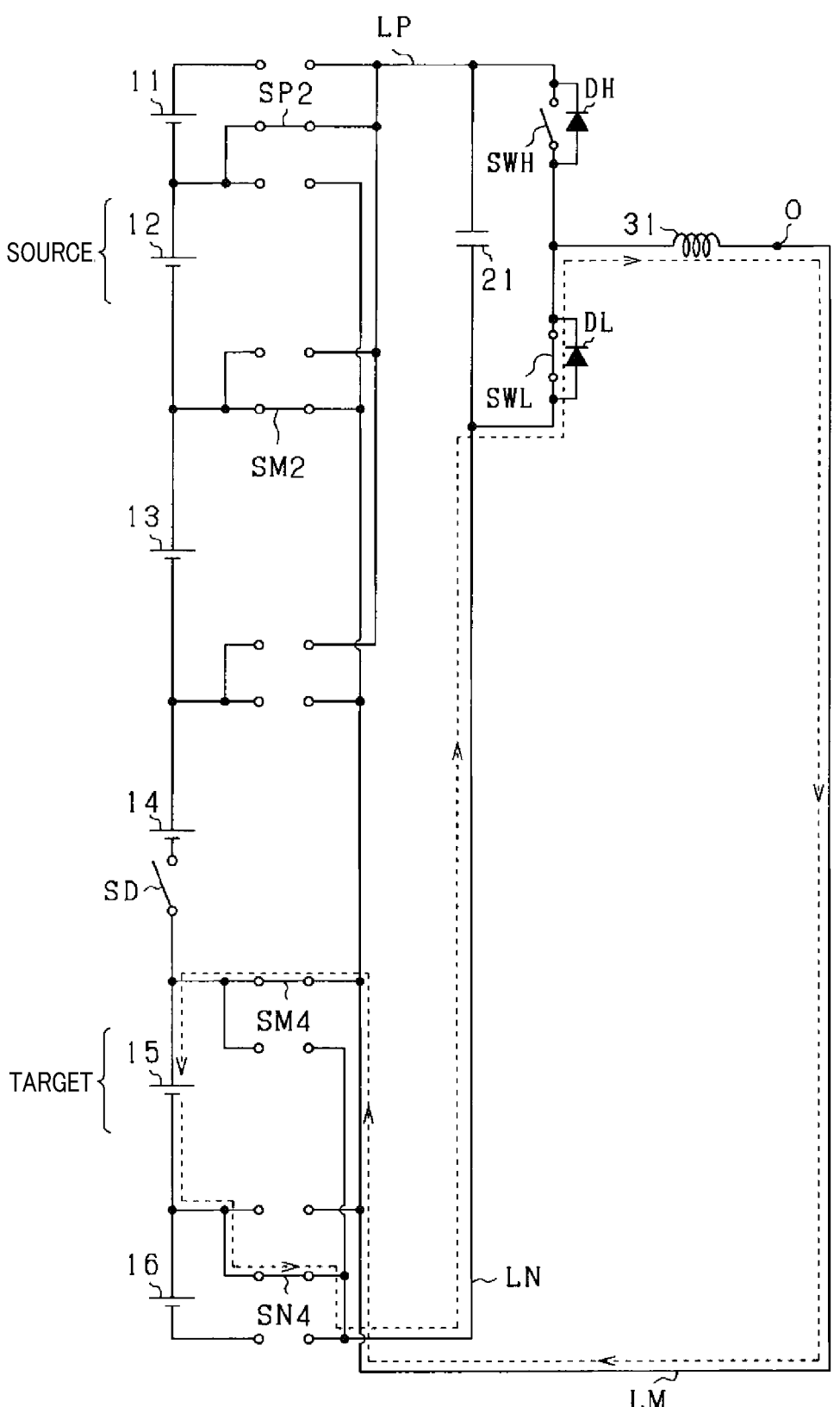
FIG. 28 illustrates a mode of electric power supply with a source charge storage unit and a target charge storage unit belong to different groups.

After the completion of the processing in step S22 or S23, the first control is performed in step S24. Referring to FIGS. 27 and 28, the following describes a case in which the second charge storage unit 12 is a source charge storage unit, the fifth charge storage unit 15 is a target charge storage unit, and the determination result in step S21 is affirmative.

As illustrated in FIG. 27, the control device 50 turns on the second positive electrode switch SP2, the second and fourth neutral point switches SM2 and SM4, and the second negative electrode switch SN2 and turns off the first, third, and fourth positive electrode switches SP1, SP3, and SP4, the first and third negative electrode switches SN1 and SN3, the first, third, and fifth neutral point switches SM1, SM3, and SM5, and the inter-cell switch SD. The control device 50 then turns on the upper arm switch SWH and turns off the lower arm switch SWL. This switching causes magnetic energy to be accumulated in the stator winding 31 with the second charge storage unit 12 serving as an energy source. As illustrated in FIG. 28, the control device 50 then turns off the upper arm switch SWH and turns on the lower arm switch SWL. This switching supplies a charging current based on the accumulated magnetic energy to the fifth charge storage unit 15. When the upper and lower arm switches SWH and SWL are alternately turned on, electric power is supplied from the second charge storage unit 12 to the fifth charge storage unit 15.

Referring back to FIG. 26, in step S20, if both the source charge storage unit and the target charge storage unit are determined to be included in one of the high potential group and the low potential group, the processing proceeds to step S25 to turn off the inter-cell switch SD. After that, the second control is performed in step S26. The second control will now be described.

First, the case in which the source charge storage unit and the target charge storage unit are determined by the control device 50 to be included in the high potential group will be described with reference to FIGS. 29 to 32. In the example illustrated in FIGS. 29 to 32, the second charge storage unit 12 is a source charge storage unit, whereas the third charge storage unit 13 is a target charge storage unit.

Figure 29:
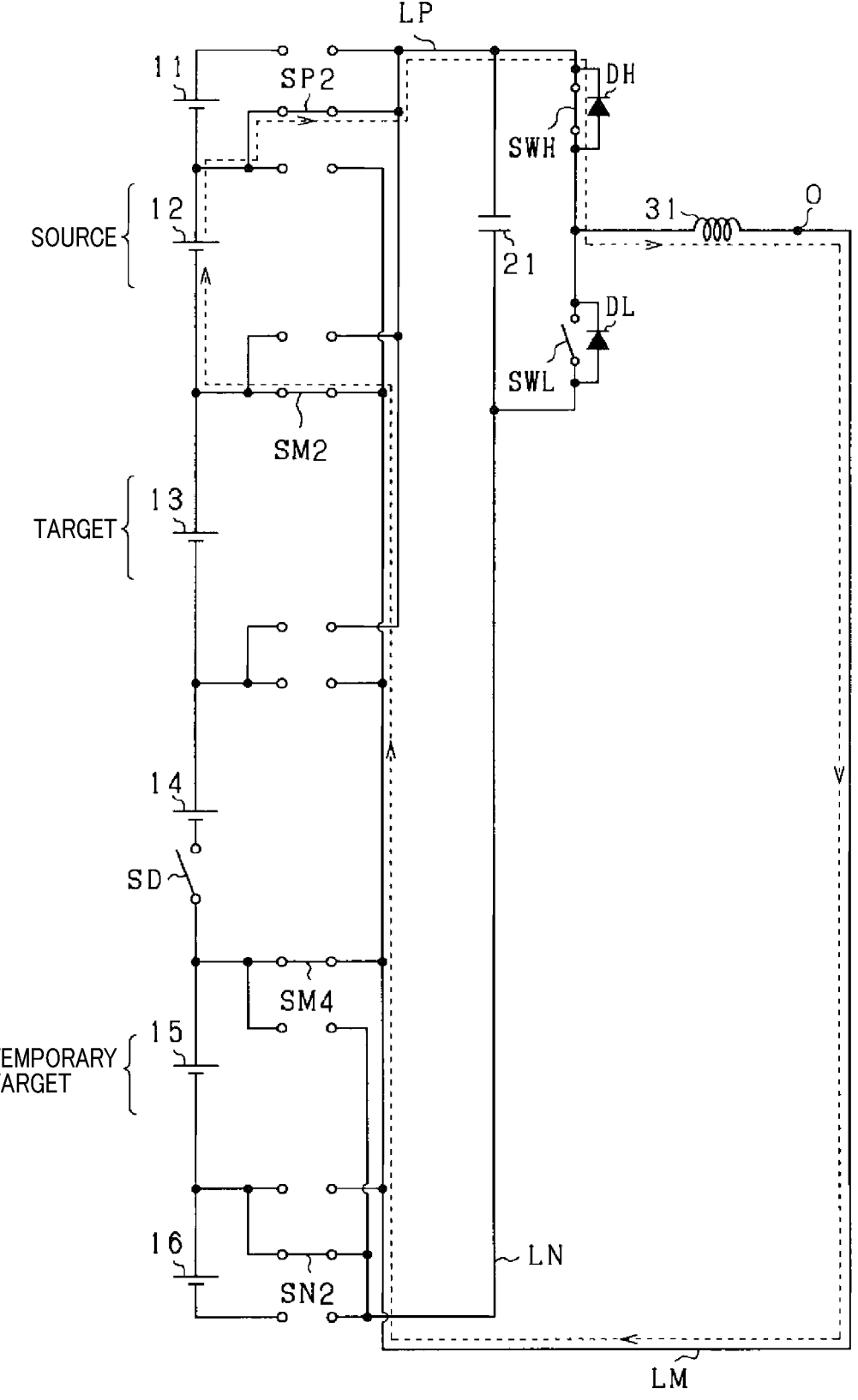
FIG. 29 illustrates a mode of electric power supply with a source charge storage unit and a target charge storage unit belonging to a high potential group.

As illustrated in FIG. 29, the control device 50 turns on the second positive electrode switch SP2, the second and fourth neutral point switches SM2 and SM4, and the second negative electrode switch SN2 and turns off the first, third, and fourth positive electrode switches SP1, SP3, and SP4, the first, third, and fifth neutral point switches SM1, SM3, and SM5, the first and third negative electrode switches SN1 and SN3, and the inter-cell switch SD. In this case, the first, fourth, and sixth charge storage units 11, 14, and 16 are disconnected from the system including the neutral point path LM. The control device 50 then turns on the upper arm switch SWH and turns off the lower arm switch SWL. This switching causes magnetic energy to be accumulated in the stator winding 31 with the second charge storage unit 12 serving as an energy source.

Figure 30:
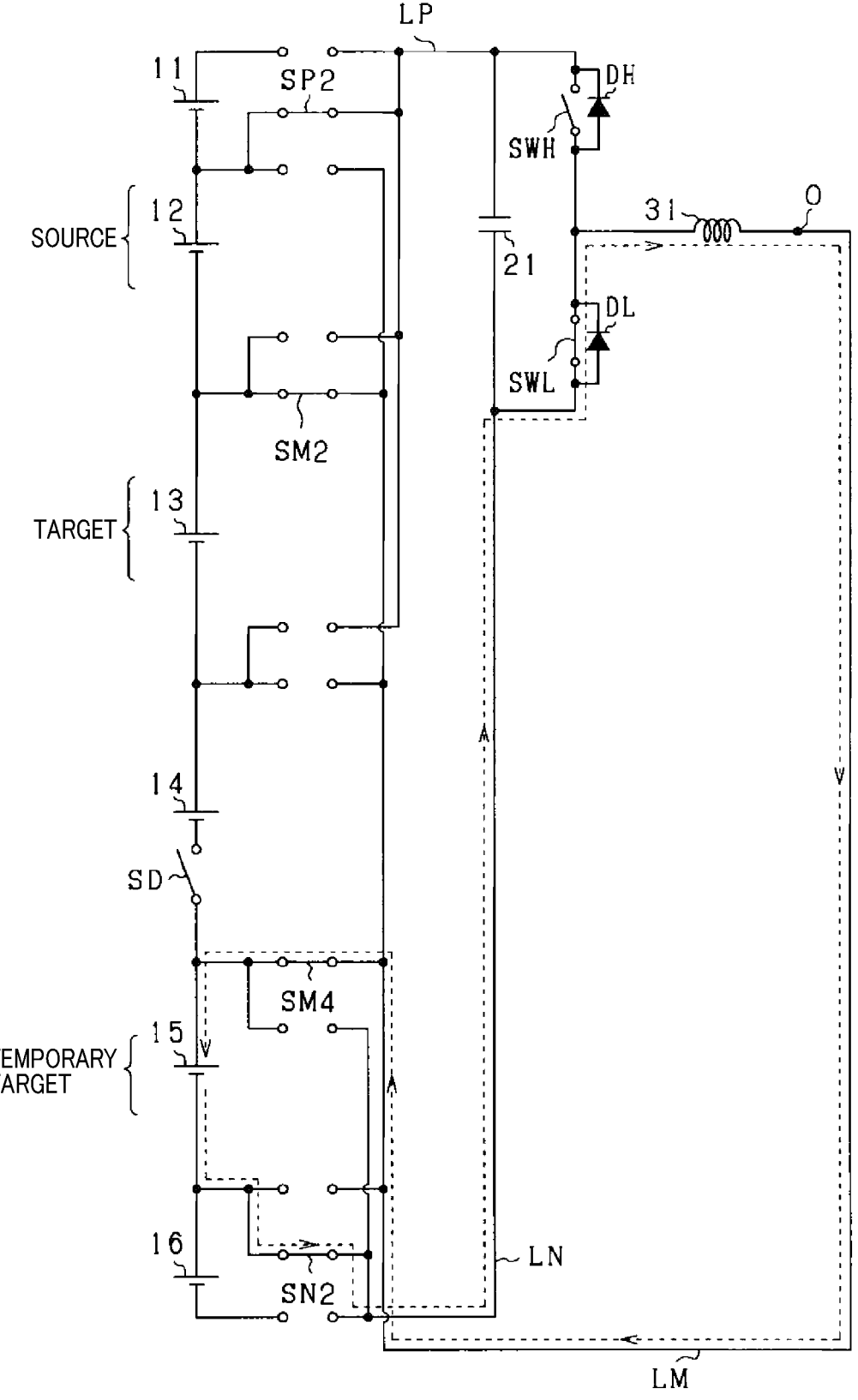
FIG. 30 illustrates a mode of electric power supply with a source charge storage unit and a target charge storage unit belonging to a high potential group.

As illustrated in FIG. 30, the control device 50 then turns off the upper arm switch SWH and turns on the lower arm switch SWL. This switching supplies a charging current based on the accumulated magnetic energy to the fifth charge storage unit 15 selected by the control device 50 as a temporary target charge storage unit. The switching states illustrated in FIGS. 29 and 30 alternate to supply electric power from the second charge storage unit 12 to the fifth charge storage unit 15. In this case, in which the inter-cell switch SD is turned off, even when the second and fourth neutral point switches SM2 and SM4 are turned on, a short circuit is prevented between the positive electrode terminal of the third charge storage unit 13 and the negative electrode terminal of the fourth charge storage unit 14.

Figure 31:
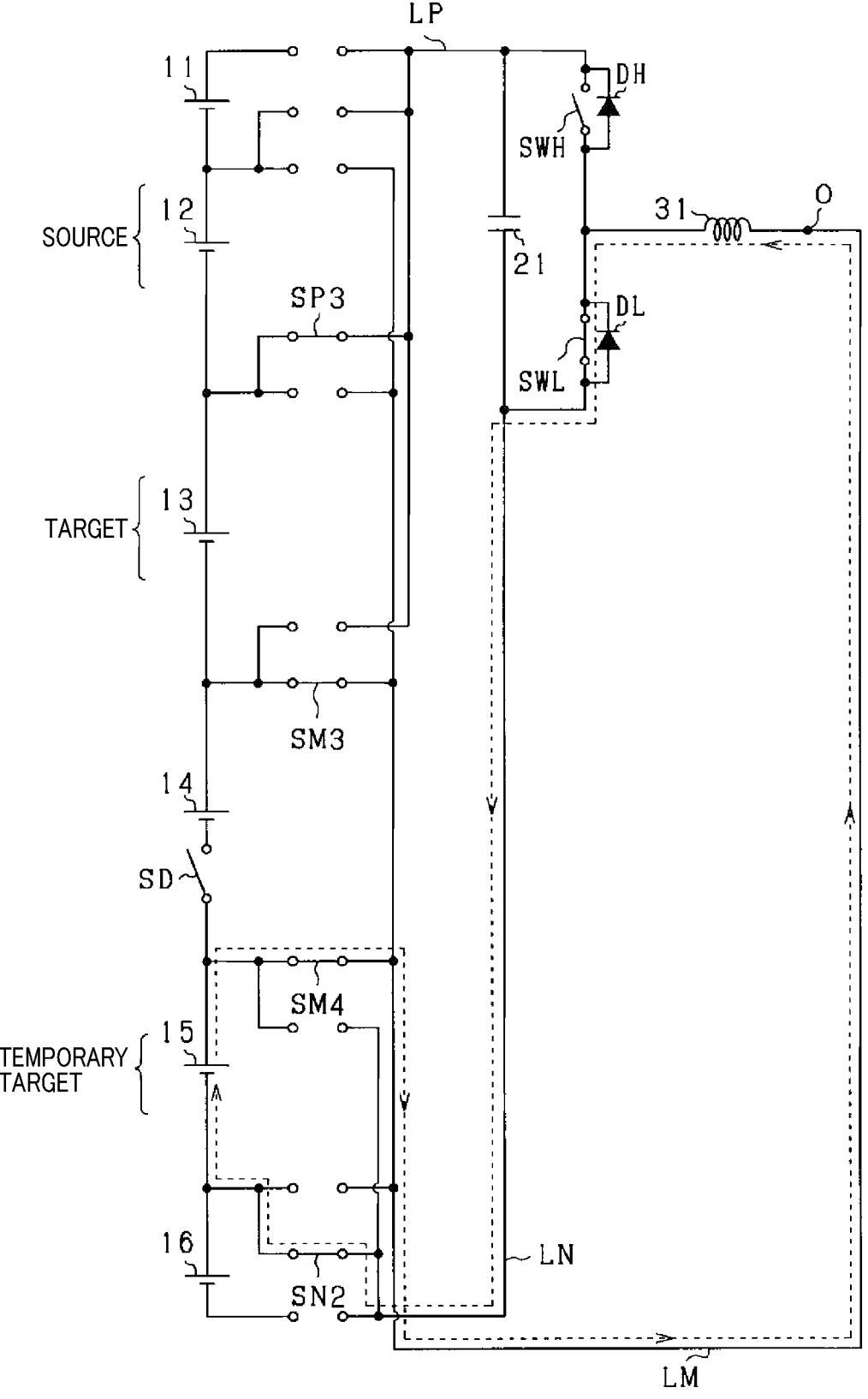
FIG. 31 illustrates a mode of electric power supply with a source charge storage unit and a target charge storage unit belonging to a high potential group.
Figure 32:
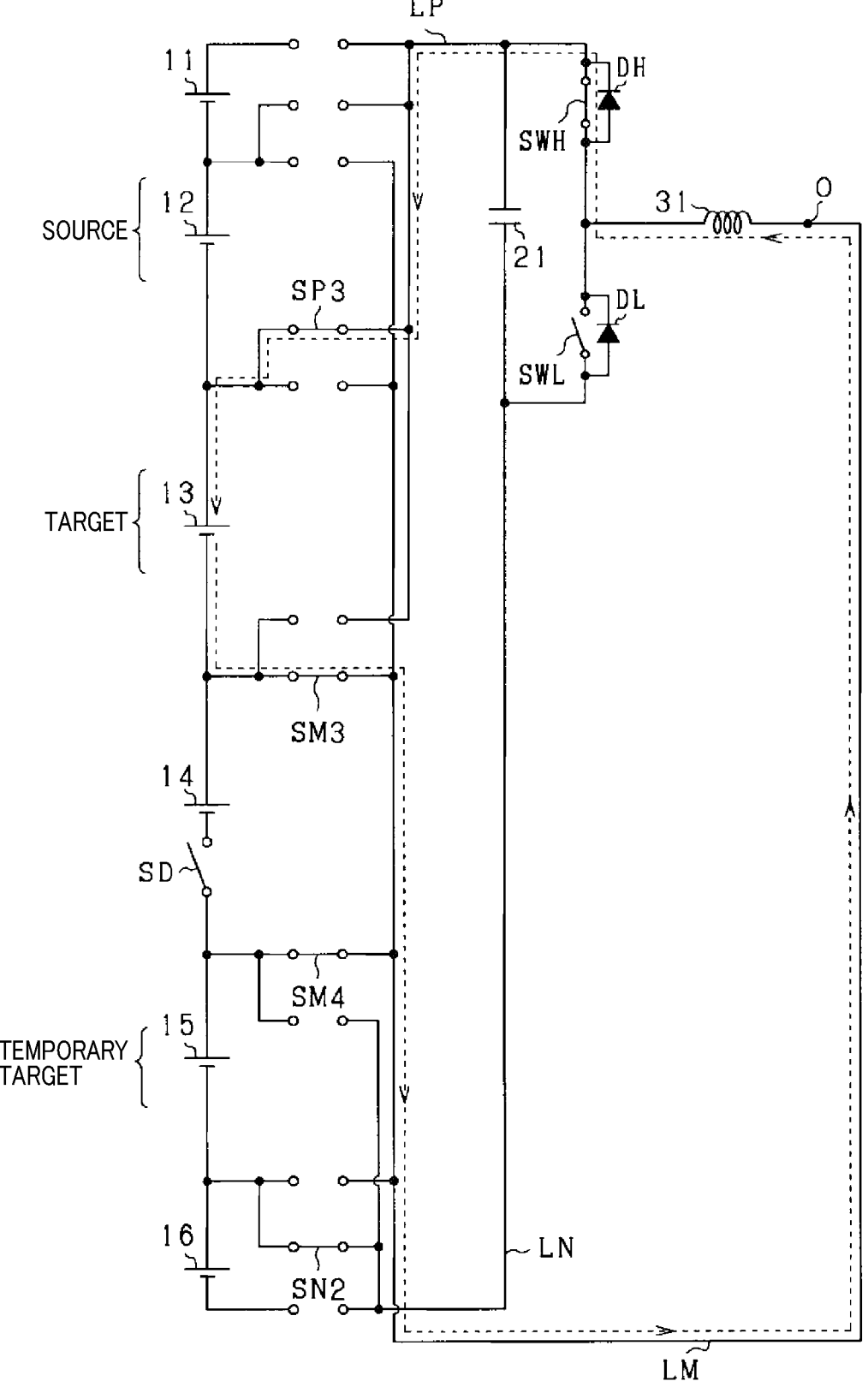
FIG. 32 illustrates a mode of electric power supply with a source charge storage unit and a target charge storage unit belonging to a high potential group.

As illustrated in FIG. 31, the control device 50 then turns on the third positive electrode switch SP3, the third and fourth neutral point switches SM3 and SM4, and the second negative electrode switch SN2 and turns off the first, second, and fourth positive electrode switches SP1, SP2, and SP4, the first, second, and fifth neutral point switches SM1, SM2, and SM5, the first and third negative electrode switches SN1 and SN3, and the inter-cell switch SD. The control device 50 then turns off the upper arm switch SWH and turns on the lower arm switch SWL. This switching causes magnetic energy to be accumulated in the stator winding 31 with the fifth charge storage unit 15 serving as an energy source. As illustrated in FIG. 32, the control device 50 then turns on the upper arm switch SWH and turns off the lower arm switch SWL. This switching supplies a charging current based on the accumulated magnetic energy to the third charge storage unit 13. The switching states illustrated in FIGS. 31 and 32 alternate to supply electric power from the fifth charge storage unit 15 to the third charge storage unit 13.

The above-described control of the switching of the upper and lower arm switches SWH and SWL in the inverter 20 is performed to supply electric power from the second charge storage unit 12 to the third charge storage unit 13. In this case, no charging current flows through the charge storage units other than the source charge storage unit and the target charge storage unit, thus enabling a reduction in losses in the power conversion device and suppression of the progress of deterioration in the charge storage units.

Next, the case in which the source charge storage unit and the target charge storage unit are determined by the control device 50 to be included in the low potential group will be described with reference to FIGS. 33 to 36. In the example illustrated in FIGS. 33 to 36, the fifth charge storage unit 15 is a source charge storage unit, the sixth charge storage unit 16 is a target charge storage unit, and the third charge storage unit 13 is a temporary target charge storage unit.

Figure 33:
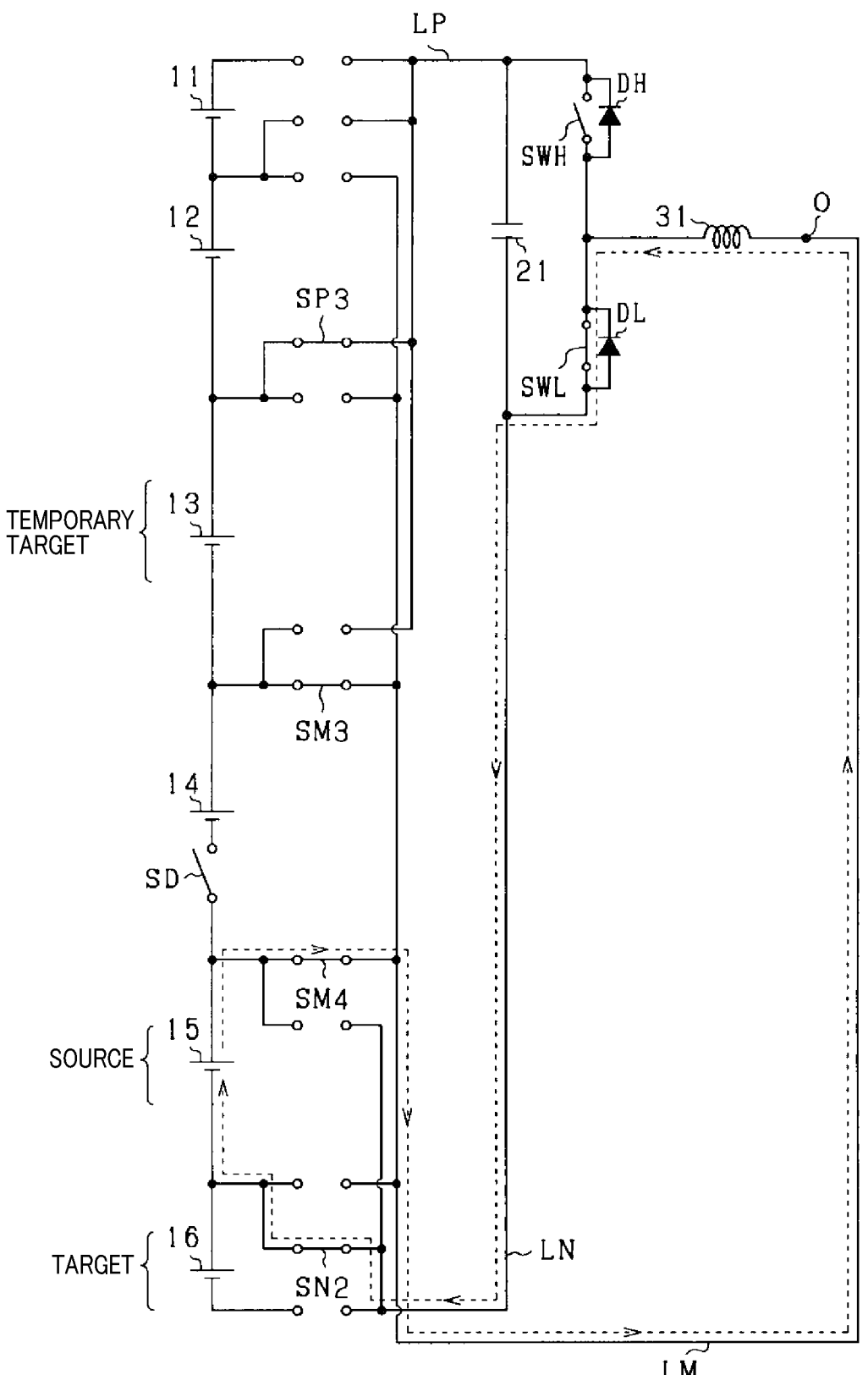
FIG. 33 illustrates a mode of electric power supply with a source charge storage unit and a target charge storage unit belonging to a low potential group.

As illustrated in FIG. 33, the control device 50 turns on the fourth neutral point switch SM4, the second negative electrode switch SN2, the third positive electrode switch SP3, and the fourth neutral point switch SM4 and turns off the first, second, and fourth positive electrode switches SP1, SP2, and SP4, the first, second, and fifth neutral point switches SM1, SM2, and SM5, the first and third negative electrode switches SN1 and SN3, and the inter-cell switch SD. The control device 50 then turns off the upper arm switch SWH and turns on the lower arm switch SWL. This switching causes magnetic energy to be accumulated in the stator winding 31 with the fifth charge storage unit 15 serving as an energy source.

Figure 34:
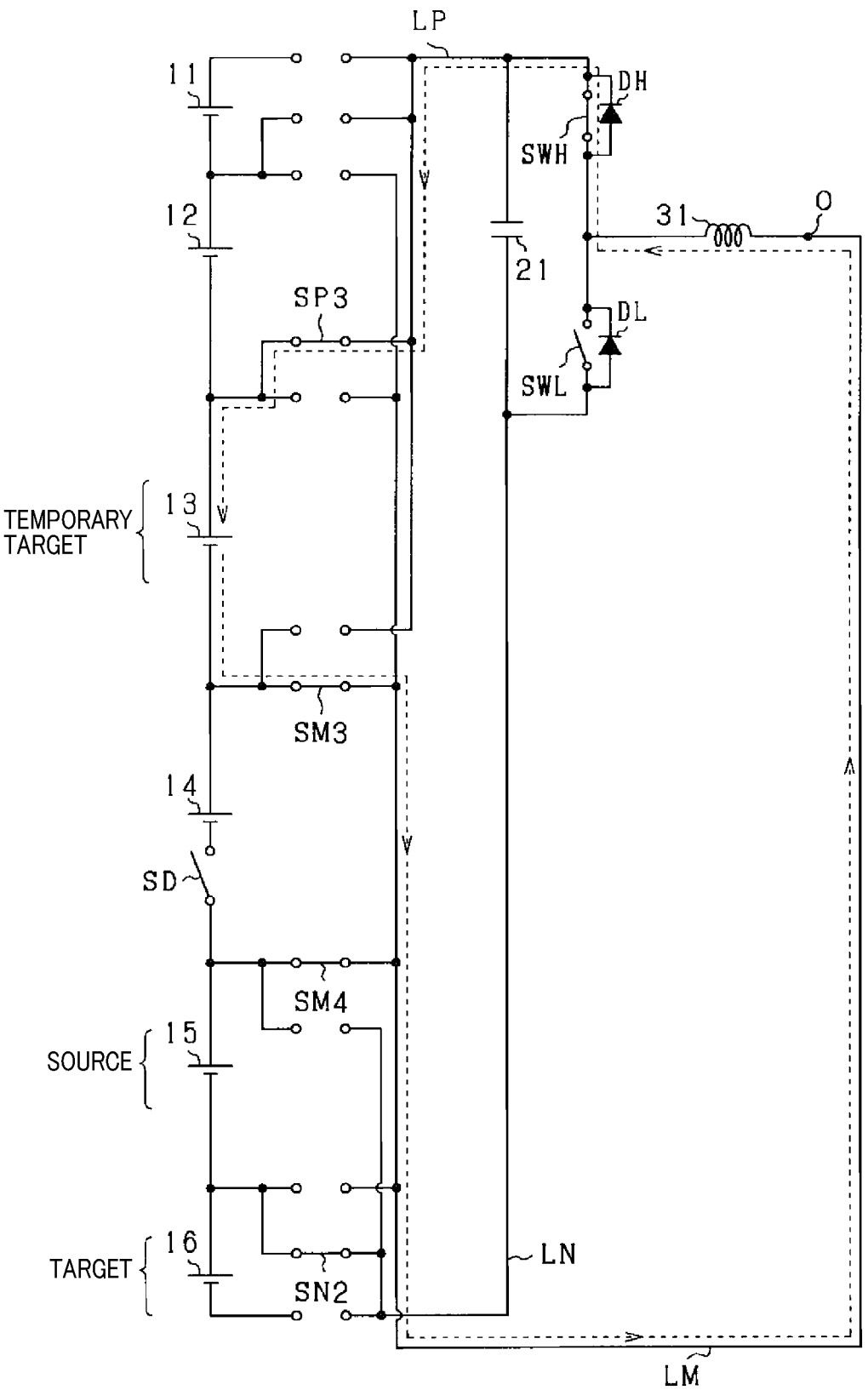
FIG. 34 illustrates a mode of electric power supply with a source charge storage unit and a target charge storage unit belonging to a low potential group.

As illustrated in FIG. 34, the control device 50 then turns on the upper arm switch SWH and turns off the lower arm switch SWL. This switching supplies a charging current based on the accumulated magnetic energy to the third charge storage unit 13 selected as the temporary target charge storage unit. The switching states illustrated in FIGS. 33 and 34 alternate to supply electric power from the fifth charge storage unit 15 to the third charge storage unit 13. In this case, in which the inter-cell switch SD is turned off, even when the third and fourth neutral point switches SM2 and SM4 are turned on, a short circuit is prevented between the positive electrode terminal and the negative electrode terminal of the fourth charge storage unit 14.

Figure 35:
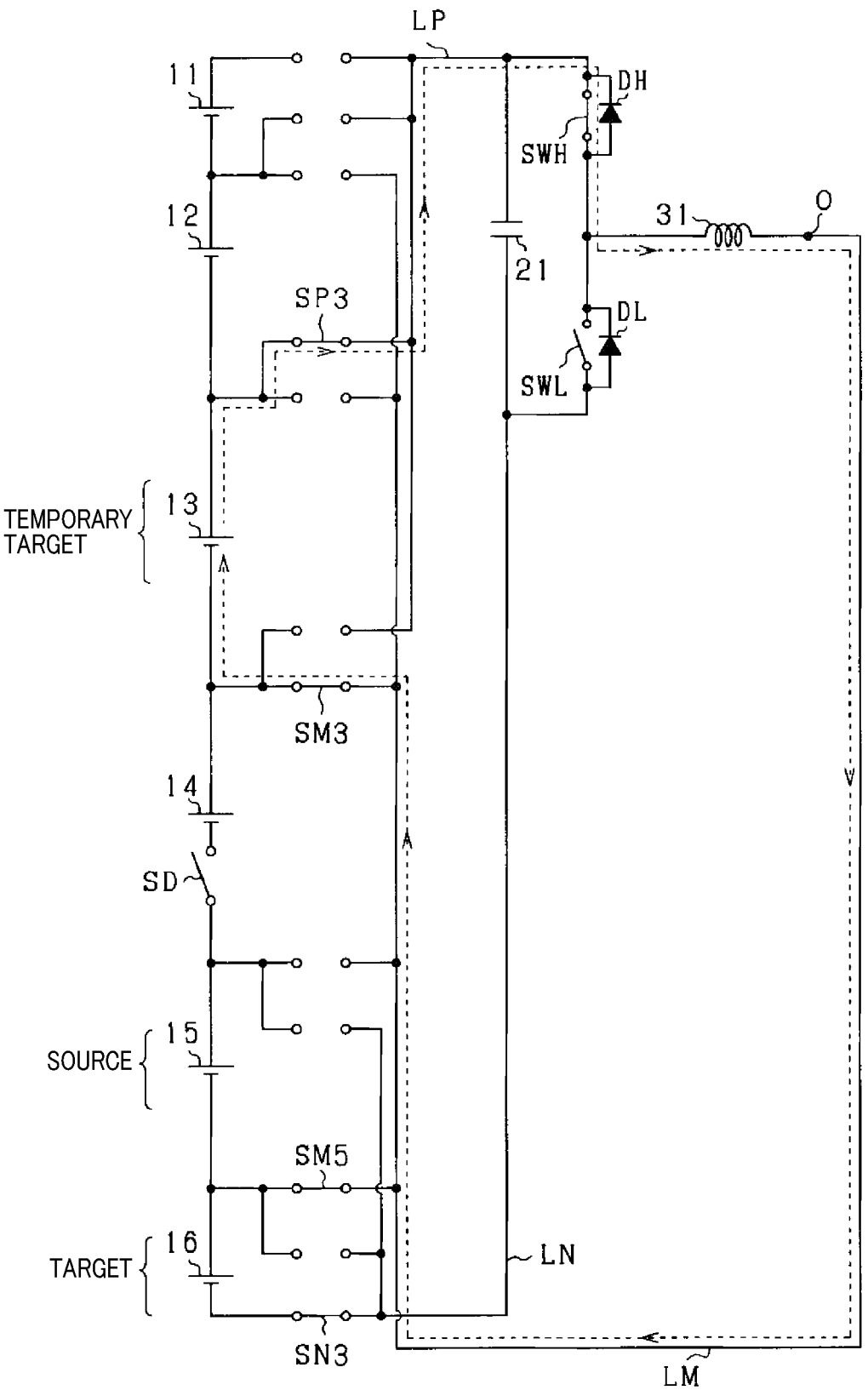
FIG. 35 illustrates a mode of electric power supply with a source charge storage unit and a target charge storage unit belonging to a low potential group.
Figure 36:
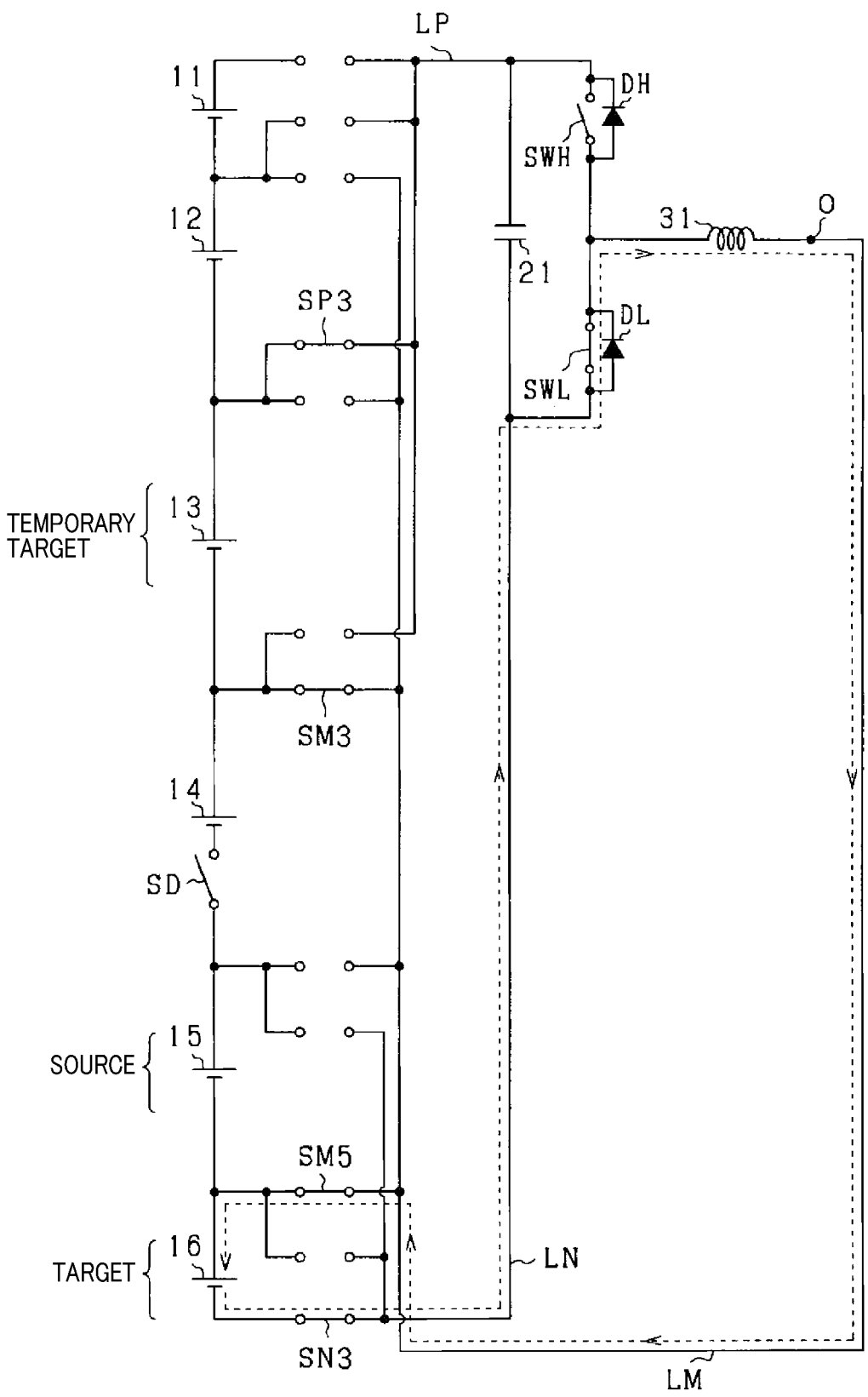
FIG. 36 illustrates a mode of electric power supply with a source charge storage unit and a target charge storage unit belonging to a low potential group.

As illustrated in FIG. 35, the control device 50 then turns on the third positive electrode switch SP3, the third neutral point switch SM3, the fifth neutral point switch SM5, and the third negative electrode switch SN3 and turns off the first, second, and fourth positive electrode switches SP1, SP2, and SP4, the first, second, and fourth neutral point switches SM1, SM2, and SM4, the first and second negative electrode switches SN1 and SN2, and the inter-cell switch SD. The control device 50 then turns on the upper arm switch SWH and turns off the lower arm switch SWL. This switching causes magnetic energy to be accumulated in the stator winding 31 with the third charge storage unit 13 serving as an energy source. As illustrated in FIG. 36, the control device 50 then turns off the upper arm switch SWH and turns on the lower arm switch SWL. This switching supplies a charging current based on the accumulated magnetic energy to the sixth charge storage unit 16. The switching states illustrated in FIGS. 35 and 36 alternate to supply electric power from the third charge storage unit 13 to the sixth charge storage unit 16.

The above-described control of the switching of the upper and lower arm switches SWH and SWL in the inverter 20 is performed to supply electric power from the fifth charge storage unit to the sixth charge storage unit 16. In this case, no charging current flows through the charge storage units other than the source charge storage unit and the target charge storage unit, thus enabling a reduction in losses in the power conversion device and suppression of the progress of deterioration in the charge storage units.

Fifth Embodiment

Figure 37:
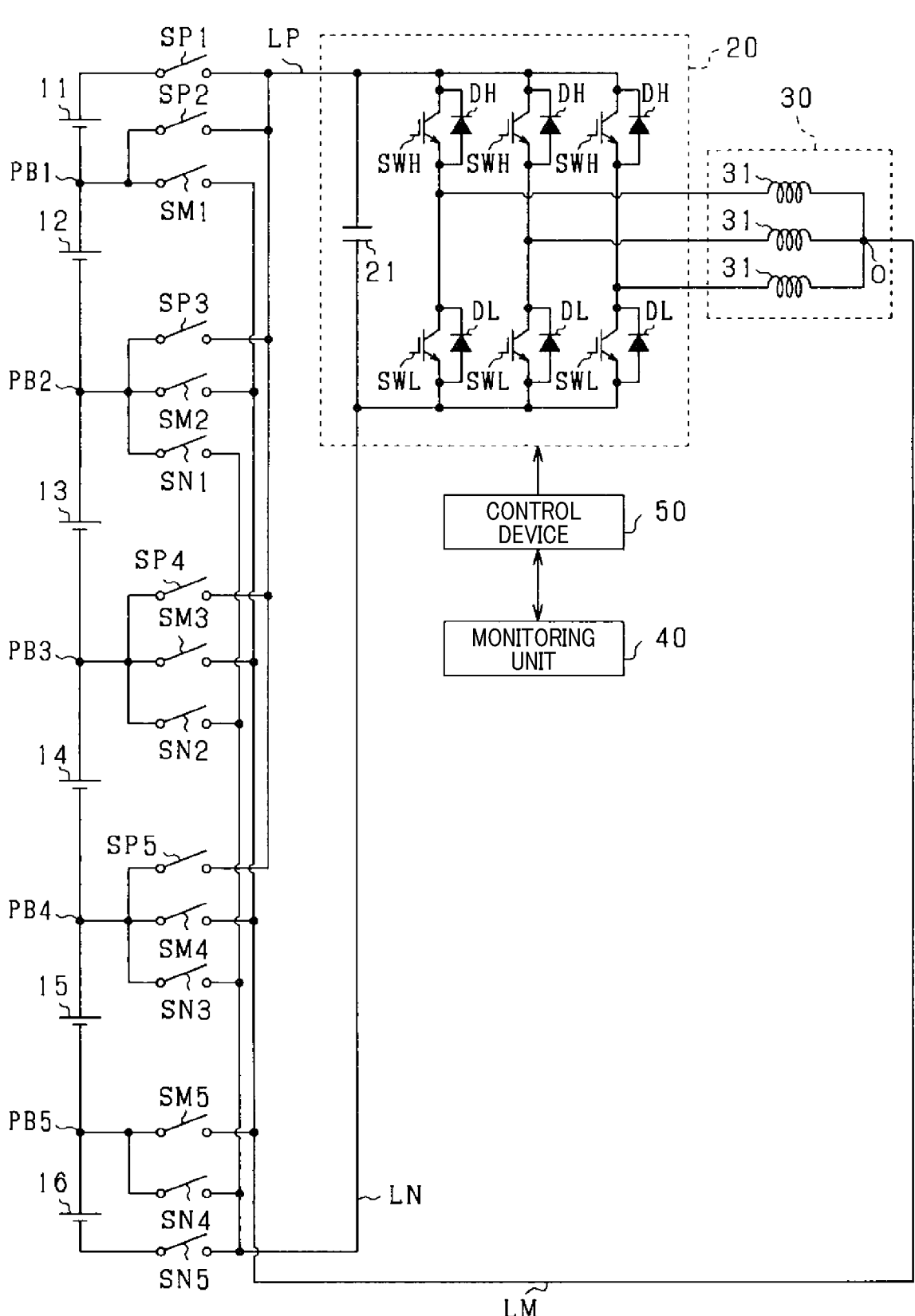
FIG. 37 is an overall configuration diagram of a power conversion device according to a fifth embodiment.

A fifth embodiment will now be described with reference to the drawings by focusing on differences from the first embodiment. In the present embodiment, as illustrated in FIG. 37, the power conversion device includes first to fifth positive electrode switches SP1 to SP5 and first to fifth negative electrode switches SN1 to SN5. In the present embodiment, the positive electrode switches SP1 to SP5 and the negative electrode switches SN1 to SN5 are relays and turned on or off by the control device 50. In FIG. 37, the same components as illustrated in FIG. 1 are designated by the same reference numerals for the sake of convenience.

The n-th positive electrode switch SPn (n=1, 2, 3, 4, 5) connects the positive electrode terminal of the n-th charge storage unit and the high potential path LP. When the n-th positive electrode switch SPn is turned on, the positive electrode terminal of the n-th charge storage unit and the high potential path LP are electrically connected to each other. When the n-th positive electrode switch SPn is turned off, the positive electrode terminal of the n-th charge storage unit and the high potential path LP are electrically disconnected from each other.

The n-th negative electrode switch SNn connects the negative electrode terminal of the (n+1)-th charge storage unit and the low potential path LN. When the n-th negative electrode switch SNn is turned on, the negative electrode terminal of the (n+1)-th charge storage unit and the low potential path LN are electrically connected to each other. When the n-th negative electrode switch SNn is turned off, the negative electrode terminal of the (n+1)-th charge storage unit and the low potential path LN are electrically disconnected from each other.

The control device 50 selects, from the charge storage units 11 to 16, one charge storage unit or some charge storage units connected in series as a source charge storage unit, and selects, from the charge storage units 11 to 16, one of the charge storage units other than the source charge storage unit or some of the charge storage units connected in series other than the source charge storage unit as a target charge storage unit.

Figure 38:
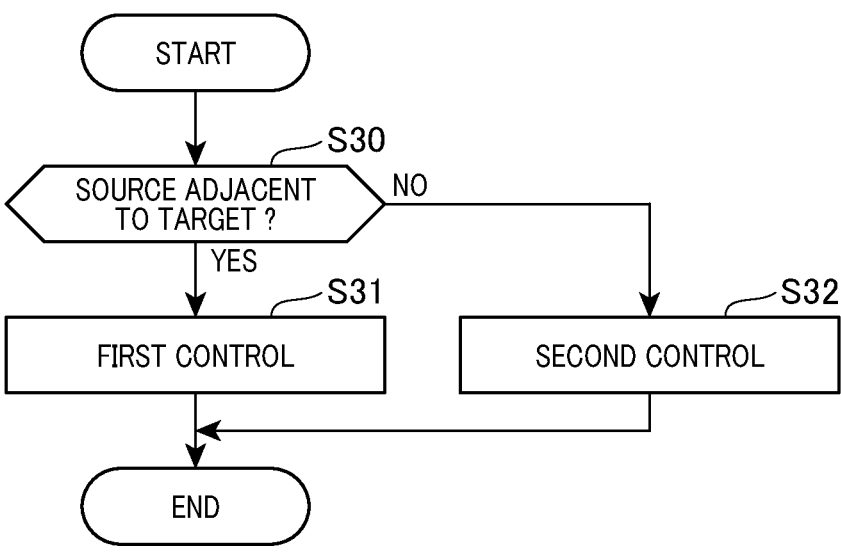
FIG. 38 is a flowchart illustrating a procedure of power transfer processing.

FIG. 38 illustrates a procedure of power supply processing performed by the control device 50.

In step S30, it is determined whether the source charge storage unit and the target charge storage unit are adjacent to each other. For example, if the second charge storage unit 12 is a source charge storage unit, and the third charge storage unit 13 is a target charge storage unit, then the determination result in step S30 is affirmative, whereas if the second charge storage unit 12 is a source charge storage unit, and the sixth charge storage unit 16 is a target charge storage unit, then the determination result in step S30 is negative.

If the determination result in step S30 is affirmative, the processing proceeds to step S31, in which the first control is performed. The first control will now be described.

Figure 39:
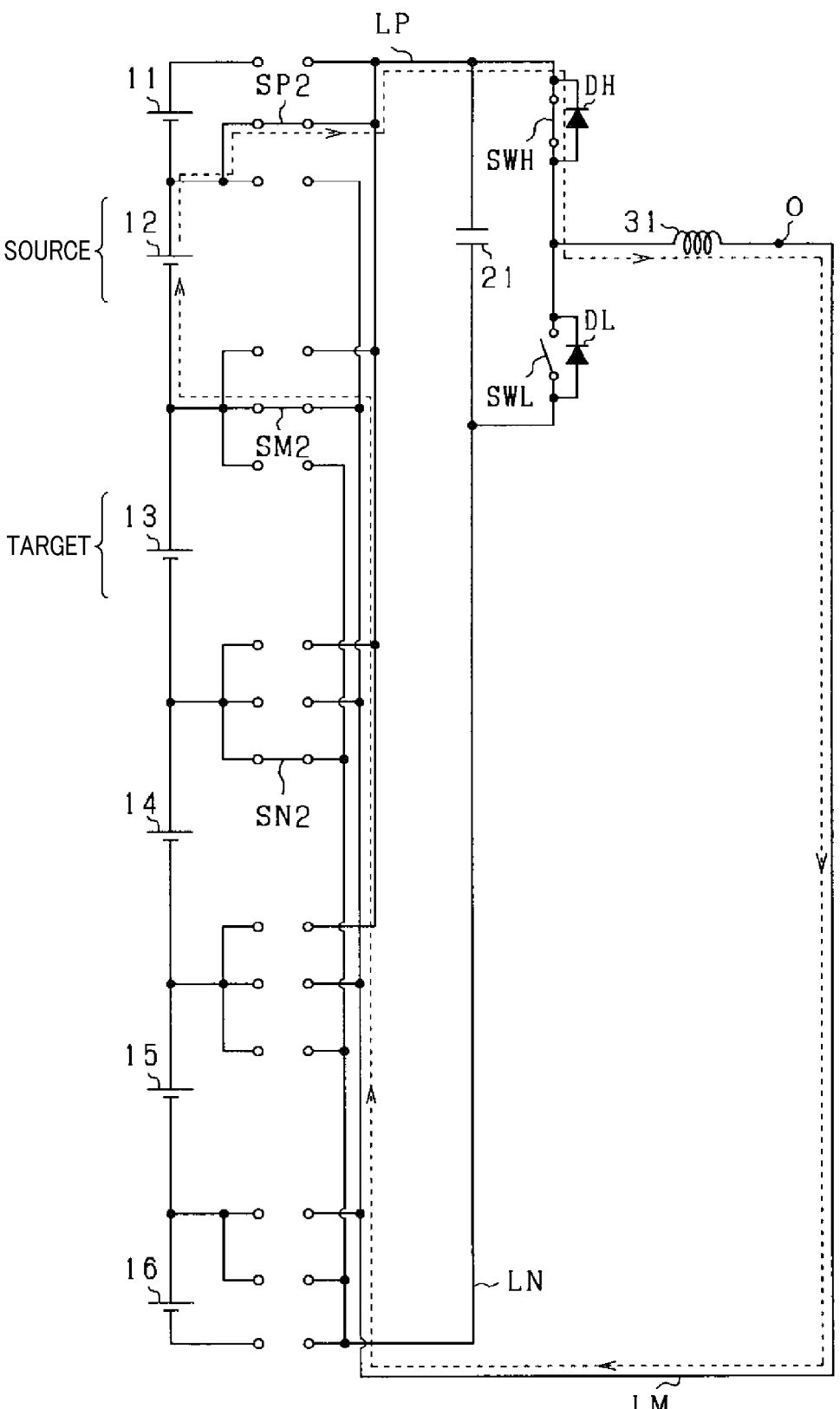
FIG. 39 illustrates a mode of electric power supply with a source charge storage unit adjacent to the high potential side of a target charge storage unit.

First, the case in which the source charge storage unit is determined by the control device 50 to be located at a potential higher than the target charge storage unit will be described with reference to FIG. 39. In the example illustrated in FIG. 39, the second charge storage unit 12 is a source charge storage unit, whereas the third charge storage unit 13 is a target charge storage unit.

The control device 50 turns on the second positive electrode switch SP2, the second neutral point switch SM2, and the second negative electrode switch SN2 and turns off the first and third to fifth positive electrode switches SP1 and SP3 to SP5, the first, third, and fifth neutral point switches SM1, SM3, and SM5, and the first and third to fifth negative electrode switches SN1 and SN3 to SN5. The control device 50 then turns on the upper arm switch SWH and turns off the lower arm switch SWL. This switching causes magnetic energy to be accumulated in the stator winding 31 with the second charge storage unit 12 serving as an energy source. The control device 50 then turns off the upper arm switch SWH and turns on the lower arm switch SWL. This switching supplies a charging current based on the accumulated magnetic energy to the third charge storage unit 13. When the upper and lower arm switches SWH and SWL are alternately turned on, electric power is supplied from the second charge storage unit 12 to the third charge storage unit 13. This supply of power can narrow the differences between the capacity parameters of the second and third charge storage units 12 and 13.

Figure 40:
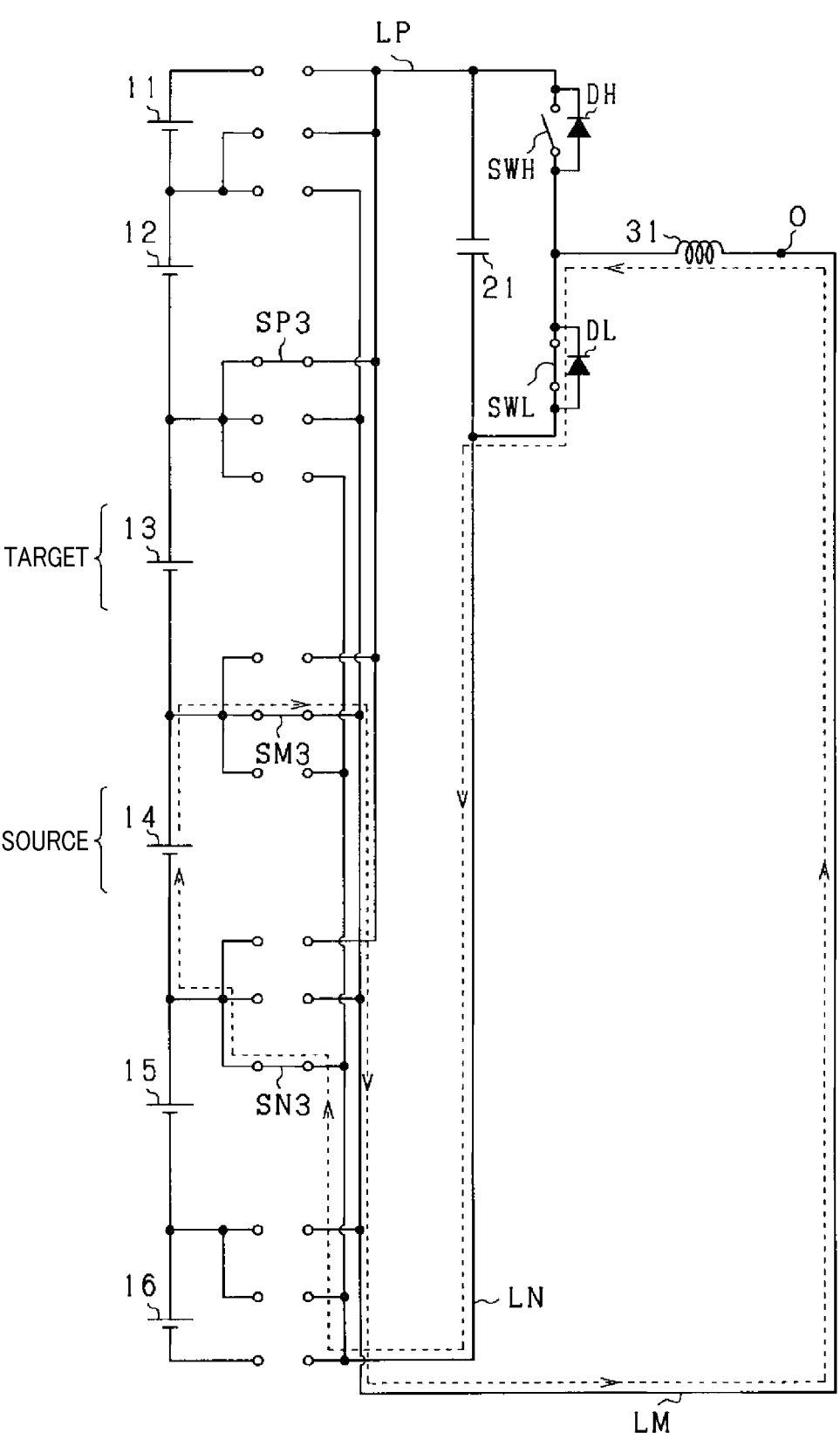
FIG. 40 illustrates a mode of electric power supply with a source charge storage unit adjacent to the low potential side of a target charge storage unit.

Next, the case in which the source charge storage unit is determined by the control device 50 to be located at a potential lower than the target charge storage unit will be described with reference to FIG. 40. In the example illustrated in FIG. 40, the fourth charge storage unit 14 is a source charge storage unit, whereas the third charge storage unit 13 is a target charge storage unit.

The control device 50 turns on the third negative electrode switch SN3, the third neutral point switch SM3, and the third positive electrode switch SP3 and turns off the first, second, fourth, and fifth positive electrode switches SP1, SP2, SP4, and SP5, the first, second, fourth, and fifth neutral point switches SM1, SM2, SM4, and SM5, and the first, second, fourth, and fifth negative electrode switches SN1, SN2, SN4, and SN5. The control device 50 then turns off the upper arm switch SWH and turns on the lower arm switch SWL. This switching causes magnetic energy to be accumulated in the stator winding 31 with the fourth charge storage unit 14 serving as an energy source. The control device 50 then turns on the upper arm switch SWH and turns off the lower arm switch SWL. This switching supplies a charging current based on the accumulated magnetic energy to the third charge storage unit 13. When the upper and lower arm switches SWH and SWL are alternately turned on, electric power is supplied from the fourth charge storage unit 14 to the third charge storage unit 13. This supply of power can narrow the differences between the capacity parameters of the third and fourth charge storage units 13 and 14.

Referring back to FIG. 38, if the determination result in step S30 is negative, the processing proceeds to step S32, in which the second control is performed. The second control will now be described.

First, the case in which the source charge storage unit is determined by the control device 50 to be located at a potential higher than the target charge storage unit will be described with reference to FIGS. 41 to 44. In the example illustrated in FIGS. 41 to 44, the second charge storage unit 12 is a source charge storage unit, whereas the sixth charge storage unit 16 is a target charge storage unit.

Figure 41:
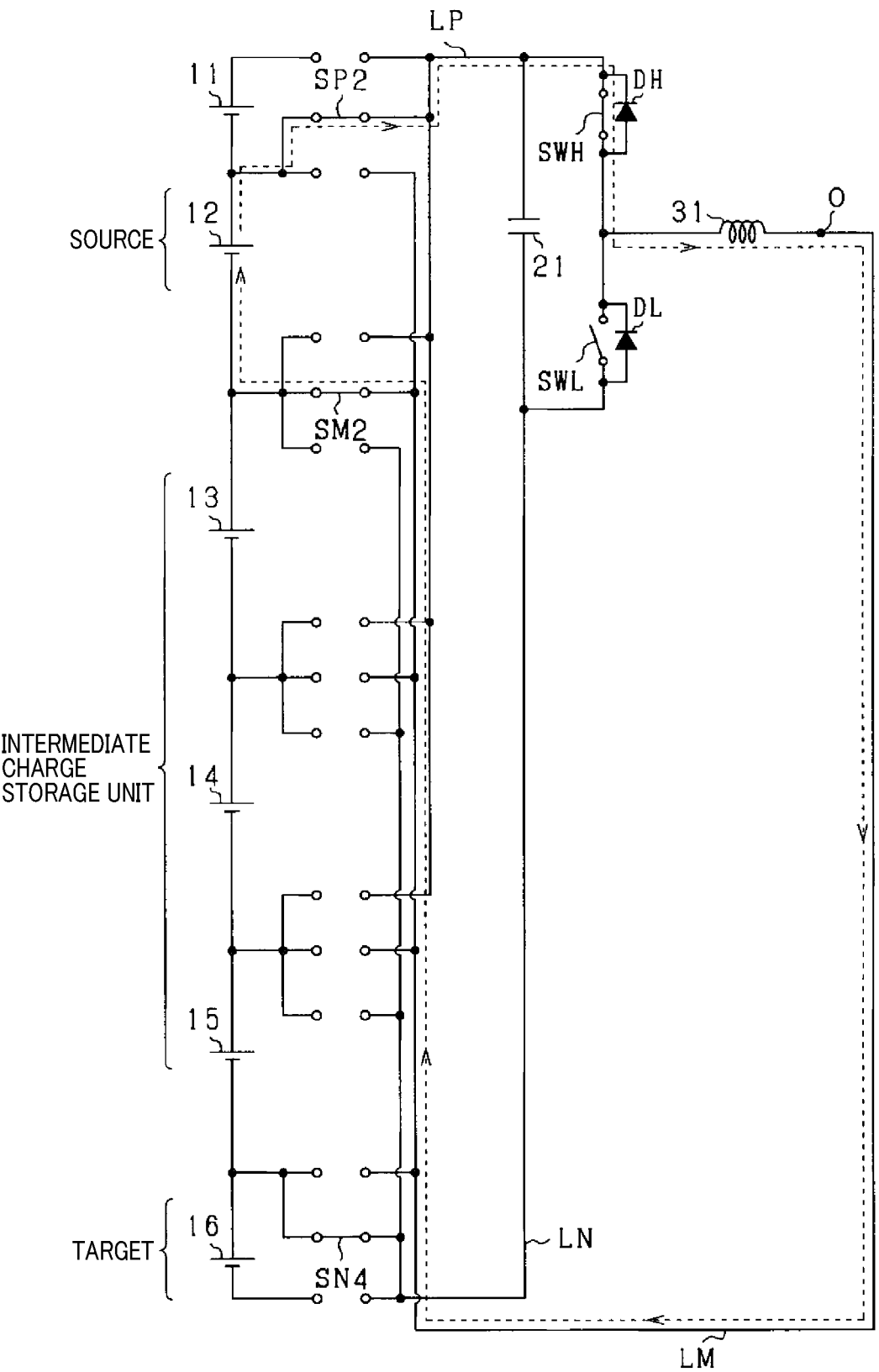
FIG. 41 illustrates a mode of electric power supply with a charge storage unit located between a source charge storage unit at a high potential and a target charge storage unit at a low potential.
Figure 42:
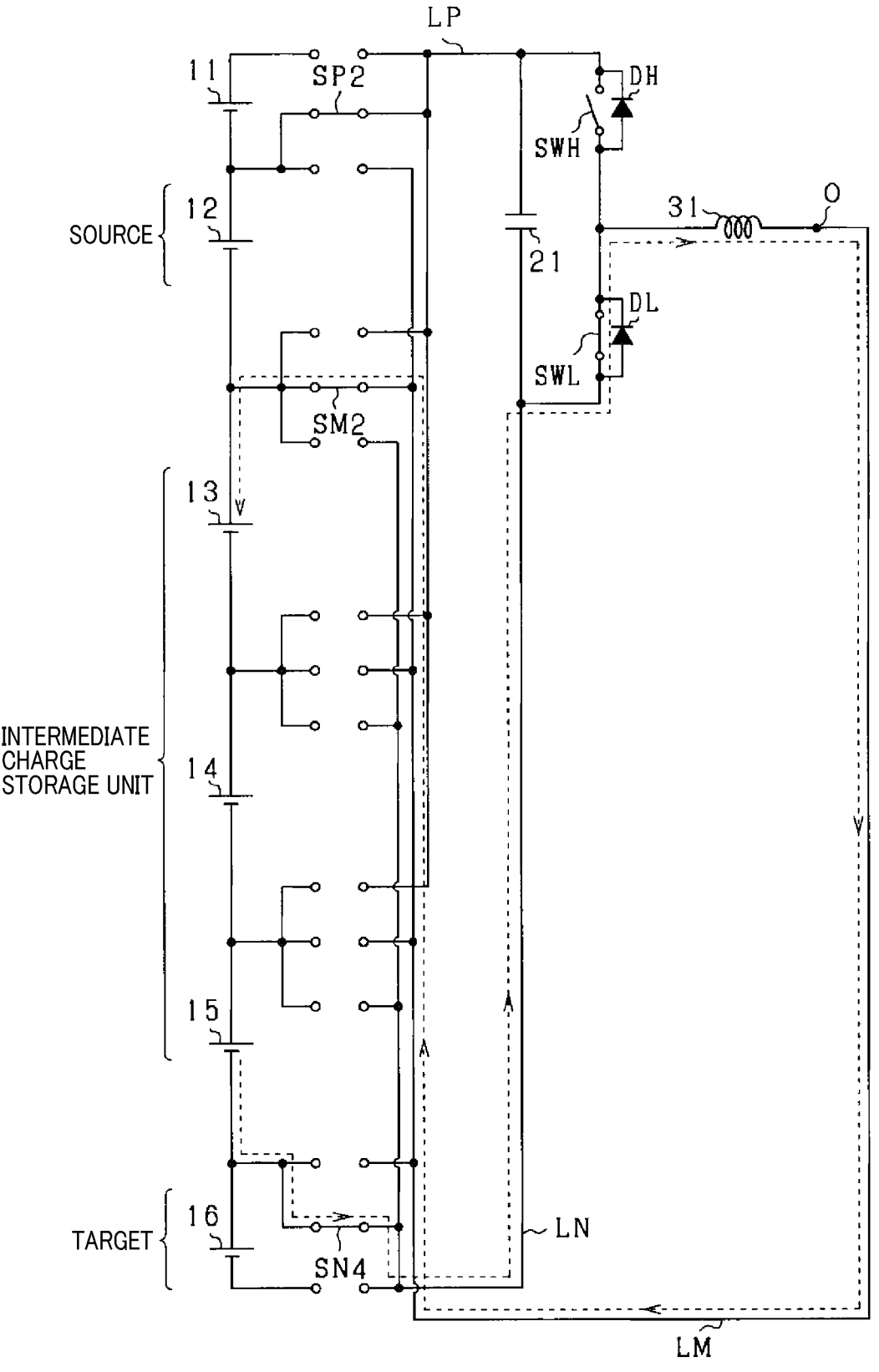
FIG. 42 illustrates a mode of electric power supply with a charge storage unit located between a source charge storage unit at a high potential and a target charge storage unit at a low potential.

As illustrated in FIG. 41, the control device 50 turns on the second positive electrode switch SP2, the second neutral point switch SM2, and the fourth negative electrode switch SN4 and turns off the first and third to fifth positive electrode switches SP1 and SP3 to SP5, the first and third to fifth neutral point switches SM1 and SM3 to SM5, and the first to third and fifth negative electrode switches SN1 to SN3 and SN5. The control device 50 then turns on the upper arm switch SWH and turns off the lower arm switch SWL. This switching causes magnetic energy to be accumulated in the stator winding 31 with the second charge storage unit 12 serving as an energy source. As illustrated in FIG. 42, the control device 50 then turns off the upper arm switch SWH and turns on the lower arm switch SWL. This switching supplies a charging current based on the accumulated magnetic energy to the third to fifth charge storage units 13 to 15, which are intermediate charge storage units. The switching states illustrated in FIGS. 41 and 42 alternate to supply electric power from the second charge storage unit 12 to the intermediate charge storage units.

Figure 43:
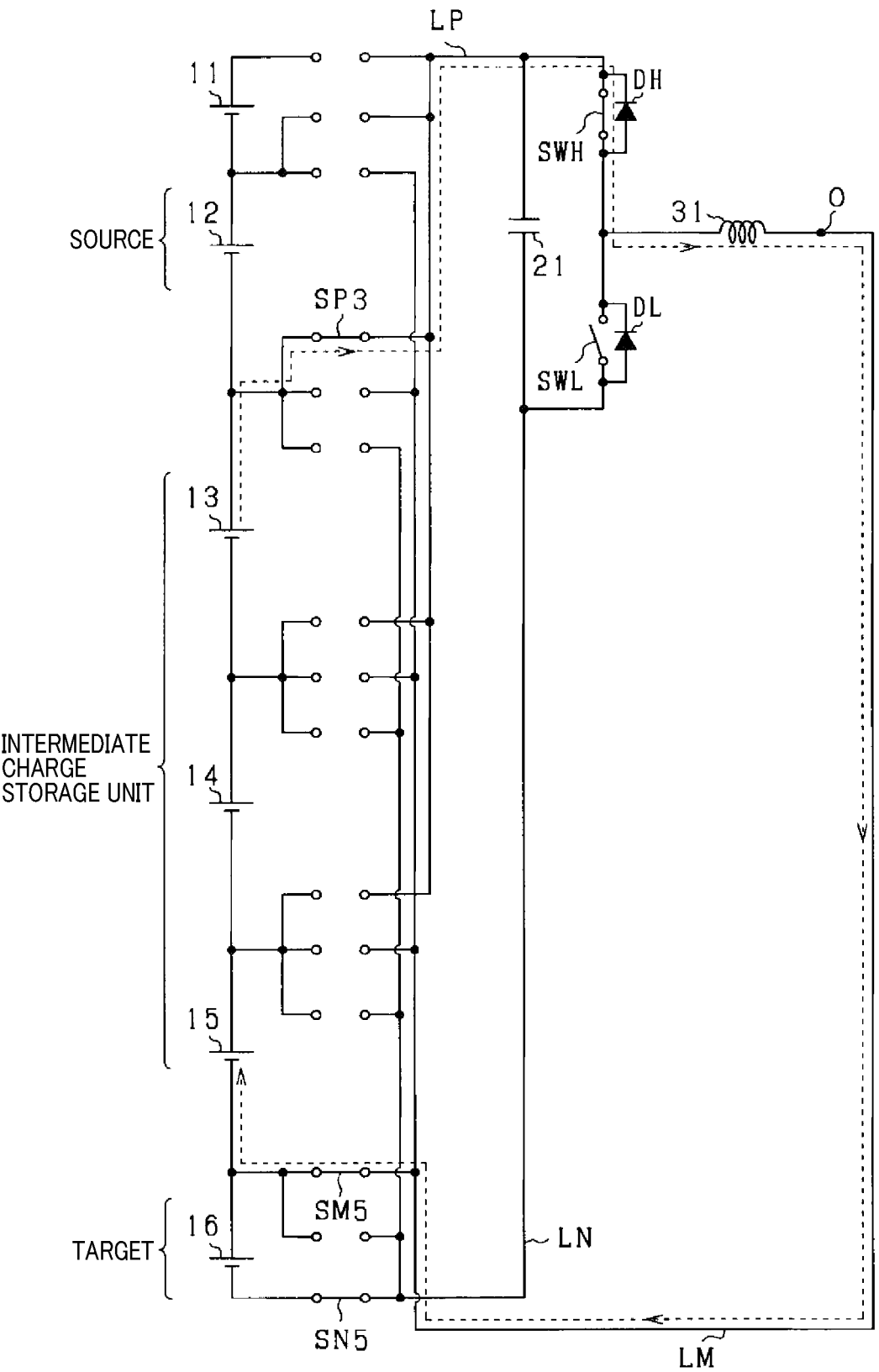
FIG. 43 illustrates a mode of electric power supply with a charge storage unit located between a source charge storage unit at a high potential and a target charge storage unit at a low potential.
Figure 44:
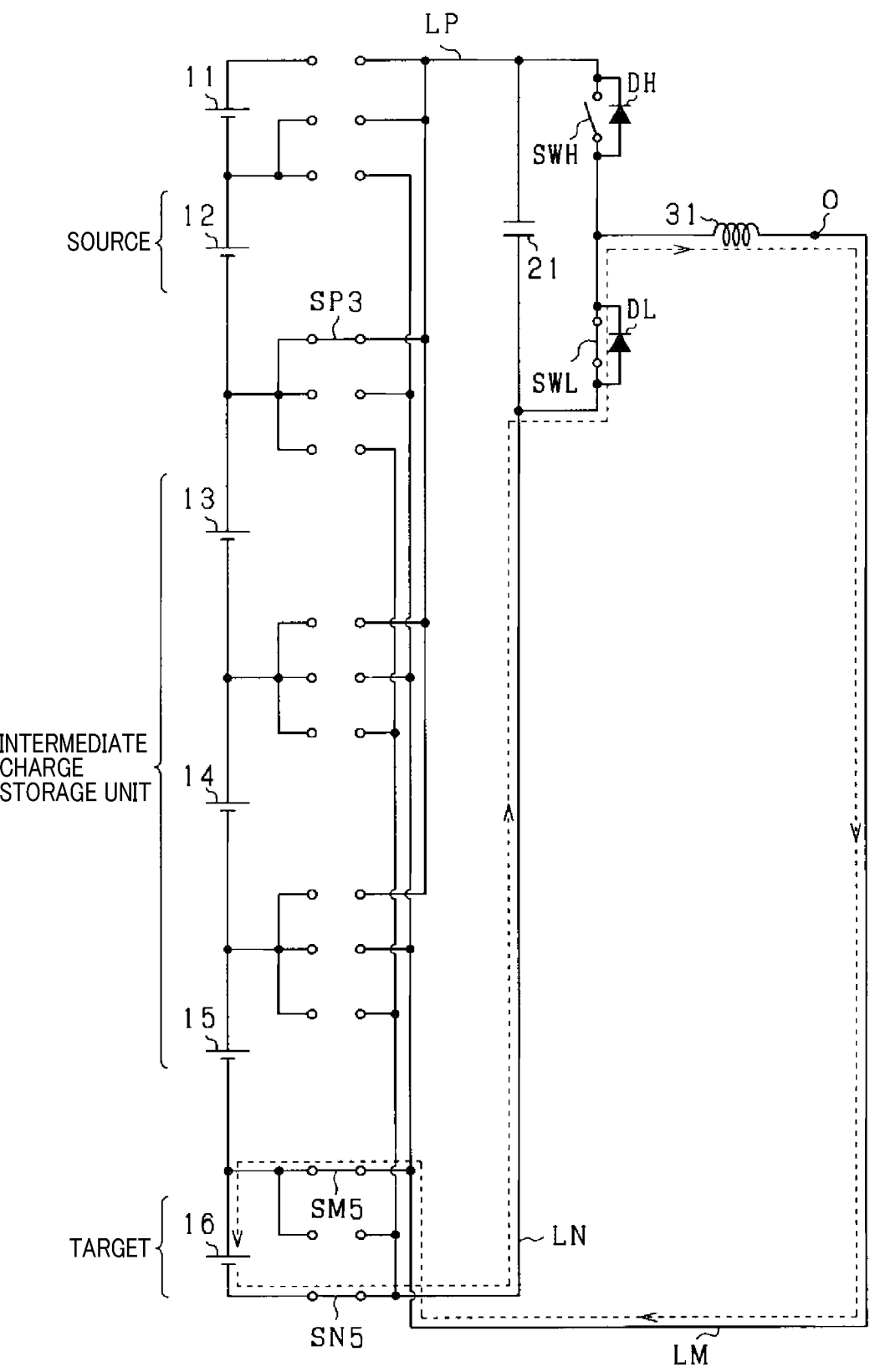
FIG. 44 illustrates a mode of electric power supply with a charge storage unit located between a source charge storage unit at a high potential and a target charge storage unit at a low potential.

As illustrated in FIG. 43, the control device 50 then turns on the third positive electrode switch SP3, the fifth neutral point switch SM5, and the fifth negative electrode switch SN5 and turns off the first, second, fourth, and fifth positive electrode switches SP1, SP2, SP4, and SP5, the first to fourth neutral point switches SM1 to SM4, and the first to fourth negative electrode switches SN1 to SN4. The control device 50 then turns on the upper arm switch SWH and turns off the lower arm switch SWL. This switching causes magnetic energy to be accumulated in the stator winding 31 with the intermediate charge storage units serving as an energy source. As illustrated in FIG. 44, the control device 50 then turns off the upper arm switch SWH and turns on the lower arm switch SWL. This switching supplies a charging current based on the accumulated magnetic energy to the sixth charge storage unit 16. The switching states illustrated in FIGS. 43 and 44 alternate to supply electric power from the intermediate charge storage units to the sixth charge storage unit 16.

The above-described control of the switching of the upper and lower arm switches SWH and SWL in the inverter 20 is performed to supply electric power from the second charge storage unit 12 to the sixth charge storage unit 16. This supply of power can narrow the differences between the capacity parameters of the second and sixth charge storage units 12 and 16.

The above-described second control is to supply electric power from the source charge storage unit to the intermediate charge storage units before supplying electric power from the intermediate charge storage units to the target charge storage unit. However, the second control is not limited to this control but may be to supply electric power from the intermediate charge storage units to the target charge storage unit before supplying electric power from the source charge storage unit to the intermediate charge storage units. More specifically, after the switching states illustrated in FIGS. 43 and 44 alternate, the switching states illustrated in FIGS. 41 and 42 may alternate. This supply of power can also narrow the differences between the capacity parameters of the second and sixth charge storage units 12 and 16.

Next, the case in which the source charge storage unit is determined by the control device 50 to be located at a potential lower than the target charge storage unit will be described with reference to FIGS. 45 to 48. In the example illustrated in FIGS. 45 to 48, the sixth charge storage unit 16 is a source charge storage unit, whereas the second charge storage unit 12 is a target charge storage unit.

Figure 45:
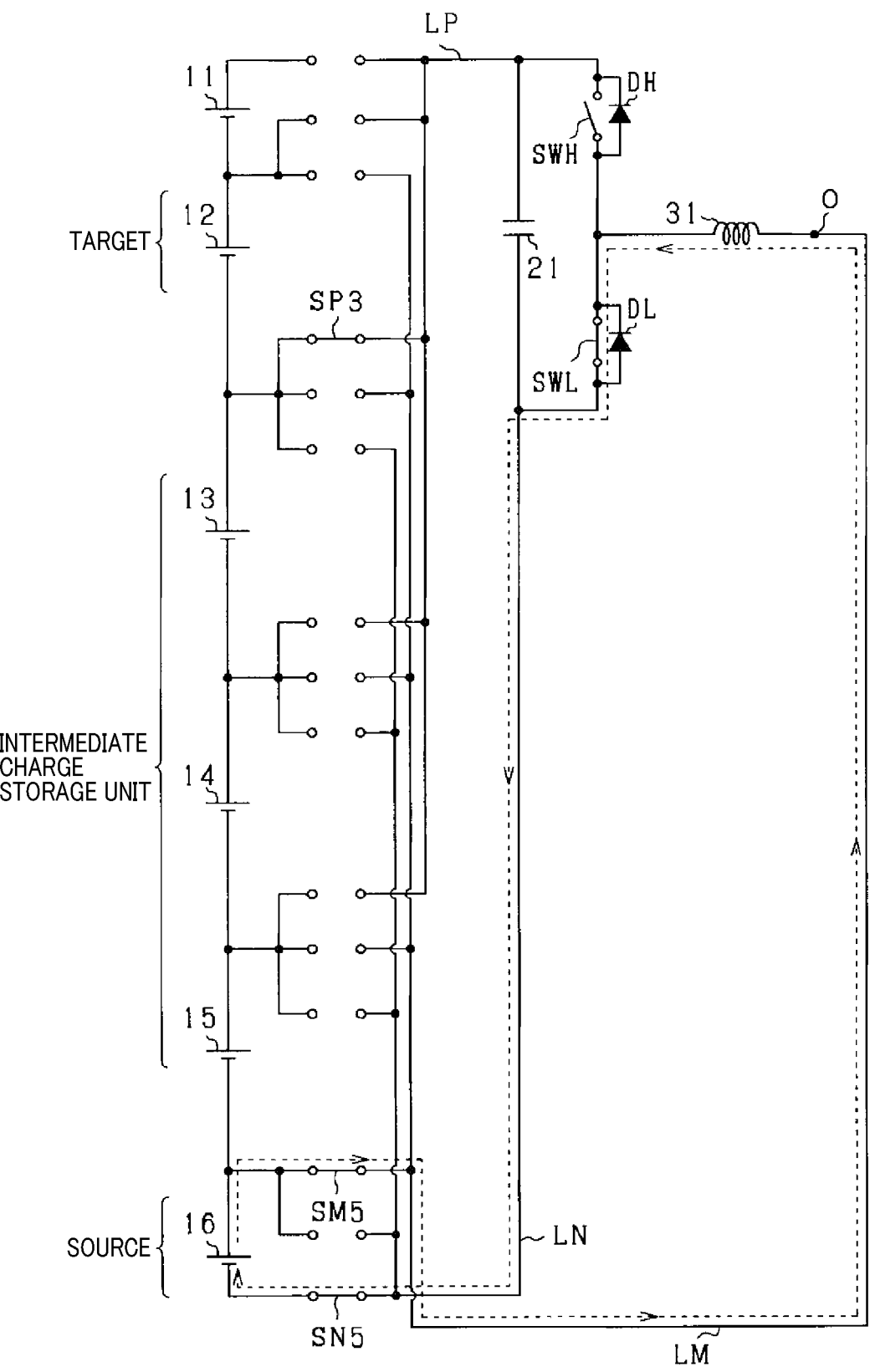
FIG. 45 illustrates a mode of electric power supply with a charge storage unit located between a source charge storage unit at a low potential and a target charge storage unit at a high potential.
Figure 46:
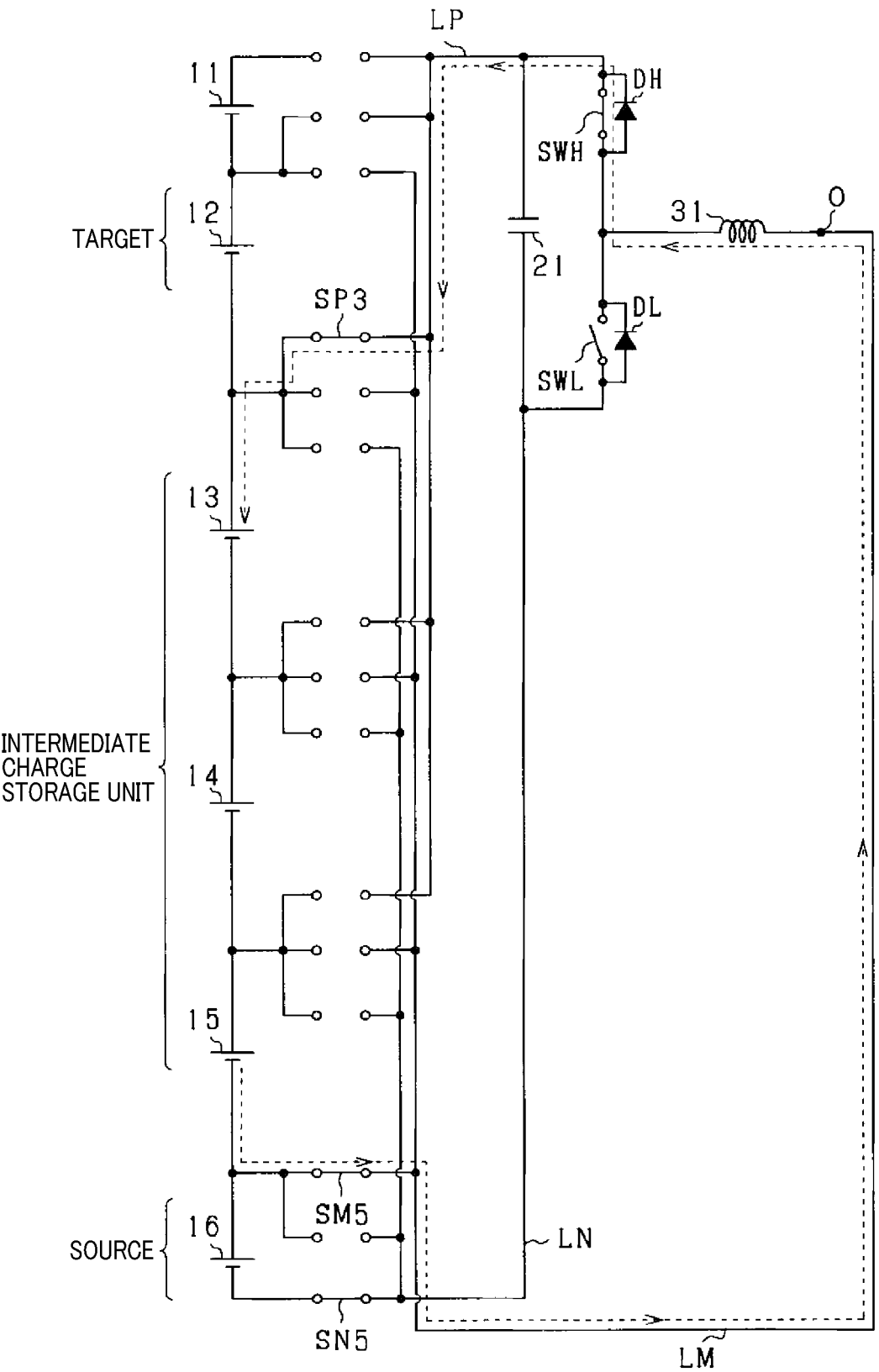
FIG. 46 illustrates a mode of electric power supply with a charge storage unit located between a source charge storage unit at a low potential and a target charge storage unit at a high potential.

As illustrated in FIG. 45, the control device 50 turns on the fifth negative electrode switch SN5, the fifth neutral point switch SM5, and the third positive electrode switch SP3 and turns off the first, second, fourth, and fifth positive electrode switches SP1, SP2, SP4, and SP5, the first to fourth neutral point switches SM1 to SM4, and the first to fourth negative electrode switches SN1 to SN4. The control device 50 then turns off the upper arm switch SWH and turns on the lower arm switch SWL. This switching causes magnetic energy to be accumulated in the stator winding 31 with the sixth charge storage unit 16 serving as an energy source. As illustrated in FIG. 46, the control device 50 then turns on the upper arm switch SWH and turns off the lower arm switch SWL. This switching supplies a charging current based on the accumulated magnetic energy to the third to fifth charge storage units 13 to 15, which are intermediate charge storage units. The switching states illustrated in FIGS. 45 and 46 alternate to supply electric power from the sixth charge storage unit 16 to the intermediate charge storage units.

Figure 47:
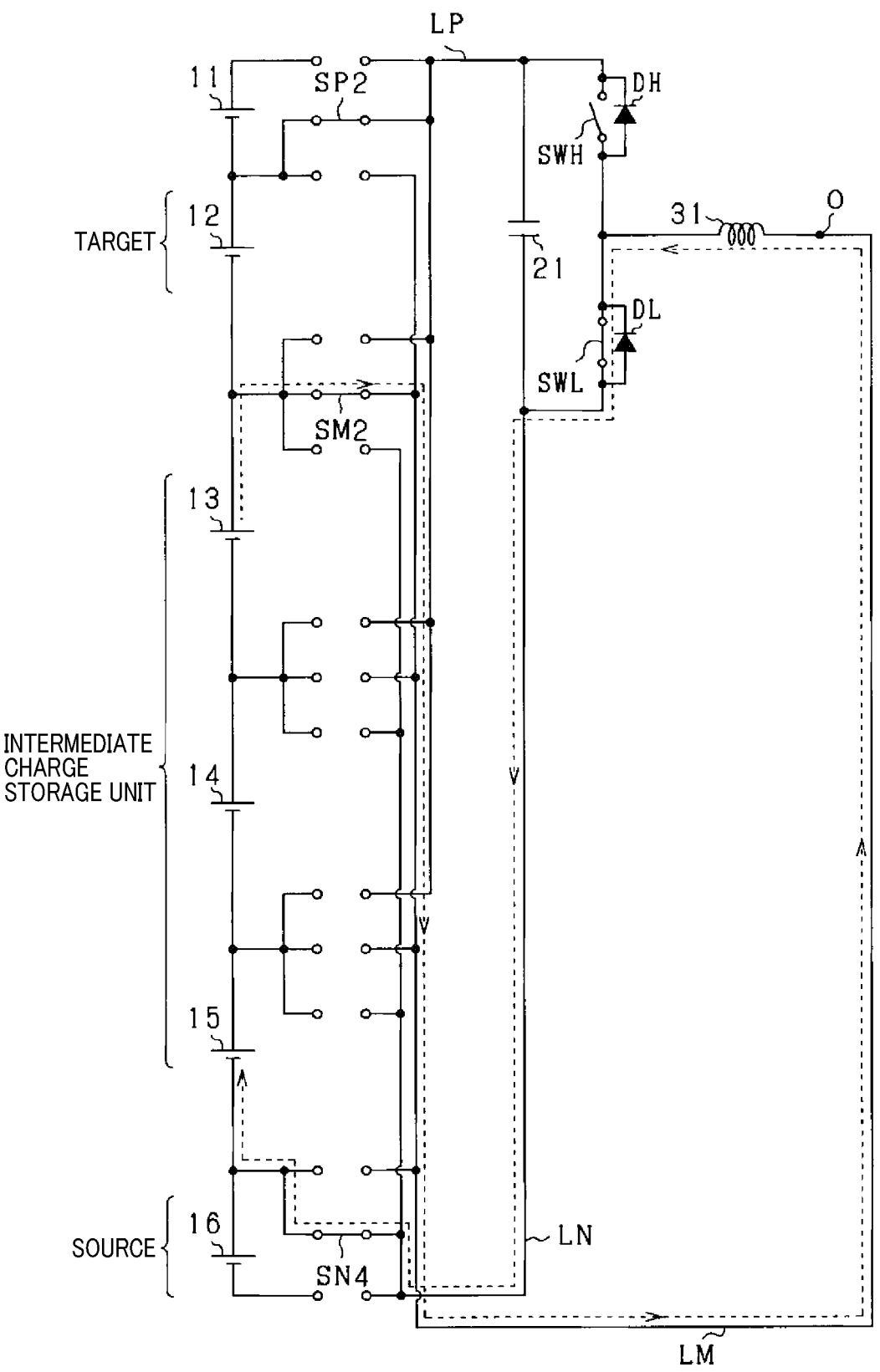
FIG. 47 illustrates a mode of electric power supply with a charge storage unit located between a source charge storage unit at a low potential and a target charge storage unit at a high potential.
Figure 48:
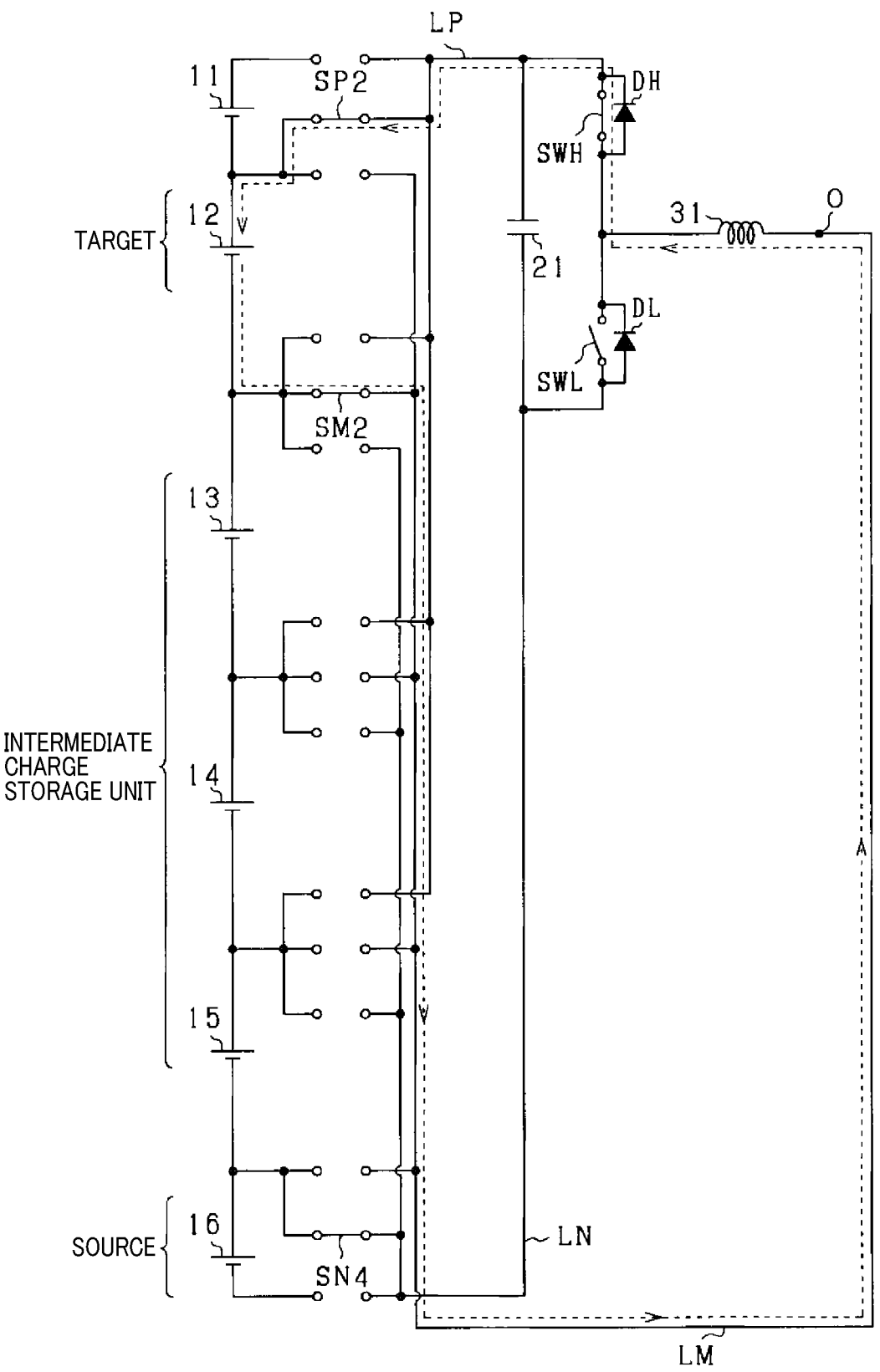
FIG. 48 illustrates a mode of electric power supply with a charge storage unit located between a source charge storage unit at a low potential and a target charge storage unit at a high potential.

As illustrated in FIG. 47, the control device 50 then turns on the fourth negative electrode switch SN4, the second neutral point switch SM2, and the second positive electrode switch SP2 and turns off the first and third to fifth positive electrode switches SP1 and SP3 to SP5, the first and third to fifth neutral point switches SM1 and SM3 to SM5, and the first to third and fifth negative electrode switches SN1 to SN3 and SN5. The control device 50 then turns off the upper arm switch SWH and turns on the lower arm switch SWL. This switching causes magnetic energy to be accumulated in the stator winding 31 with the intermediate charge storage units serving as an energy source. As illustrated in FIG. 48, the control device 50 then turns on the upper arm switch SWH and turns off the lower arm switch SWL. This switching supplies a charging current based on the accumulated magnetic energy to the second charge storage unit 12. The switching states illustrated in FIGS. 47 and 48 alternate to supply electric power from the intermediate charge storage units to the second charge storage unit 12.

The above-described control of the switching of the upper and lower arm switches SWH and SWL in the inverter 20 is performed to supply electric power from the sixth charge storage unit 16 to the second charge storage unit 12. This supply of power can narrow the differences between the capacity parameters of the second and sixth charge storage units 12 and 16.

The above-described second control is to supply electric power from the source charge storage unit to the intermediate charge storage units before supplying electric power from the intermediate charge storage units to the target charge storage unit. However, the second control is not limited to this control but may be to supply electric power from the intermediate charge storage units to the target charge storage unit before supplying electric power from the source charge storage unit to the intermediate charge storage units. More specifically, after the switching states illustrated in FIGS. 47 and 48 alternate, the switching states illustrated in FIGS. 45 and 46 may alternate. This supply of power can also narrow the differences between the capacity parameters of the second and sixth charge storage units 12 and 16.

Sixth Embodiment

Figure 49:
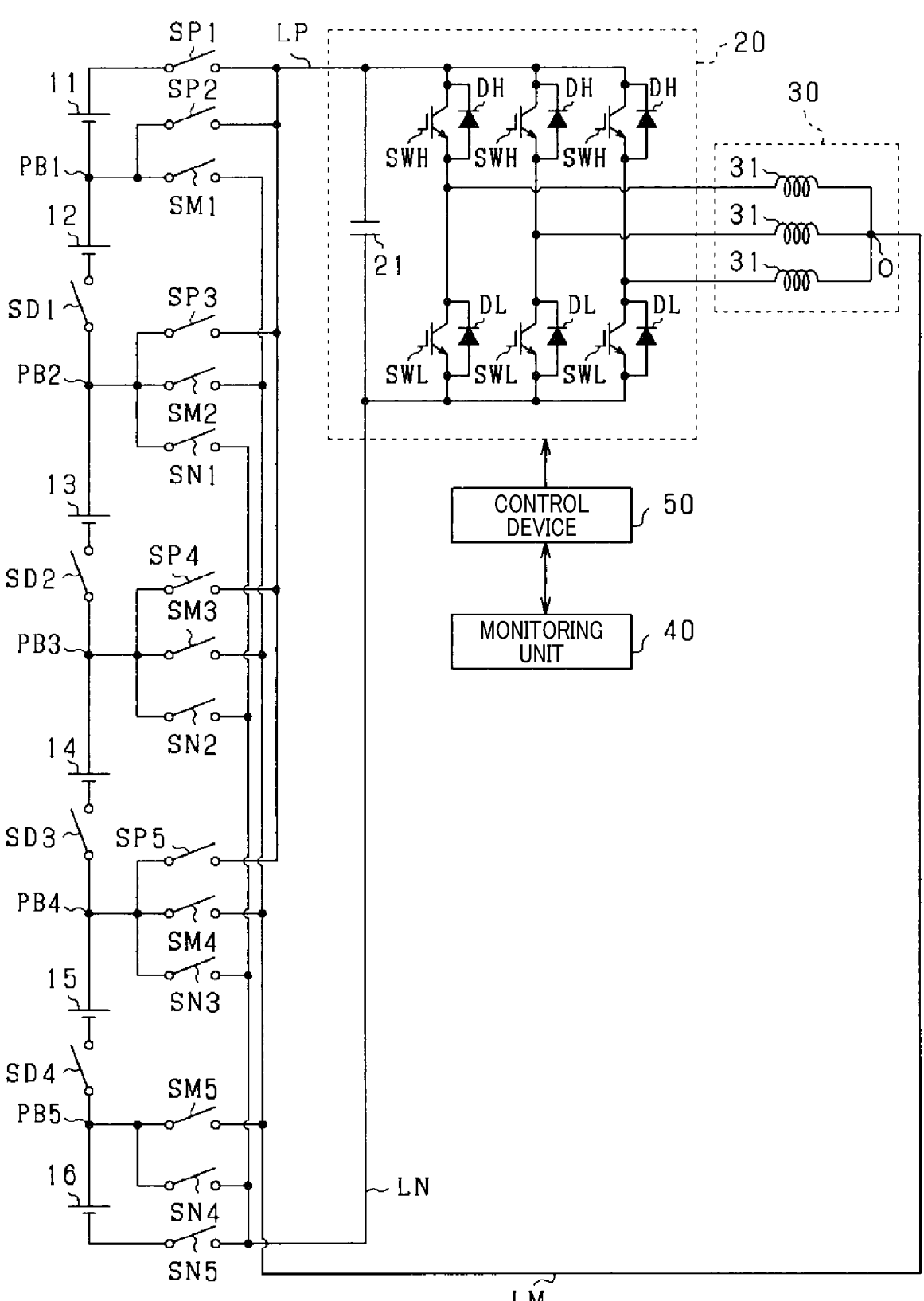
FIG. 49 is an overall configuration diagram of a power conversion device according to a sixth embodiment.

A sixth embodiment will now be described with reference to the drawings by focusing on differences from the first embodiment. In the present embodiment, as illustrated in FIG. 49, the power conversion device includes first to fifth positive electrode switches SP1 to SP5, first to fifth negative electrode switches SN1 to SN5, and first to fourth inter-cell switches SD1 to SD4. In the present embodiment, the positive electrode switches SP1 to SP5, the negative electrode switches SN1 to SN5, and the inter-cell switches SD1 to SD4 are relays and turned on or off by the control device 50. In FIG. 49, the same components as illustrated in FIG. 1 are designated by the same reference numerals for the sake of convenience.

The first positive electrode switch SP1 connects the positive electrode terminal of the first charge storage unit and the high potential path LP. The n-th positive electrode switch SPn (n=2, 3, 4, 5) connects the (n−1)-th connection point PBn−1 and the high potential path LP. When the n-th positive electrode switch SPn is turned on, the (n−1)-th connection point PBn−1 and the high potential path LP are electrically connected to each other. When the n-th positive electrode switch SPn is turned off, the (n−1)-th connection point PBn−1 and the high potential path LP are electrically disconnected from each other.

The fifth negative electrode switch SN5 connects the negative electrode terminal of the sixth charge storage unit and the low potential path LN. The m-th negative electrode switch SNm (m=1, 2, 3, 4) connects the (m+1)-th connection point PBm+1 and the low potential path LN. When the m-th negative electrode switch SNm is turned on, the (m+1)-th connection point PBm+1 and the low potential path LN are electrically connected to each other. When the m-th negative electrode switch SNm is turned off, the (m+1)-th connection point PBm+1 and the low potential path LN are electrically disconnected from each other.

The m-th inter-cell switch SDm connects the negative electrode terminal of the (m+1)-th charge storage unit and the (m+1)-th connection point PBm+1. When the m-th inter-cell switch SDm is turned on, the negative electrode terminal of the (m+1)-th charge storage unit and the (m+1)-th connection point PBm+1 are electrically connected to each other. When the m-th inter-cell switch SDm is turned off, the negative electrode terminal of the (m+1)-th charge storage unit and the (m+1)-th connection point PBm+1 are electrically disconnected from each other. The m-th inter-cell switch SDm may be provided between the positive electrode terminal of the (m+1)-th charge storage unit and the m-th connection point PBm instead of between the negative electrode terminal of the (m+1)-th charge storage unit and the (m+1)-th connection point PBm+1.

The control device 50 selects, from the charge storage units 11 to 16, one charge storage unit or some charge storage units connected in series as a source charge storage unit, and selects, from the charge storage units 11 to 16, one of the charge storage units other than the source charge storage unit or some of the charge storage units connected in series other than the source charge storage unit as a target charge storage unit.

Figure 50:
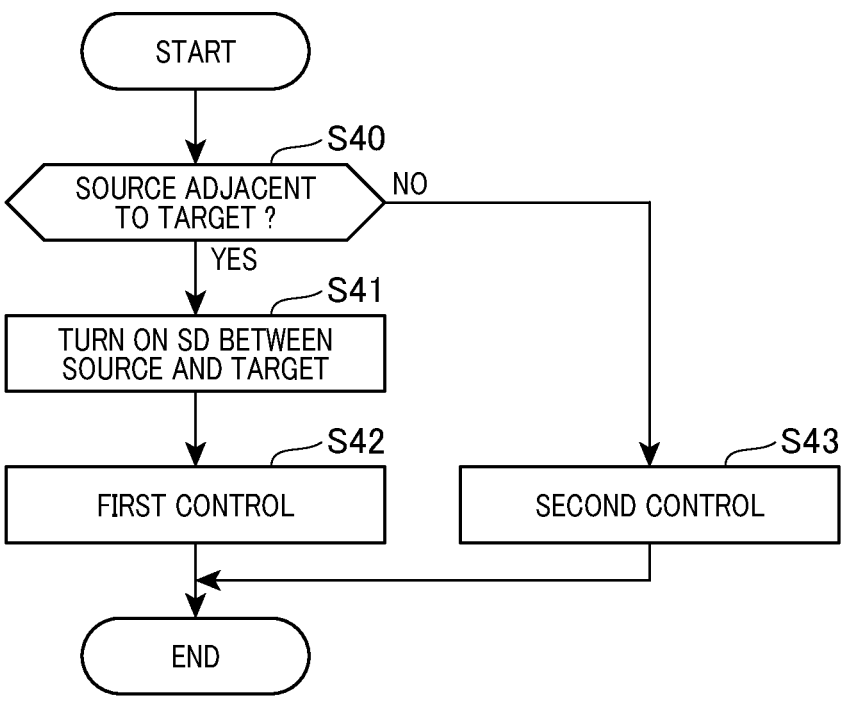
FIG. 50 is a flowchart illustrating a procedure of power transfer processing.

FIG. 50 illustrates a procedure of power supply processing performed by the control device 50.

In step S40, the same processing as in step S30 in FIG. 38 is performed.

If the determination result in step S40 is affirmative, the processing proceeds to step S41 to turn on the inter-cell switch between the source charge storage unit and the target charge storage unit. In one example, if the second charge storage unit 12 is a source charge storage unit, and the third charge storage unit 13 is a target charge storage unit, the first inter-cell switch SD1 is turned on. In another example, if the second and third charge storage units 12 and 13 are source charge storage units, and the fourth and fifth charge storage units 14 and 15 are target charge storage units, the first to third inter-cell switches SD1 to SD3 are turned on.

In step S42, the same first control as in step S31 in FIG. 38 is performed. FIG. 39 represents an example of switch driving in a case in which the source charge storage unit is determined to be adjacent to the high potential side of the target charge storage unit, while FIG. 40 represents an example of switch driving in a case in which the source charge storage unit is determined to be adjacent to the low potential side of the target charge storage unit.

If the determination result in step S40 is negative, the processing proceeds to step S43, in which the second control is performed. The second control will now be described.

Figure 51:
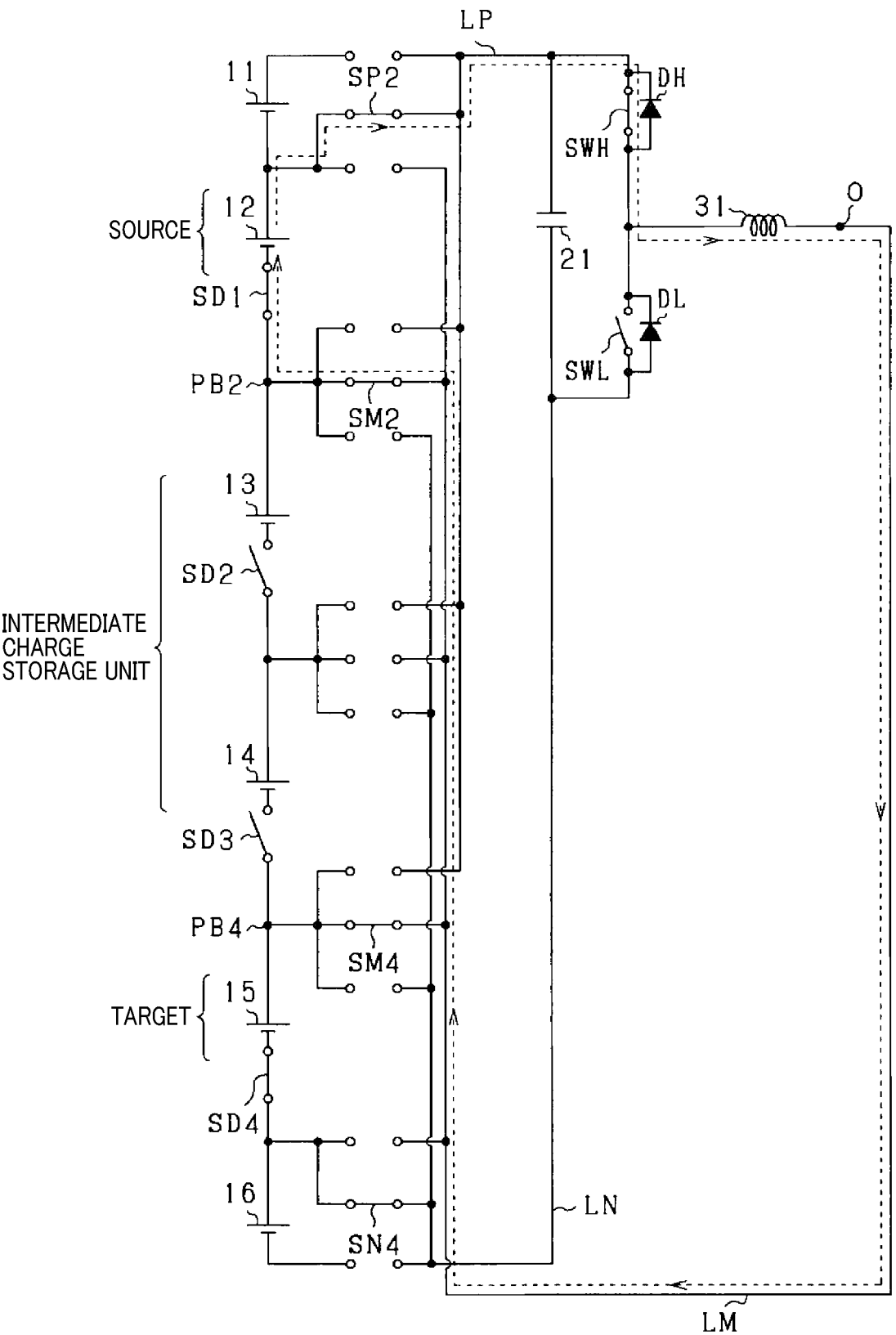
FIG. 51 illustrates a mode of electric power supply with a charge storage unit located between a source charge storage unit at a high potential and a target charge storage unit at a low potential.
Figure 52:
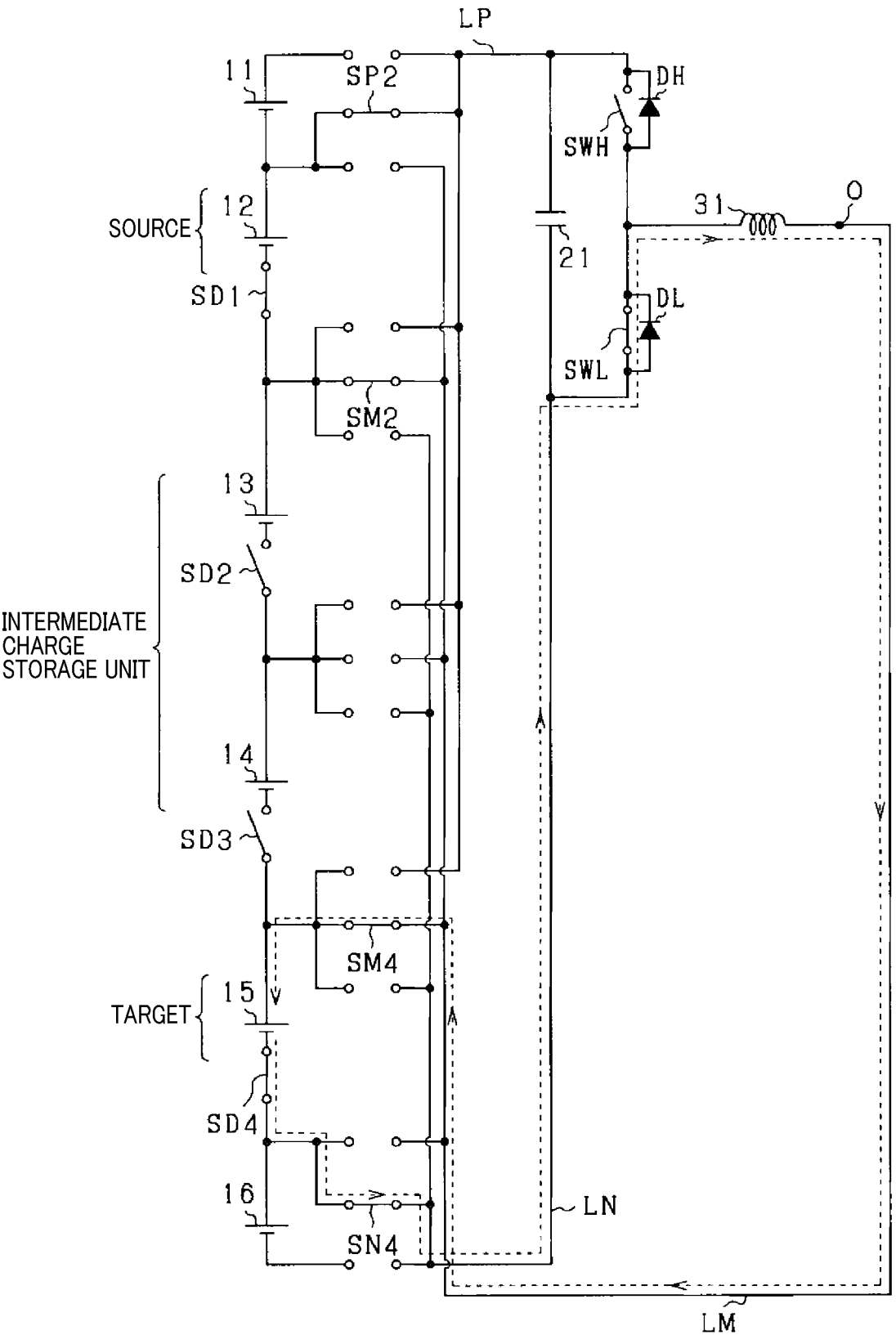
FIG. 52 illustrates a mode of electric power supply with a charge storage unit located between a source charge storage unit at a high potential and a target charge storage unit at a low potential.

First, the case in which the source charge storage unit is determined by the control device 50 to be located at a potential higher than the target charge storage unit will be described with reference to FIGS. 51 and 52. In the example illustrated in FIGS. 51 and 52, the second charge storage unit 12 is a source charge storage unit, whereas the fifth charge storage unit 15 is a target charge storage unit. In FIGS. 51 and 52, the third and fourth charge storage units 13 and 14 correspond to an intermediate charge storage unit.

As illustrated in FIG. 51, the control device 50 turns on the second positive electrode switch SP2, the second and fourth neutral point switches SM2 and SM4, the fourth negative electrode switch SN4, and the first and fourth inter-cell switches SD1 and SD4 and turns off the first and third to fifth positive electrode switches SP1 and SP3 to SP5, the first, third, and fifth neutral point switches SM1, SM3, and SM5, the first, second, third, and fifth negative electrode switches SN1, SN2, SN3, and SN5, and the second and third inter-cell switches SD2 and SD3. The first and fourth inter-cell switches SD1 and SD4 are the inter-cell switches between the second to fourth connection points PB2 to PB4 located between the second charge storage unit 12, which is the source charge storage unit, and the fifth charge storage unit 15, which is the target charge storage unit. The control device 50 then turns on the upper arm switch SWH and turns off the lower arm switch SWL. This switching causes magnetic energy to be accumulated in the stator winding 31 with the second charge storage unit 12 serving as an energy source. As illustrated in FIG. 52, the control device 50 then turns off the upper arm switch SWH and turns on the lower arm switch SWL. This switching supplies a charging current based on the accumulated magnetic energy to the fifth charge storage unit 15. The switching states illustrated in FIGS. 51 and 52 alternate to supply electric power from the second charge storage unit 12 to the fifth charge storage unit 15. This supply of power can narrow the differences between the capacity parameters of the second and fifth charge storage units 12 and 15. In this case, in which the second and third inter-cell switches SD2 and SD3 are turned off, even when the second and fourth neutral point switches SM2 and SM4 are turned on, a short circuit is prevented between the positive electrode terminal of the third charge storage unit 13 and the negative electrode terminal of the fourth charge storage unit 14. It is noted that only any one inter-cell switch of the second and third inter-cell switches SD2 and SD3 may be turned off. In a state in which, instead of the second charge storage unit 12, the first and second charge storage units 11 and 12 are source charge storage units, and instead of the fifth charge storage unit 15, the fifth and sixth charge storage units 15 and 16 are target charge storage units, the inter-cell switch to be turned off in the second control is at least one of the second and third inter-cell switches SD2 and SD3. The second and third inter-cell switches SD2 and SD3 are the inter-cell switches between the second to fourth connection points PB2 to PB4 located between the second charge storage unit 12, which is the charge storage unit lowest in potential in the source charge storage units, and the fifth charge storage unit 15, which is the charge storage unit highest in potential in the target charge storage units.

The above-described control of the switching of the upper and lower arm switches SWH and SWL in the inverter 20 is performed to supply electric power from the second charge storage unit 12 to the fifth charge storage unit 15. In this case, no charging current flows through the charge storage units other than the source charge storage unit and the target charge storage unit, thus enabling a reduction in losses in the power conversion device and suppression of the progress of deterioration in the charge storage units.

Figure 53:
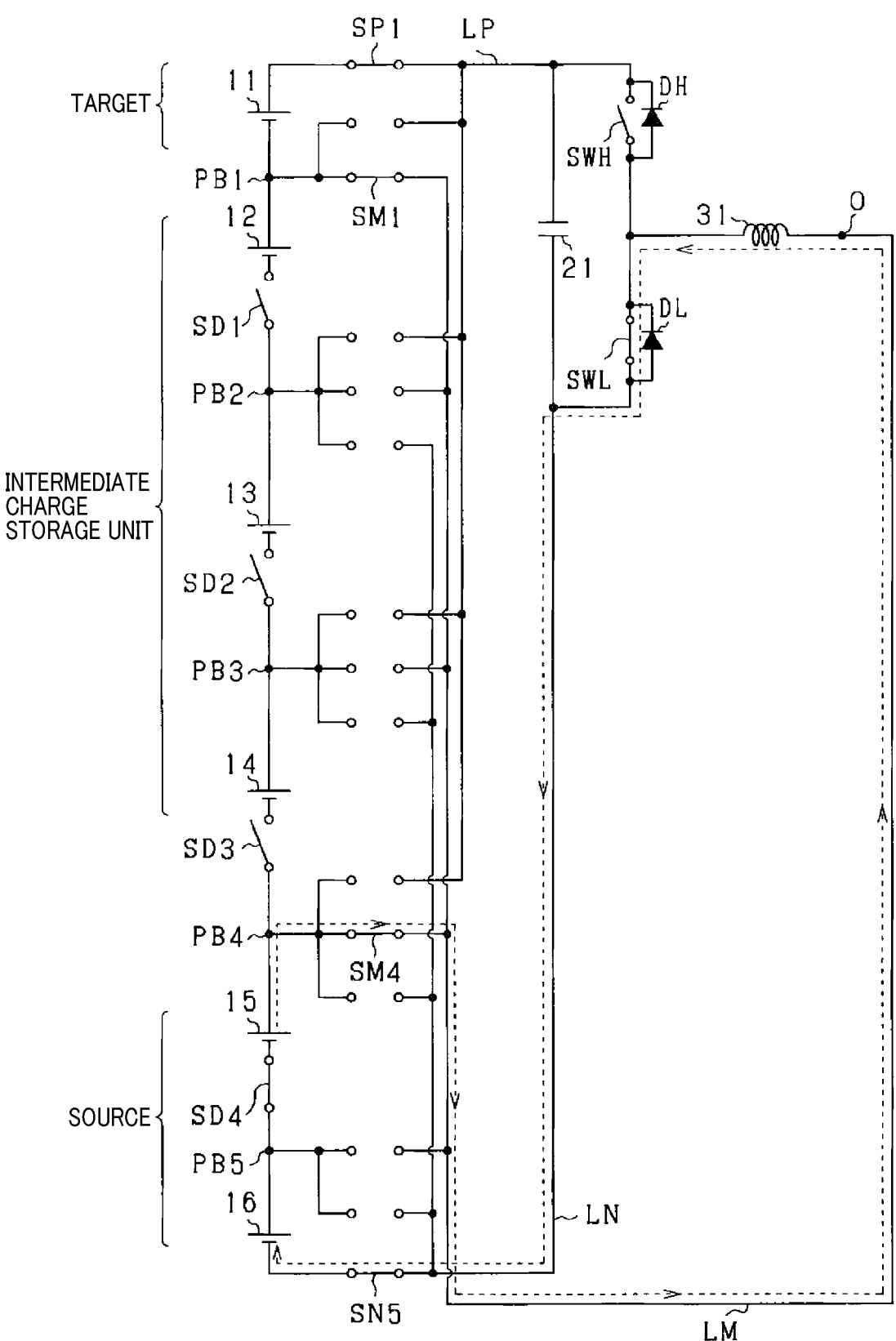
FIG. 53 illustrates a mode of electric power supply with a charge storage unit located between a source charge storage unit at a low potential and a target charge storage unit at a high potential.
Figure 54:
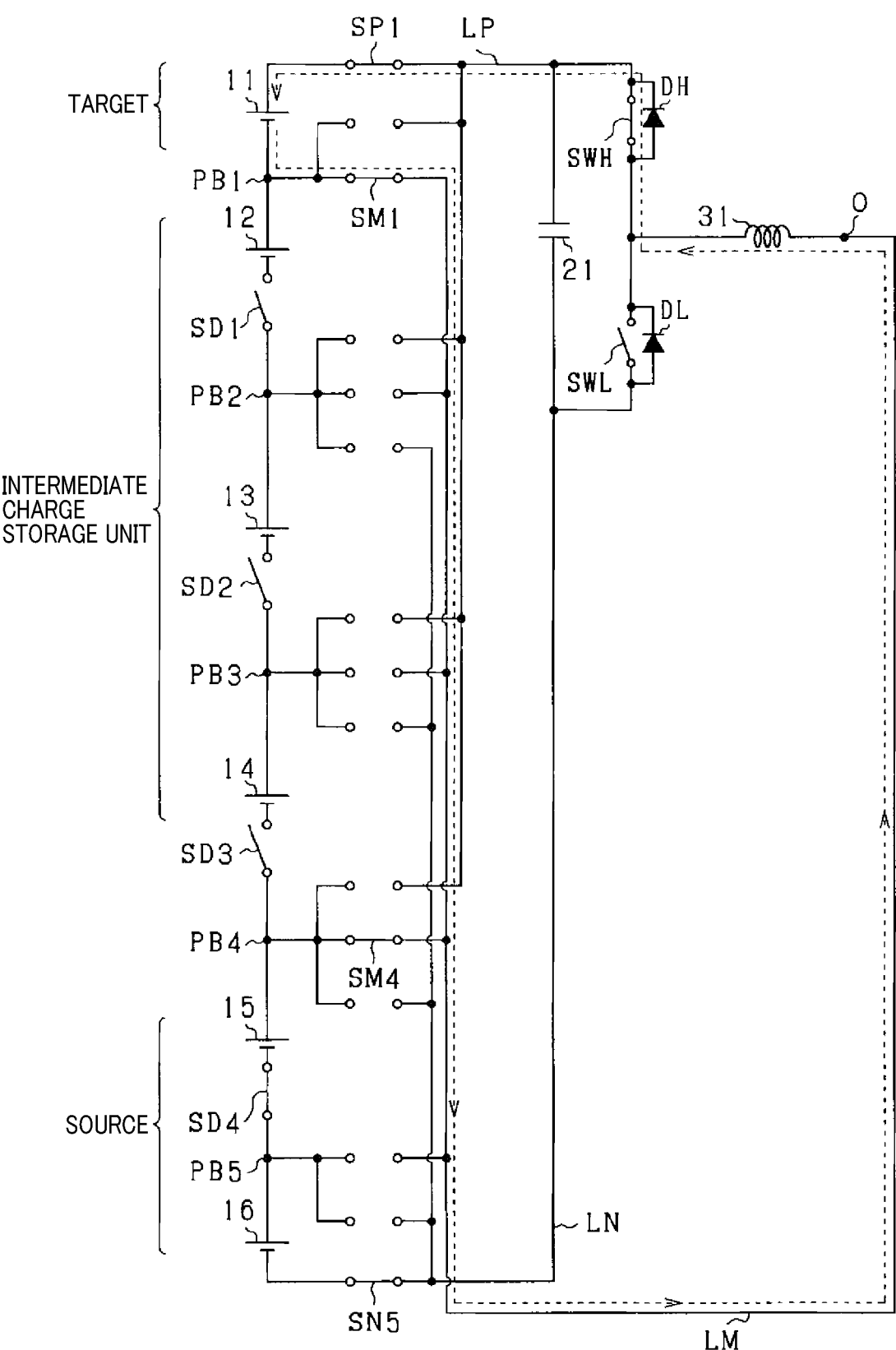
FIG. 54 illustrates a mode of electric power supply with a charge storage unit located between a source charge storage unit at a low potential and a target charge storage unit at a high potential.

Next, the case in which the source charge storage unit is determined by the control device 50 to be located at a potential lower than the target charge storage unit will be described with reference to FIGS. 53 and 54. In the example illustrated in FIGS. 53 and 54, the fifth and sixth charge storage units 15 and 16 are source charge storage units, whereas the first charge storage unit 11 is a target charge storage unit. In FIGS. 53 and 54, the second to fourth charge storage units 12 to 14 correspond to an intermediate charge storage unit.

As illustrated in FIG. 53, the control device 50 turns on the fifth negative electrode switch SN5, the first neutral point switch SM1, the fourth neutral point switch SM4, and the first positive electrode switch SP1 and turns off the second to fifth positive electrode switches SP2 to SP5, the second, third, and fifth neutral point switches SM2, SM3, and SM5, the first to fourth negative electrode switches SN1 to SN4, and the first to third inter-cell switches SD1 to SD3. The first to third inter-cell switches SD1 to SD3 are the inter-cell switches between the first to fourth connection points PB1 to PB4 located between the fifth charge storage unit 15, which is the charge storage unit highest in potential in the source charge storage units, and the first charge storage unit 11, which is the target charge storage unit. The control device 50 then turns off the upper arm switch SWH and turns on the lower arm switch SWL. This switching causes magnetic energy to be accumulated in the stator winding 31 with the fifth and sixth charge storage units 15 and 16 serving as an energy source. As illustrated in FIG. 54, the control device 50 then turns on the upper arm switch SWH and turns off the lower arm switch SWL. This switching supplies a charging current based on the accumulated magnetic energy to the first charge storage unit 11. The switching states illustrated in FIGS. 53 and 54 alternate to supply electric power from the fifth and sixth charge storage units 15 and 16 to the first charge storage unit 11. This supply of power can narrow the differences between the capacity parameters of the second and fifth charge storage units 12 and 15. In this case, in which the first to third inter-cell switches SD1 to SD3 are turned off, even when the first and fourth neutral point switches SM1 and SM4 are turned on, a short circuit is prevented between the positive electrode terminal of the second charge storage unit 12 and the negative electrode terminal of the fourth charge storage unit 14. It is noted that only any one or two inter-cell switches of the first to third inter-cell switches SD1 to SD3 may be turned off. In a state in which, instead of the first charge storage unit 11, the first and second charge storage units 11 and 12 are target charge storage units, the inter-cell switch to be turned off in the second control is at least one of the second and third inter-cell switches SD2 and SD3. The second and third inter-cell switches SD2 and SD3 are the inter-cell switches between the second to fourth connection points PB2 to PB4 located between the fifth charge storage unit 15, which is the charge storage unit highest in potential in the source charge storage units, and the second charge storage unit 12, which is the charge storage unit lowest in potential in the target charge storage units.

The above-described control of the switching of the upper and lower arm switches SWH and SWL in the inverter 20 is performed to supply electric power from the fifth and sixth charge storage units 15 and 16 to the first charge storage unit 11. In this case, no charging current flows through the charge storage units other than the source charge storage unit and the target charge storage unit, thus enabling a reduction in losses in the power conversion device and suppression of the progress of deterioration in the charge storage units.

Seventh Embodiment

A seventh embodiment will now be described with reference to the drawings by focusing on differences from the first embodiment. The control device 50 in the present embodiment controls the switching of the inverter 20 by passing an electric current through stator windings 31 in a number of phases determined to achieve a maximum of power conversion efficiency in power supply from a source charge storage unit to a target charge storage unit.

Figure 55:
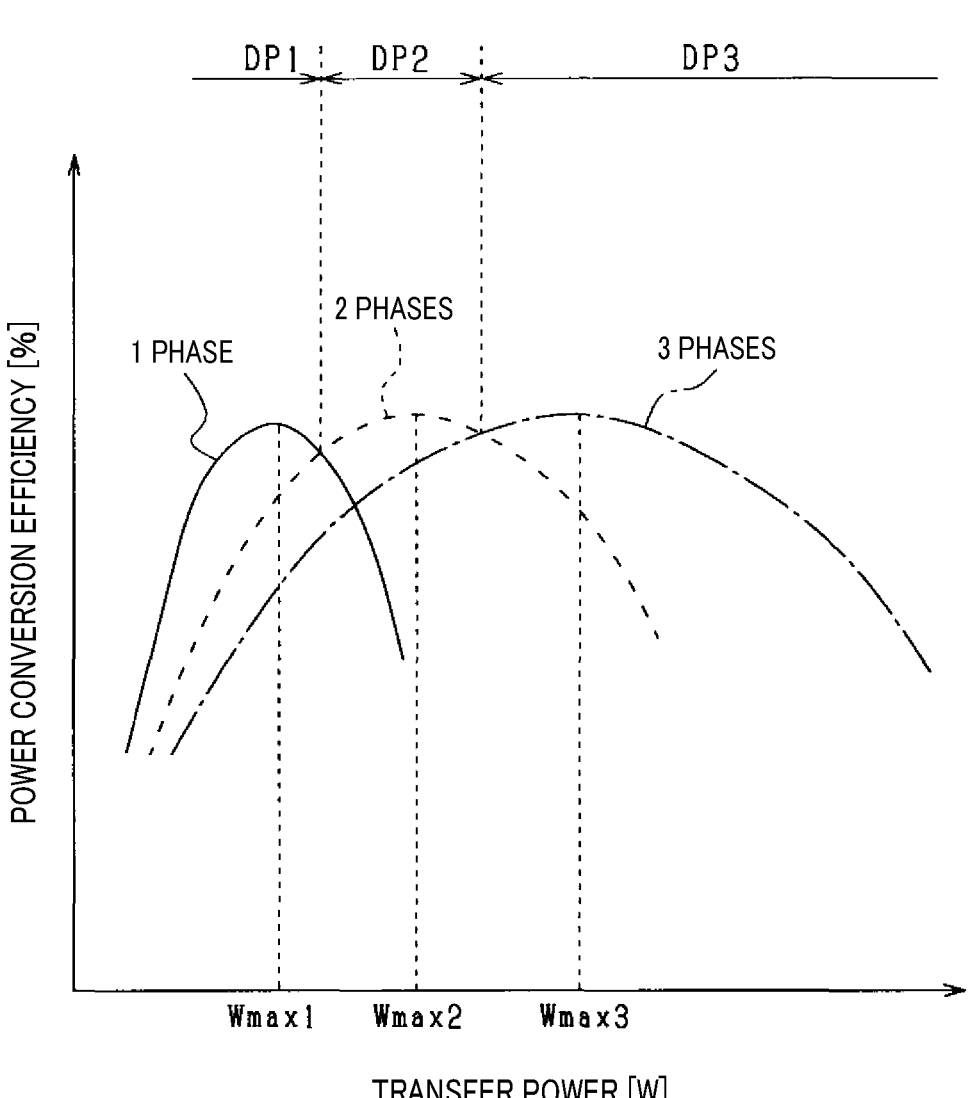
FIG. 55 illustrates the relationship between transfer power, the numbers of phases, and power conversion efficiency according to a seventh embodiment.

FIG. 55 illustrates the relationship between power conversion efficiency and transfer power for each number of phases of stator windings 31 in a case in which an electric current that flows from a source charge storage unit to a target charge storage unit through the inverter 20 and the neutral point path LM. A solid line represents a case in which an electric current is passed through a single-phase stator winding 31, a dashed line represents a case in which an electric current is passed through two-phase stator windings 31, and a dash-dot line represents a case in which an electric current is passed through three-phase stator windings 31. The transfer power that provides a maximum of power conversion efficiency increases with the number of phases of current-flowing stator windings 31. In other words, maximum efficiency power Wmax1 for a single-phase current-flowing stator winding 31 is smaller than maximum efficiency power Wmax2 for two-phase current-flowing stator windings 31. The maximum efficiency power Wmax2 when the number of phases of the stator winding 31 through which current flows is two is smaller than the maximum efficiency power Wmax3 when the number of phases of the stator winding 31 through which current flows is three phases.

Figure 56:
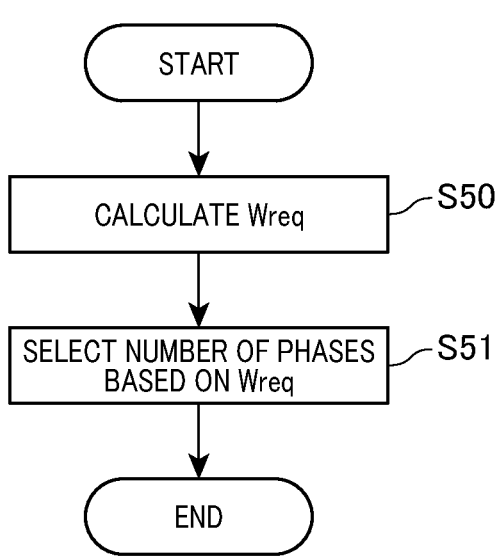
FIG. 56 is a flowchart illustrating a procedure of number-of-phases selection processing.

FIG. 56 illustrates a procedure of number-of-phases selection processing performed by the control device 50.

In step S50, transfer power Wreq from the source charge storage unit to the target charge storage unit is calculated. More specifically, first, the difference in remaining power between the source charge storage unit and the target charge storage unit is calculated. The calculated difference in remaining power is divided by a target time to calculate the transfer power Wreq. In this case, as the difference in remaining power grows or the target time shortens, the resultant transfer power Wreq increases.

In step S51, the number of phases is selected based on the calculated transfer power Wreq. More specifically, when the transfer power Wreq is within a first range DP1 illustrated in FIG. 55, a single phase is selected. The first range DP1 refers to the range of transfer power in which the power conversion efficiency in a single phase is higher than the power conversion efficiency in the other numbers of phases.

When the transfer power Wreq is within a second range DP2, two phases are selected. The second range DP2 refers to the range of transfer power in which the power conversion efficiency in two phases is higher than the power conversion efficiency in the other numbers of phases.

When the transfer power Wreq is within a third range DP3, three phases are selected. The third range DP3 refers to the range of transfer power in which the power conversion efficiency in three phases is higher than the power conversion efficiency in the other numbers of phases.

The control device 50 then controls switching in power supply processing by passing an electric current through the stator windings 31 in the selected number of phases. For example, when two or three phases are selected, the upper and lower arm switches SWH and SWL for the two or three phases are synchronously turned on or off. This switching control can increase the power conversion efficiency during the power supply processing.

OTHER EMBODIMENTS

The above-described embodiments may be modified and implemented as described below.

Figure 57:
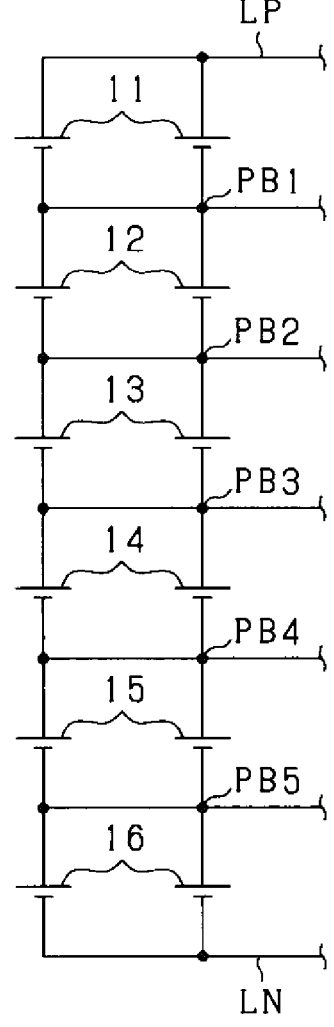
FIG. 57 illustrates a configuration of charge storage units according to another embodiment.
Figure 58:
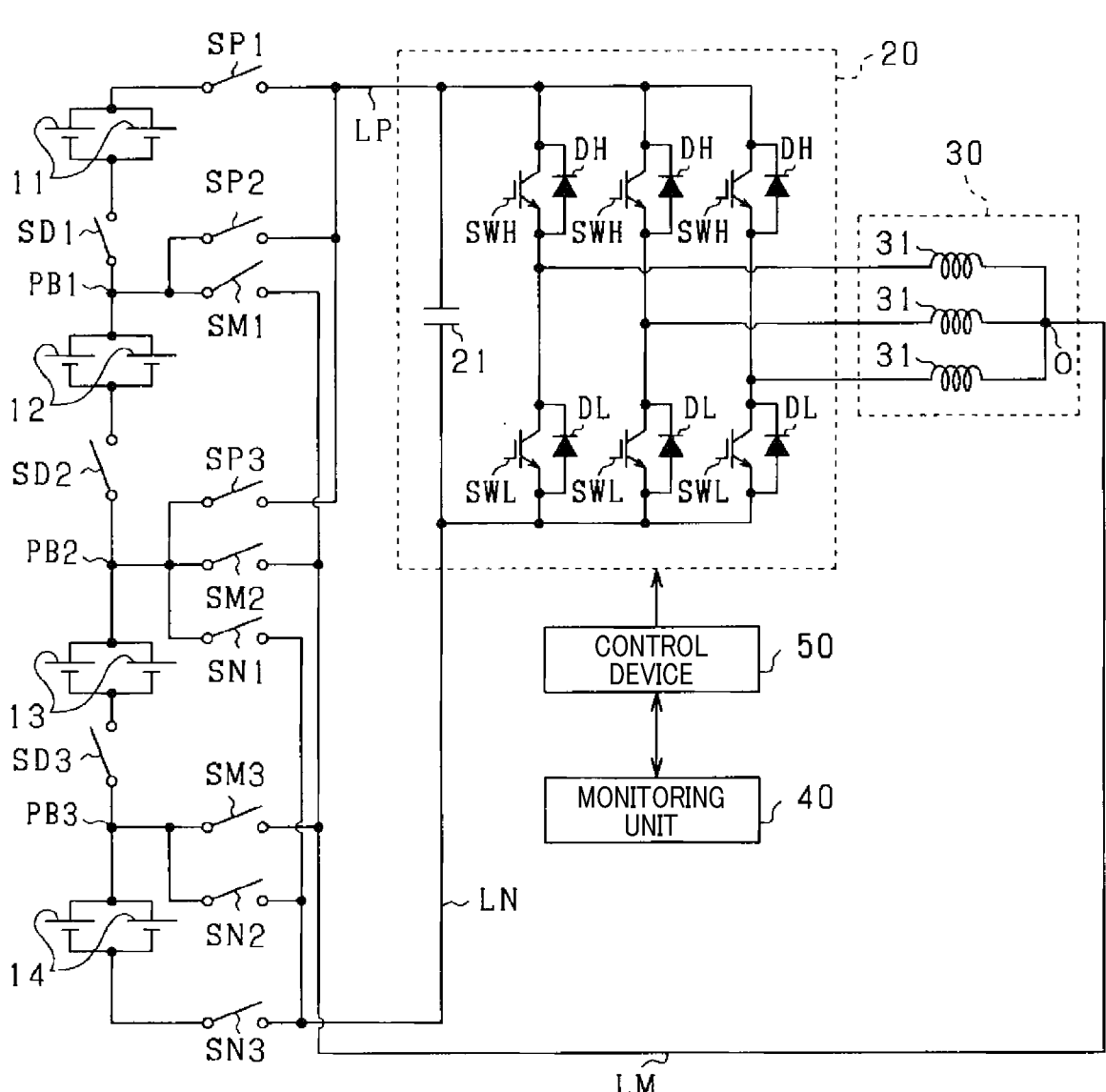
FIG. 58 is an overall configuration diagram of a power conversion device according to another embodiment.

The charge storage units may be, as illustrated in FIGS. 57 and 58, storage cells connected in parallel with each other. FIG. 57 illustrates a modification of the configuration in FIG. 1, and FIG. 58 illustrates a modification of the configuration in FIG. 49. The number of parallel connections is not limited to two, but may be greater than or equal to three. FIG. 58 illustrates a configuration with the first inter-cell switch SD1 installed between the negative electrode terminal of the first charge storage unit 11 and the first connection point PB1.

Figure 59:
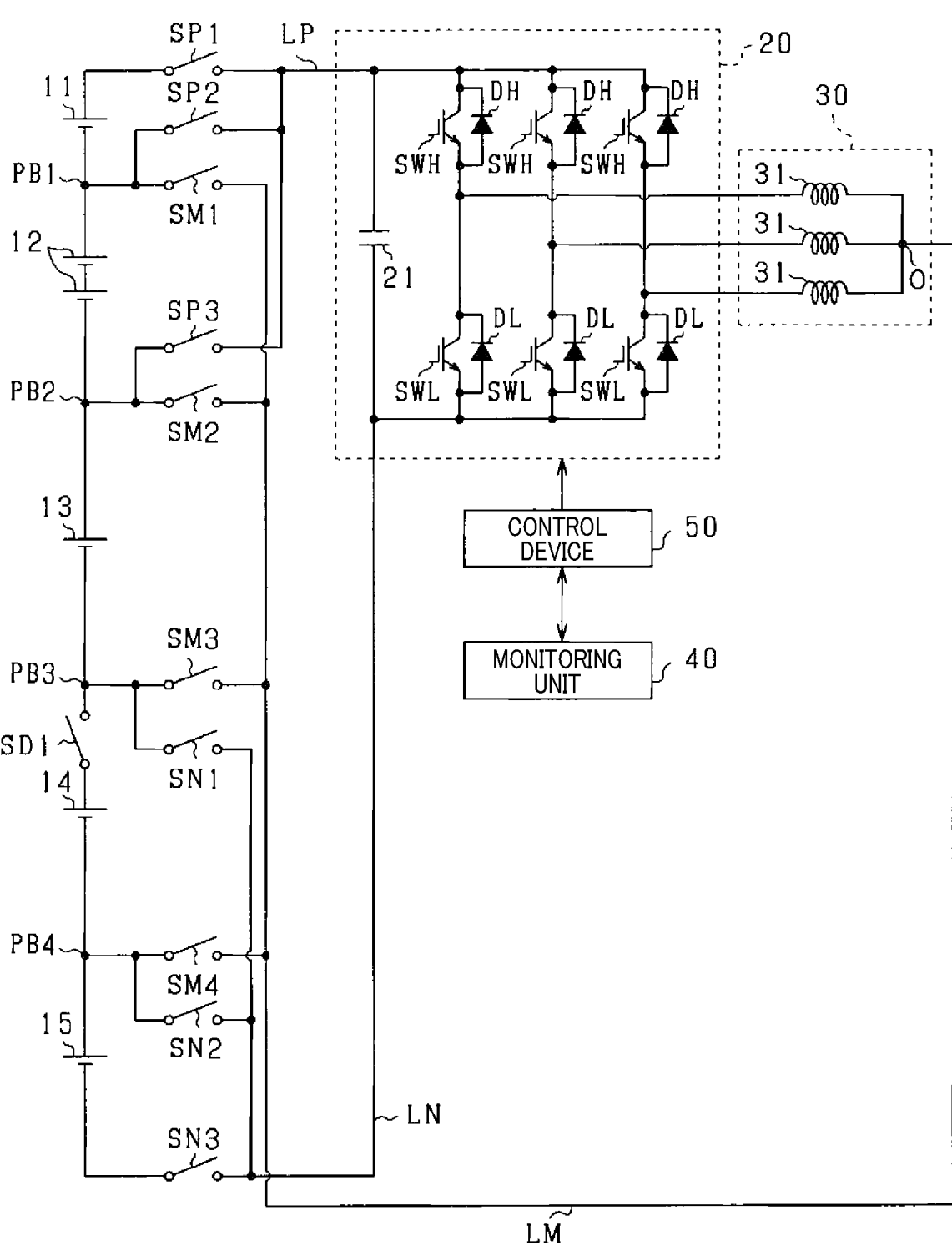
FIG. 59 is an overall configuration diagram of a power conversion device according to another embodiment.
Figure 60:
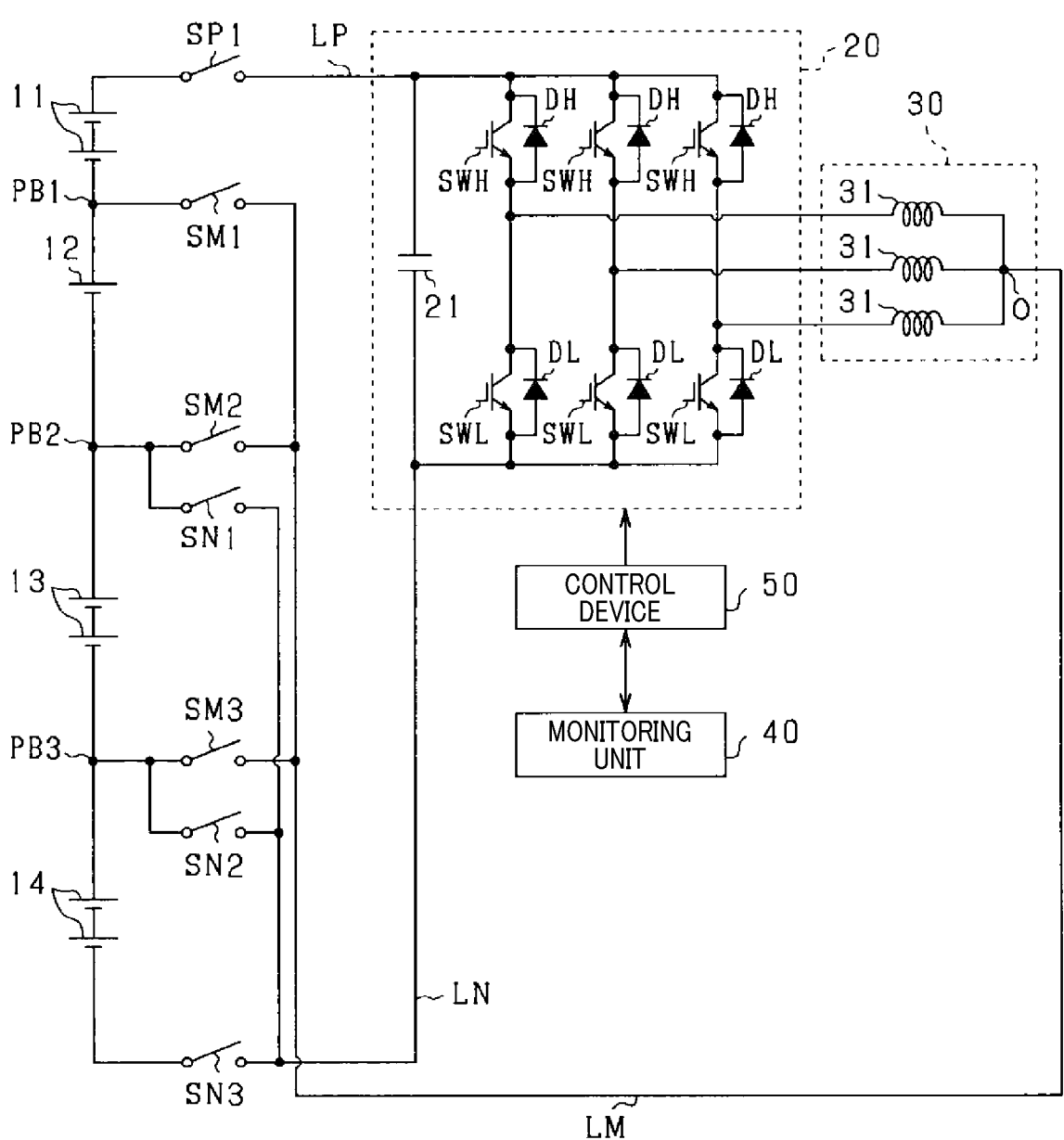
FIG. 60 is an overall configuration diagram of a power conversion device according to another embodiment.
Figure 61:
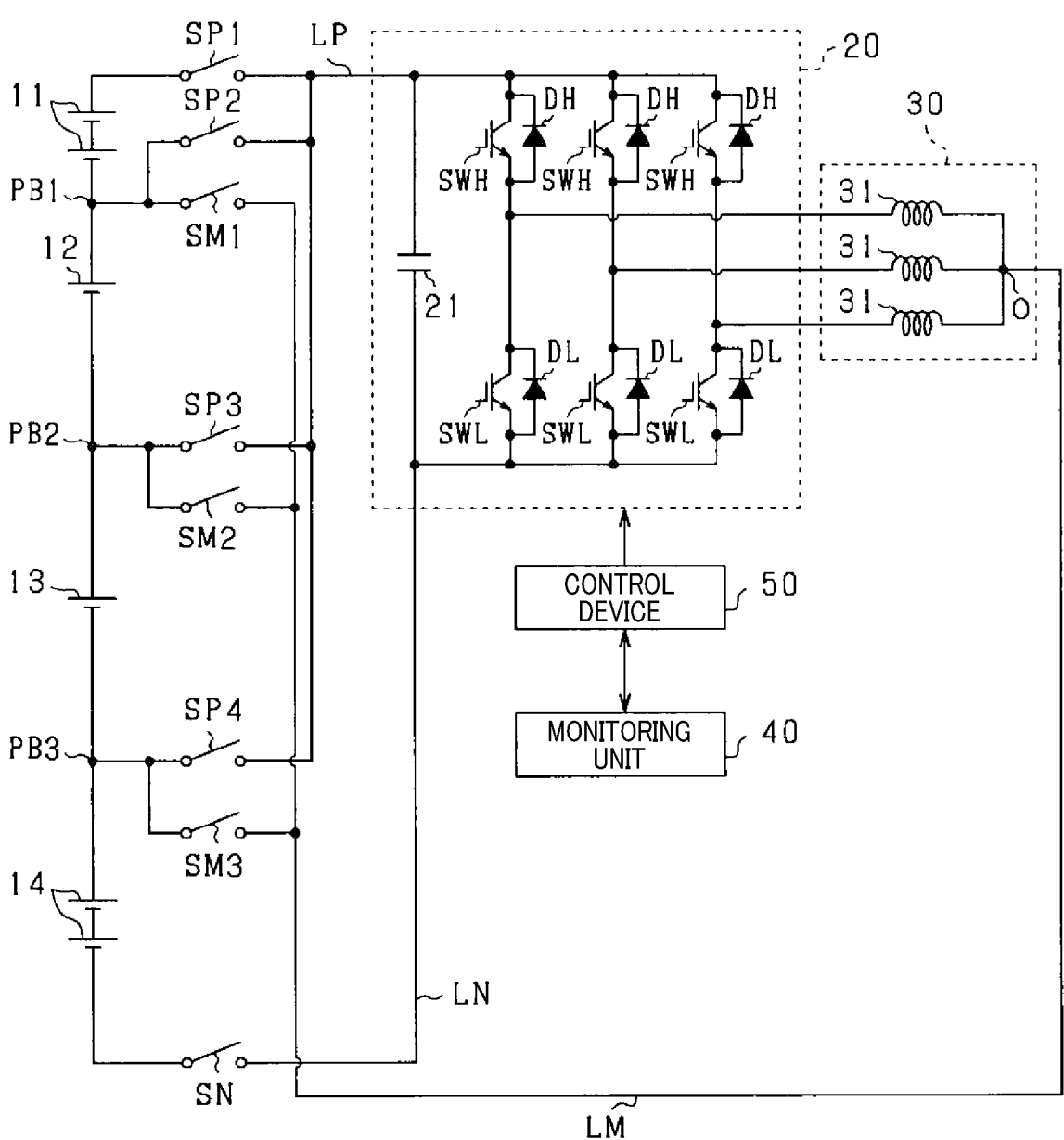
FIG. 61 is an overall configuration diagram of a power conversion device according to another embodiment.

The number of charge storage units is not limited to six, but may be, for example, four as illustrated in FIGS. 58, 60, and 61 or five as illustrated in FIG. 59. FIG. 59 illustrates a modification of the configuration in FIG. 25, FIG. 60 illustrates a modification of the configuration in FIG. 15, and FIG. 61 illustrates a modification of the configuration in FIG. 20.

The charge storage units are not limited to single storage cells, but may be, as illustrated in FIGS. 59 to 61, series-connection bodies of multiple storage cells. In this case, the number of series connections is not limited to two, but may be greater than or equal to three. The charge storage units may have different numbers of storage cells.

The charge storage units are not limited to storage cells, but may be, for example, capacitors (e.g., electric double layer capacitors).

The upper and lower arm switches included in the inverter are not limited to IGBTs, but may be, for example, n-channel MOSFETs each incorporating a body diode. In this case, the high potential terminal is a drain, whereas the low potential terminal is a source.

The positive electrode switches, the negative electrode switches, the neutral point switches, and the inter-cell switches are not limited to relays, but may be, for example, pairs of n-channel MOSFETs or IGBTs with their sources connected to each other.

The rotating electric machine and the inverter may have five phases or seven phases instead of three phases.

The moving object in which the power conversion device is incorporated is not limited to a vehicle, but may be, for example, an aircraft or a vessel. The power conversion device is not limited to a device incorporated in a moving object, but may be a stationary device.

The controller and the control method described in the present disclosure may be implemented by a special purpose computer including memory and a processor programmed to execute one or more functions embodied by computer programs. Alternatively, the controller and the control method described in the present disclosure may be implemented by a special purpose computer including a processor having one or more dedicated hardware logic circuits. Alternatively, the controller and the control method described in the present disclosure may be implemented by one or more special purpose computers including a combination of memory and a processor programmed to execute one or more functions and a processor having one or more hardware logic circuits. The computer programs may be stored in a non-transitory, tangible computer readable storage medium as instructions executed by a computer.

Although the present disclosure has been described in accordance with the embodiments, it will be understood that the disclosure is not limited to the embodiments or the structures. The disclosure encompasses various modifications and alterations falling within the range of equivalence. Additionally, various combinations and forms as well as other combinations and forms with one, more than one, or less than one element added thereto also fall within the scope and spirit of the present disclosure.

What is claimed is:

1. A power conversion device applicable to three or more charge storage units connected in series, the device comprising:

a rotating electric machine including a stator winding;

an inverter including upper and lower arm switches and connecting the stator winding and the charge storage units;

a high potential path connected to a high potential terminal of the upper arm switch;

a low potential path connected to a low potential terminal of the lower arm switch;

a neutral point path connected to a neutral point of the stator winding;

neutral point switches installed individually corresponding to cell connection points between a positive electrode terminal and a negative electrode terminal of adjacent charge storage units in the charge storage units, the neutral point switches connecting the cell connection points and the neutral point path;

a positive electrode switch connecting the high potential path and a positive electrode terminal of a highest-potential charge storage unit being a charge storage unit highest in potential in the charge storage units;

a negative electrode switch connecting the low potential path and a negative electrode terminal of a lowest-potential charge storage unit being a charge storage unit lowest in potential in the charge storage units;

a selector configured to select, from the charge storage units, one charge storage unit or some charge storage units connected in series as a source charge storage unit and select the remaining charge storage units as target charge storage units; and a controller configured to control driving of at least one of the positive electrode switch and the negative electrode switch and control switching of the inverter to supply electric power from the source charge storage unit to the target charge storage units through the inverter and the neutral point path.

2. The power conversion device according to claim 1, wherein in a state in which the highest-potential charge storage unit is the source charge storage unit, the controller supplies electric power from the source charge storage unit to the target charge storage units through the inverter and the neutral point path by controlling switching of the inverter with the positive electrode switch, the neutral point switch connected to the lowest-potential cell connection point of the source charge storage unit, and the negative electrode switch turned on.

3. The power conversion device according to claim 1, wherein in a state in which the lowest-potential charge storage unit is the source charge storage unit, the controller supplies electric power from the source charge storage unit to the target charge storage units through the inverter and the neutral point path by controlling switching of the inverter with the positive electrode switch, the neutral point switch connected to the highest-potential cell connection point of the source charge storage unit, and the negative electrode switch turned on.

4. The power conversion device according to claim 1, wherein in a state in which the source charge storage unit is located between the target charge storage units, the controller supplies electric power from the source charge storage unit and the charge storage unit lower in potential than the source charge storage unit in the charge storage units to the charge storage unit higher in potential than the source charge storage unit in the charge storage units through the inverter and the neutral point path by controlling switching of the inverter with the positive electrode switch, the negative electrode switch, and the neutral point switch connected to the highest-potential cell connection point of the source charge storage unit turned on, and thereafter, the controller supplies electric power from the source charge storage unit and the charge storage unit higher in potential than the source charge storage unit in the charge storage units to the charge storage unit lower in potential than the source charge storage unit in the charge storage units through the inverter and the neutral point path by controlling switching of the inverter with the positive electrode switch, the negative electrode switch, and the neutral point switch connected to the lowest-potential cell connection point of the source charge storage unit turned on.

5. The power conversion device according to claim 1, wherein in a state in which the source charge storage unit is located between the target charge storage units, the controller supplies electric power from the source charge storage unit and the charge storage unit higher in potential than the source charge storage unit in the charge storage units to the charge storage unit lower in potential than the source charge storage unit in the charge storage units through the inverter and the neutral point path by controlling switching of the inverter with the positive electrode switch, the negative electrode switch, and the neutral point switch connected to the lowest-potential cell connection point of the source charge storage unit turned on, and thereafter, the controller supplies electric power from the source charge storage unit and the charge storage unit lower in potential than the source charge storage unit in the charge storage units to the charge storage unit higher in potential than the source charge storage unit in the charge storage units through the neutral point path and the inverter by controlling switching of the inverter with the positive electrode switch, the negative electrode switch, and the neutral point switch connected to the highest-potential cell connection point of the source charge storage unit turned on.

6. The power conversion device according to claim 1, wherein the controller controls switching of the inverter by passing an electric current through the stator winding in a number of phases determined to achieve a maximum of power conversion efficiency in power supply from the source charge storage unit to the target charge storage unit through the inverter and the neutral point path.

7. A power conversion device applicable to three or more charge storage units connected in series, the device comprising:

a rotating electric machine including a stator winding;

an inverter including upper and lower arm switches and connecting the stator winding and the charge storage units;

a high potential path connected to a high potential terminal of the upper arm switch;

a low potential path connected to a low potential terminal of the lower arm switch;

a neutral point path connected to a neutral point of the stator winding;

neutral point switches installed individually corresponding to cell connection points between a positive electrode terminal and a negative electrode terminal of adjacent charge storage units in the charge storage units, the neutral point switches connecting the cell connection points and the neutral point path;

a positive electrode switch connecting the high potential path and a positive electrode terminal of a highest-potential charge storage unit being a charge storage unit highest in potential in the charge storage units; and negative electrode switches installed individually corresponding to negative electrode terminals of the charge storage units other than the highest-potential charge storage unit in the charge storage units, the negative electrode switches connecting the negative electrode terminals and the low potential path.

8. The power conversion device according to claim 7, further comprising:

a selector configured to select, from the charge storage units, one charge storage unit or some charge storage units connected in series as a source charge storage unit and select the remaining charge storage units as target charge storage units; and a controller configured to control driving of the positive electrode switch and the negative electrode switches and control switching of the inverter to supply electric power from the source charge storage unit to the target charge storage units through the inverter and the neutral point path, wherein in a state in which the source charge storage unit is located between the target charge storage units, the controller supplies electric power from the source charge storage unit to the charge storage unit higher in potential than the source charge storage unit in the charge storage units through the inverter and the neutral point path by controlling switching of the inverter with the positive electrode switch, the neutral point switch connected to the highest-potential cell connection point of the source charge storage unit, and the negative electrode switch connected to the lowest-potential negative electrode terminal of the source charge storage unit turned on, and thereafter the controller supplies electric power from the source charge storage unit and the charge storage unit higher in potential than the source charge storage unit in the charge storage units to the charge storage unit lower in potential than the source charge storage unit in the charge storage units through the inverter and the neutral point path by controlling switching of the inverter with the positive electrode switch, the negative electrode switch connected to the lowest-potential negative electrode terminal of the target charge storage units, and the neutral point switch connected to the lowest-potential cell connection point of the source charge storage unit turned on.

9. The power conversion device according to claim 7, further comprising:

a selector configured to select, from the charge storage units, one charge storage unit or some charge storage units connected in series as a source charge storage unit and select the remaining charge storage units as target charge storage units; and a controller configured to, in a state in which the source charge storage unit is the highest-potential charge storage unit being the charge storage unit highest in potential in the charge storage units, supply electric power from the source charge storage unit to the target charge storage units through the inverter and the neutral point path by controlling switching of the inverter with the positive electrode switch connected to the positive electrode terminal of the highest-potential charge storage unit, the negative electrode switch connected to the negative electrode terminal of the charge storage unit lowest in potential in the charge storage units, and the neutral point switch connected to the lowest-potential cell connection point of the source charge storage unit turned on.

10. The power conversion device according to claim 7, further comprising:

a selector configured to select, from the charge storage units, one charge storage unit or some charge storage units connected in series as a source charge storage unit and select the remaining charge storage units as target charge storage units; and a controller configured to, in a state in which the source charge storage unit is the lowest-potential charge storage unit being the charge storage unit lowest in potential in the charge storage units, supply electric power from the source charge storage unit to the target charge storage units through the inverter and the neutral point path by controlling switching of the inverter with the positive electrode switch connected to the positive electrode terminal of the charge storage unit highest in potential in the charge storage units, the negative electrode switch connected to the negative electrode terminal of the lowest-potential charge storage unit, and the neutral point switch connected to the lowest-potential cell connection point of the target charge storage units turned on.

11. A power conversion device applicable to three or more charge storage units connected in series, the device comprising:

a rotating electric machine including a stator winding;

an inverter including upper and lower arm switches and connecting the stator winding and the charge storage units;

a high potential path connected to a high potential terminal of the upper arm switch;

a low potential path connected to a low potential terminal of the lower arm switch;

a neutral point path connected to a neutral point of the stator winding;

neutral point switches installed individually corresponding to cell connection points between a positive electrode terminal and a negative electrode terminal of adjacent charge storage units in the charge storage units, the neutral point switches connecting the cell connection points and the neutral point path;

a negative electrode switch connecting the low potential path and a negative electrode terminal of a lowest-potential charge storage unit being a charge storage unit lowest in potential in the charge storage units; and positive electrode switches installed individually corresponding to positive electrode terminals of the charge storage units other than the lowest-potential charge storage unit in the charge storage units, the positive electrode switches connecting the positive electrode terminals and the high potential path.

12. The power conversion device according to claim 11, further comprising:

a selector configured to select, from the charge storage units, one charge storage unit or some charge storage units connected in series as a source charge storage unit and select the remaining charge storage units as target charge storage units; and a controller configured to control driving of the positive electrode switches and the negative electrode switch and control switching of the inverter to supply electric power from the source charge storage unit to the target charge storage units through the inverter and the neutral point path, wherein in a state in which the source charge storage unit is located between the target charge storage units, the controller supplies electric power from the source charge storage unit to the charge storage unit lower potential than the source charge storage unit in the charge storage units through the inverter and the neutral point path by controlling switching of the inverter with the positive electrode switch connected to the highest-potential positive electrode terminal of the source charge storage unit, the negative electrode switch, and the neutral point switch connected to the lowest-potential cell connection point of the source charge storage unit turned on, and thereafter the controller supplies electric power from the source charge storage unit and the charge storage unit lower in potential than the source charge storage unit in the charge storage units to the charge storage unit higher in potential than the source charge storage unit in the charge storage units through the inverter and the neutral point path by controlling switching of the inverter with the positive electrode switch connected to the highest-potential positive electrode terminal of the target charge storage unit, the negative electrode switch, and the neutral point switch connected to the highest-potential cell connection point of the source charge storage unit turned on.

13. A power conversion device applicable to three or more charge storage units connected in series, the device comprising:

a rotating electric machine including a stator winding;

an inverter including upper and lower arm switches and connecting the stator winding and the charge storage units;

a high potential path connected to a high potential terminal of the upper arm switch;

a low potential path connected to a low potential terminal of the lower arm switch;

a neutral point path connected to a neutral point of the stator winding; and neutral point switches installed individually corresponding to cell connection points between a positive electrode terminal and a negative electrode terminal of adjacent charge storage units in the charge storage units, the neutral point switches connecting the cell connection points and the neutral point path, wherein the charge storage units comprise a plurality of high potential charge storage units being charge storage units at high potentials and comprise a plurality of low potential charge storage units being the remaining charge storage units, and the power conversion device further comprises:

positive electrode switches installed individually corresponding to a positive electrode terminal of a highest-potential charge storage unit being a charge storage unit highest in potential in the charge storage units and the cell connection points adjacent to positive electrode terminals of the charge storage units other than the highest-potential charge storage unit in the high potential charge storage units, the positive electrode switches connecting the positive electrode terminals and the high potential path;

negative electrode switches installed individually corresponding to a negative electrode terminal of a lowest-potential charge storage unit being a charge storage unit lowest in potential in the charge storage units, the cell connection point adjacent to a negative electrode terminal of the charge storage unit other than the lowest-potential charge storage unit in the low potential charge storage units, and the cell connection point adjacent to a negative electrode terminal of a specific charge storage unit being a charge storage unit lowest in potential in the high potential charge storage units, the negative electrode switches connecting the negative electrode terminals and the low potential path; and an inter-cell switch connecting the cell connection point adjacent to the negative electrode terminal of the specific charge storage unit and the negative electrode terminal of the specific charge storage unit or connecting the cell connection point adjacent to the positive electrode terminal of the specific charge storage unit and the positive electrode terminal of the specific charge storage unit.

14. The power conversion device according to claim 13, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to, in a state in which the source charge storage unit is included in a group of the high potential charge storage units, the target charge storage unit is included in a group of the low potential charge storage units, and the source charge storage unit and the target charge storage unit have another charge storage unit located therebetween or in a state in which the source charge storage unit is included in the group of the low potential charge storage units, the target charge storage unit is included in the group of the high potential charge storage units, and the source charge storage unit and the target charge storage unit have another charge storage unit located therebetween, supply electric power from the source charge storage unit to the target charge storage unit through the inverter and the neutral point path by controlling switching of the inverter with the inter-cell switch turned off and the positive electrode switch corresponding to the highest-potential positive electrode terminal of the source charge storage unit, the neutral point switch connected to the lowest-potential cell connection point of the source charge storage unit, the neutral point switch connected to the highest-potential cell connection point of the target charge storage unit, and the negative electrode switch corresponding to the lowest-potential negative electrode terminal of the target charge storage unit turned on.

15. The power conversion device according to claim 13, further comprising:

a selector configured to select, from the charge storage units, one charge storage unit or some charge storage units connected in series as a source charge storage unit, select, from the charge storage units, one charge storage unit other than the source charge storage unit or some charge storage units connected in series other than the source charge storage unit as a target charge storage unit, and select, from the charge storage units, one charge storage unit other than the source charge storage unit and the target charge storage unit or some charge storage units connected in series other than the source charge storage unit and the target charge storage unit as a temporary target charge storage unit; and a controller configured to control driving of the positive electrode switches and the negative electrode switches and control switching of the inverter to supply electric power from the source charge storage unit to the target charge storage unit through the inverter and the neutral point path, wherein in a state in which both the source charge storage unit and the target charge storage unit are included in a group of the high potential charge storage units, and neither the source charge storage unit nor the target charge storage unit is included in a group of the low potential charge storage units, the controller supplies electric power from the source charge storage unit to the temporary target charge storage unit through the inverter and the neutral point path by controlling switching of the inverter with the inter-cell switch turned off and the positive electrode switch corresponding to the highest-potential positive electrode terminal of the source charge storage unit, the neutral point switch connected to the lowest-potential cell connection point of the source charge storage unit, the neutral point switch connected to the highest-potential cell connection point of the temporary target charge storage unit, and the negative electrode switch corresponding to the lowest-potential negative electrode terminal of the temporary target charge storage unit turned on, and thereafter the controller supplies electric power from the temporary target charge storage unit to the target charge storage unit through the inverter and the neutral point path by controlling switching of the inverter with the inter-cell switch turned off and the neutral point switch connected to the highest-potential cell connection point of the temporary target charge storage unit, the negative electrode switch corresponding to the lowest-potential negative electrode terminal of the temporary target charge storage unit, the positive electrode switch corresponding to the highest-potential positive electrode terminal of the target charge storage unit, and the neutral point switch connected to the lowest-potential cell connection point of the target charge storage unit turned on.

16. The power conversion device according to claim 13, further comprising:

a selector configured to select, from the charge storage units, one charge storage unit or some charge storage units connected in series as a source charge storage unit, select, from the charge storage units, one charge storage unit other than the source charge storage unit or some charge storage units connected in series other than the source charge storage unit as a target charge storage unit, and select, from the charge storage units, one charge storage unit other than the source charge storage unit and the target charge storage unit or some charge storage units connected in series other than the source charge storage unit and the target charge storage unit as a temporary target charge storage unit; and a controller configured to control driving of the positive electrode switches and the negative electrode switches and control switching of the inverter to supply electric power from the source charge storage unit to the target charge storage unit through the inverter and the neutral point path, wherein in a state in which both the source charge storage unit and the target charge storage unit are included in a group of the low potential charge storage units, and neither the source charge storage unit nor the target charge storage unit is included in a group of the high potential charge storage units, the controller supplies electric power from the source charge storage unit to the temporary target charge storage unit through the inverter and the neutral point path by controlling switching of the inverter with the inter-cell switch turned off and the neutral point switch connected to the highest-potential cell connection point of the source charge storage unit, the negative electrode switch corresponding to the lowest-potential negative electrode terminal of the source charge storage unit, the positive electrode switch corresponding to the highest-potential positive electrode terminal of the temporary target charge storage unit, and the neutral point switch connected to the lowest-potential cell connection point of the temporary target charge storage unit turned on, and thereafter the controller supplies electric power from the temporary target charge storage unit to the target charge storage unit through the inverter and the neutral point path by controlling switching of the inverter with the inter-cell switch turned off and the positive electrode switch corresponding to the highest-potential positive electrode terminal of the temporary target charge storage unit, the neutral point switch connected to the lowest-potential cell connection point of the temporary target charge storage unit, the neutral point switch connected to the highest-potential cell connection point of the target charge storage unit, and the negative electrode switch corresponding to the lowest-potential negative electrode terminal of the target charge storage unit turned on.

17. A power conversion device applicable to three or more charge storage units connected in series, the device comprising:

a rotating electric machine including a stator winding;

an inverter including upper and lower arm switches and connecting the stator winding and the charge storage units;

a high potential path connected to a high potential terminal of the upper arm switch;

a low potential path connected to a low potential terminal of the lower arm switch;

a neutral point path connected to a neutral point of the stator winding; and neutral point switches installed individually corresponding to cell connection points between a positive electrode terminal and a negative electrode terminal of adjacent charge storage units in the charge storage units, the neutral point switches connecting the cell connection points and the neutral point path, wherein the charge storage units comprise four or more charge storage units, and the power conversion device further comprises:

positive electrode switches installed individually corresponding to positive electrode terminals of the charge storage units other than the charge storage unit lowest in potential in the charge storage units, the positive electrode switches connecting the positive electrode terminals and the high potential path; and negative electrode switches installed individually corresponding to negative electrode terminals of the charge storage units other than the charge storage unit highest in potential in the charge storage units, the negative electrode switches connecting the negative electrode terminals and the low potential path.

18. The power conversion device according to claim 17, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to, in a state in which the source charge storage unit and the target charge storage unit are adjacent to each other, and the source charge storage unit is located at a potential higher than the target charge storage unit, supply electric power from the source charge storage unit to the target charge storage unit through the inverter and the neutral point path by controlling switching of the inverter with the positive electrode switch connected to the highest-potential positive electrode terminal of the source charge storage unit, the neutral point switch connected to the lowest-potential cell connection point of the source charge storage unit, and the negative electrode switch connected to the lowest-potential negative electrode terminal of the target charge storage unit turned on.

19. The power conversion device according to claim 17, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to, in a state in which the source charge storage unit and the target charge storage unit are adjacent to each other, and the source charge storage unit is located at a potential lower than the target charge storage unit, supply electric power from the source charge storage unit to the target charge storage unit through the inverter and the neutral point path by controlling switching of the inverter with the negative electrode switch connected to the lowest-potential negative electrode terminal of the source charge storage unit, the neutral point switch connected to the highest-potential cell connection point of the source charge storage unit, and the positive electrode switch connected to the highest-potential positive electrode terminal of the target charge storage unit turned on.

20. The power conversion device according to claim 17, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to control driving of the positive electrode switches and the negative electrode switches and control switching of the inverter to supply electric power from the source charge storage unit to the target charge storage unit through the inverter and the neutral point path, wherein in a state in which the source charge storage unit and the target charge storage unit have another charge storage unit located therebetween as an intermediate charge storage unit, and the source charge storage unit is located at a potential higher than the target charge storage unit, the controller supplies electric power from the source charge storage unit to the intermediate charge storage unit through the inverter and the neutral point path by controlling switching of the inverter with the positive electrode switch connected to the highest-potential positive electrode terminal of the source charge storage unit, the neutral point switch connected to the lowest-potential cell connection point of the source charge storage unit, and the negative electrode switch connected to the lowest-potential negative electrode terminal of the intermediate charge storage unit turned on, and thereafter the controller supplies electric power from the intermediate charge storage unit to the target charge storage unit through the inverter and the neutral point path by controlling switching of the inverter with the positive electrode switch connected to the highest-potential positive electrode terminal of the intermediate charge storage unit, the neutral point switch connected to the lowest-potential cell connection point of the intermediate charge storage unit, and the negative electrode switch connected to the lowest-potential negative electrode terminal of the target charge storage unit turned on.

21. The power conversion device according to claim 17, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to control driving of the positive electrode switches and the negative electrode switches and control switching of the inverter to supply electric power from the source charge storage unit to the target charge storage unit through the inverter and the neutral point path, wherein in a state in which the source charge storage unit and the target charge storage unit have another charge storage unit located therebetween as an intermediate charge storage unit, and the source charge storage unit is located at a potential lower than the target charge storage unit, the controller supplies electric power from the source charge storage unit to the intermediate charge storage unit through the inverter and the neutral point path by controlling switching of the inverter with the negative electrode switch connected to the lowest-potential negative electrode terminal of the source charge storage unit, the neutral point switch connected to the highest-potential cell connection point of the source charge storage unit, and the positive electrode switch connected to the highest-potential positive electrode terminal of the intermediate charge storage unit turned on, and thereafter the controller supplies electric power from the intermediate charge storage unit to the target charge storage unit through the inverter and the neutral point path by controlling switching of the inverter with the negative electrode switch connected to the lowest-potential negative electrode terminal of the intermediate charge storage unit, the neutral point switch connected to the highest-potential cell connection point of the intermediate charge storage unit, and the positive electrode switch connected to the highest-potential positive electrode terminal of the target charge storage unit turned on.

22. The power conversion device according to claim 17, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to control driving of the positive electrode switches and the negative electrode switches and control switching of the inverter to supply electric power from the source charge storage unit to the target charge storage unit through the inverter and the neutral point path, wherein in a state in which the source charge storage unit and the target charge storage unit have another charge storage unit located therebetween as an intermediate charge storage unit, and the source charge storage unit is located at a potential higher than the target charge storage unit, the controller supplies electric power from the intermediate charge storage unit to the target charge storage unit through the inverter and the neutral point path by controlling switching of the inverter with the positive electrode switch connected to the highest-potential positive electrode terminal of the intermediate charge storage unit, the neutral point switch connected to the lowest-potential cell connection point of the intermediate charge storage unit, and the negative electrode switch connected to the lowest-potential negative electrode terminal of the target charge storage unit turned on, and thereafter the controller supplies electric power from the source charge storage unit to the intermediate charge storage unit through the inverter and the neutral point path by controlling switching of the inverter with the positive electrode switch connected to the highest-potential positive electrode terminal of the source charge storage unit, the neutral point switch connected to the lowest-potential cell connection point of the source charge storage unit, and the negative electrode switch connected to the lowest-potential negative electrode terminal of the intermediate charge storage unit turned on.

23. The power conversion device according to claim 17, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to control driving of the positive electrode switches and the negative electrode switches and control switching of the inverter to supply electric power from the source charge storage unit to the target charge storage unit through the inverter and the neutral point path, wherein in a state in which the source charge storage unit and the target charge storage unit have another charge storage unit located therebetween as an intermediate charge storage unit, and the source charge storage unit is located at a potential lower than the target charge storage unit, the controller supplies electric power from the intermediate charge storage unit to the target charge storage unit through the inverter and the neutral point path by controlling switching of the inverter with the negative electrode switch connected to the lowest-potential negative electrode terminal of the intermediate charge storage unit, the neutral point switch connected to the highest-potential cell connection point of the intermediate charge storage unit, and the positive electrode switch connected to the highest-potential positive electrode terminal of the target charge storage unit turned on, and thereafter the controller supplies electric power from the source charge storage unit to the intermediate charge storage unit through the inverter and the neutral point path by controlling switching of the inverter with the negative electrode switch connected to the lowest-potential negative electrode terminal of the source charge storage unit, the neutral point switch connected to the highest-potential cell connection point of the source charge storage unit, and the positive electrode switch connected to the highest-potential positive electrode terminal of the intermediate charge storage unit turned on.

24. A power conversion device applicable to three or more charge storage units connected in series, the device comprising:

a rotating electric machine including a stator winding;

an inverter including upper and lower arm switches and connecting the stator winding and the charge storage units;

a high potential path connected to a high potential terminal of the upper arm switch;

a low potential path connected to a low potential terminal of the lower arm switch;

a neutral point path connected to a neutral point of the stator winding; and neutral point switches installed individually corresponding to cell connection points between a positive electrode terminal and a negative electrode terminal of adjacent charge storage units in the charge storage units, the neutral point switches connecting the cell connection points and the neutral point path, wherein the charge storage units comprise four or more charge storage units including a highest-potential charge storage unit being a charge storage unit highest in potential and a lowest-potential charge storage unit being a charge storage unit lowest in potential, and the power conversion device further comprises:

positive electrode switches installed individually corresponding to a positive electrode terminal of the highest-potential charge storage unit and the cell connection points adjacent to positive electrode terminals of the charge storage units other than the highest-potential charge storage unit and the lowest-potential charge storage unit in the charge storage units, the positive electrode switches connecting the positive electrode terminals and the high potential path;

negative electrode switches installed individually corresponding to a negative electrode terminal of the lowest-potential charge storage unit and the cell connection points adjacent to negative electrode terminals of the charge storage units other than the highest-potential charge storage unit and the lowest-potential charge storage unit in the charge storage units, the negative electrode switches connecting the negative electrode terminals and the low potential path; and inter-cell switches located between the cell connection points.

25. The power conversion device according to claim 24, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to, in a state in which the source charge storage unit and the target charge storage unit are adjacent to each other, and the source charge storage unit is located at a potential higher than the target charge storage unit, supply electric power from the source charge storage unit to the target charge storage unit through the inverter and the neutral point path by controlling switching of the inverter with the positive electrode switch corresponding to the highest-potential positive electrode terminal of the source charge storage unit, the neutral point switch connected to the lowest-potential cell connection point of the source charge storage unit, the negative electrode switch corresponding to the lowest-potential negative electrode terminal of the target charge storage unit, and the inter-cell switch between the source charge storage unit and the target charge storage unit turned on.

26. The power conversion device according to claim 24, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to, in a state in which the source charge storage unit and the target charge storage unit are adjacent to each other, and the source charge storage unit is located at a potential lower than the target charge storage unit, supply electric power from the source charge storage unit to the target charge storage unit through the inverter and the neutral point path by controlling switching of the inverter with the negative electrode switch corresponding to the lowest-potential negative electrode terminal of the source charge storage unit, the neutral point switch connected to the highest-potential cell connection point of the source charge storage unit, the positive electrode switch corresponding to the highest-potential positive electrode terminal of the target charge storage unit, and the inter-cell switch between the source charge storage unit and the target charge storage unit turned on.

27. The power conversion device according to claim 24, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to, in a state in which the source charge storage unit and the target charge storage unit have another charge storage unit located therebetween as an intermediate charge storage unit, and the source charge storage unit is located at a potential higher than the target charge storage unit, supply electric power from the source charge storage unit to the target charge storage unit through the inverter and the neutral point path by turning off at least one of the inter-cell switches between the cell connection points located between the source charge storage unit and the target charge storage unit and thereafter controlling switching of the inverter with the positive electrode switch corresponding to the highest-potential positive electrode terminal of the source charge storage unit, the neutral point switch connected to the highest-potential cell connection point of the intermediate charge storage unit, the neutral point switch connected to the lowest-potential cell connection point of the intermediate charge storage unit, and the negative electrode switch corresponding to the lowest-potential negative electrode terminal of the target charge storage unit turned on.

28. The power conversion device according to claim 24, further comprising:

a selector configured to select, from the charge storage units, one charge storage unit or some charge storage units connected in series as a source charge storage unit and select, from the charge storage units, one charge storage unit other than the source charge storage unit or some charge storage units connected in series other than the source charge storage unit as a target charge storage unit; and a controller configured to, in a state in which the source charge storage unit and the target charge storage unit have another charge storage unit located therebetween as an intermediate charge storage unit, and the source charge storage unit is located at a potential lower than the target charge storage unit, supply electric power from the source charge storage unit to the target charge storage unit through the inverter and the neutral point path by turning off at least one of the inter-cell switches between the cell connection points located between the source charge storage unit and the target charge storage unit and controlling switching of the inverter with the negative electrode switch corresponding to the lowest-potential negative electrode terminal of the source charge storage unit, the neutral point switch connected to the highest-potential cell connection point of the intermediate charge storage unit, the neutral point switch connected to the lowest-potential cell connection point of the intermediate charge storage unit, and the positive electrode switch corresponding to the highest-potential positive electrode terminal of the target charge storage unit turned on.

* * * * *